(12) United States Patent
Yao

(10) Patent No.: US 6,178,036 B1
(45) Date of Patent: Jan. 23, 2001

(54) OPTO-ELECTRONIC DEVICES AND SYSTEMS BASED ON BRILLOUIN SELECTIVE SIDEBAND AMPLIFICATION

(75) Inventor: X. Steve Yao, Diamond Bar, CA (US)

(73) Assignee: California Institute of Technology, Pasadena, CA (US)

( * ) Notice: Under 35 U.S.C. 154(b), the term of this patent shall be extended for 0 days.

(21) Appl. No.: 09/006,845

(22) Filed: Jan. 14, 1998

Related U.S. Application Data

(60) Provisional application No. 60/035,563, filed on Jan. 14, 1997, provisional application No. 60/035,564, filed on Jan. 14, 1997, and provisional application No. 60/064,822, filed on Nov. 7, 1997.

(51) Int. Cl.$^7$ ............................. H01S 3/098; G02F 1/035; H04B 10/06

(52) U.S. Cl. ....................... 359/334; 359/156; 359/187; 359/327; 250/227.11

(58) Field of Search ........................ 359/156, 181–183, 359/187, 245, 327, 334; 250/227.11, 205

(56) References Cited

U.S. PATENT DOCUMENTS

| | | | |
|---|---|---|---|
| H1791 | * 3/1999 | Williams | 385/140 |
| 3,569,715 | 3/1971 | Horning | 359/161 |
| 4,700,150 | 10/1987 | Hall et al. | 359/279 |
| 4,977,620 | * 12/1990 | Smith et al. | 356/301 |
| 5,343,324 | 8/1994 | Le et al. | 359/184 |
| 5,379,309 | 1/1995 | Logan, Jr. | 372/18 |
| 5,400,417 | 3/1995 | Allie et al. | 385/2 |
| 5,495,359 | 2/1996 | Gertel et al. | 359/245 |
| 5,532,857 | 7/1996 | Gertel et al. | 359/154 |
| 5,537,671 | * 7/1996 | Toyama et al. | 385/27 |
| 5,723,856 | * 3/1998 | Yao et al. | 359/184 |
| 5,777,778 | * 7/1998 | Yao | 359/187 |
| 5,917,179 | * 6/1999 | Yao | 250/227.11 |

OTHER PUBLICATIONS

Yao, XS; IEEE Photonics Tech Letters, vol. 10, No. 2, pp. 264–266; Abst. only Tech. Enclosed Herewith, Feb. 1998.*

Yao, S.; EOS Conf. Proc., vol. 2, pp. 17–18, Catolog No. ATCH36057; Abst. only Herewith, 1996.*

Yao, XS; IEEE Photonics Tech. Letters, vol. 10, No. 1, pp. 138–140; Abst. only Herewith, Jan. 1998.*

Izumital et al, IEEE Photonics Tech. Letters, vol. 8, No.12, pp. 1674–1676, Abst. only Herewith, Dec. 1996.*

A. Neyer and E. Voges, Hybrid Electro–Optical Multivibrator Operating By Finite Feedback Delay, Jan. 21, 1982, *Electronics Letters*.

H.M. Gibs, F.A. Hopf, D.L. Kaplan, M.W. Derstine, R.L. Shoemaker, Periodic Oscillations and Chaos in Optical Bistability: Possible Guided–Wave All–Optical Square–Wave Oscillators, 1981, *SPIE* vol. 317.

A. Neyer and E. Voges, High–Frequency Electro–Optic Oscillator Using an Integrated Interferometer, Jan. 1, 1982, *Appl. Phys. Lett.* 40(1).

(List continued on next page.)

*Primary Examiner*—Nelson Moskowitz
(74) *Attorney, Agent, or Firm*—Fish & Richardson P.C.

(57) ABSTRACT

Opto-electronic devices and techniques using Brillouin scattering to select a sideband in a modulated optical carrier signal for amplification. Two lasers respectively provide a carrier signal beam and a Brillouin pump beam which are fed into an Brillouin optical medium in opposite directions. The relative frequency separation between the lasers is adjusted to align the frequency of the backscattered Brillouin signal with a desired sideband in the carrier signal to effect a Brillouin gain on the sideband. This effect can be used to implement photonic RF signal mixing and conversion with gain, conversion from phase modulation to amplitude modulation, photonic RF frequency multiplication, optical and RF pulse generation and manipulation, and frequency-locking of lasers.

73 Claims, 36 Drawing Sheets

OTHER PUBLICATIONS

A. Neyer and E. Voges, Nonlinear Electrooptic Oscillator Using and Integrated Interferometer, May 1, 1981, *Optics Communications* vol. 37, No. 3.

A. Neyer and E. Voges, Dynamics of Electrooptic Bistable Devices with Delayed Feedback, Dec. 1982, *IEEE Journal Of Quantum Electronics*, vol. QE–18, No. 12.

H.F. Schlaak and R.Th. Kersten, Integrated Optical Oscillators and Their Applications to Optical Communication Systems, *Optics Communications* vol. 36, No. 3.

Tahito Aida and Peter Davis, Oscillation Modes of Laser Diode Pumped Hybrid Bistable System with Large Delay and Application to Dynamical Memory, Mar. 1992, *IEEE Journal Of Quantum Electroncis*, vol. 28, No. 3.

X. Steve Yao and Lute Maleki, Optoelectronic Microwave Oscillator, Aug. 1996, *J. Opt. Soc. Am.* B/vol. 13, No. 8.

X. Steve Yao and George Lutes, A High–Speed Photonic Clock and Carrier Recovery Device, May 1996, *IEEE Photonics Technology Letters*, vol. 8, No. 5.

X. Steve Yao and Lute Maleki, Converting Light Into Spectrally Pure Microwave Oscillation, Apr. 1, 1996, *Optics Letters* vol. 21, No. 7.

X. Steve Yao and Lute Maleki, Optoelectronic Oscillator for Photonic Systems, Apr. 7, 1996, *IEEE Journal Of Quantum Electronics*, vol. 32, No. 7.

X.S. Yao and L. Maleki, High Frequency Optical Subcarrier Generator, Apr. 21, 1994, *Electronics Letters Online* No.:19941033.

\* cited by examiner

MEASUREMENT OF BRILLIOUN SCATTERING POWER AND THROUGHOUT POWER

1: Beat between signal & pump carriers.
2: Beat between the -1 modulation sideband of the signal carrier & the pump carrier
3: Beat between the +1 modulation sideband of the signal carrier & the pump carrier.
4: Beat between the -2 modulation sideband of the signal laser & the pump carrier.
5: Beat between the signal carrier & the Brillouin peak..

OPTO-ELECTRONIC DEVICES AND SYSTEMS BASED ON BRILLOUIN SELECTIVE SIDEBAND AMPLIFICATION

This application claims the benefits of the U.S. Provisional Application Nos. 60/035,563, filed on Jan. 14, 1997, 60/035,564, filed on Jan. 14, 1997, and 60/064,822, filed on Nov. 7, 1997, which are incorporated herein by reference.

ORIGIN OF THE INVENTION

This invention was made in the performance of work under a NASA contract, and is subject to the provisions of Public Law 96-517 (35 U.S.C. 202) in which the Contractor has elected to retain title.

FIELD OF THE INVENTION

The present invention relates to electro-optic devices and systems, and more specifically, to photonic systems for performing selective sideband amplification, conversion from phase modulation to amplitude modulation, frequency multiplication, signal up- and down-conversion, and coherent optical signal processing.

BACKGROUND OF THE INVENTION

Acoustic waves can cause variations of the density of a medium in which they travel. The density variations can effect optical gratings. Scattering of an electromagnetic wave by such acoustic gratings in an optical medium is known as "Brillouin scattering". The frequency of the scattered electromagnetic wave in the Brillouin scattering is shifted with respect to that of the original electromagnetic wave due to the Doppler effect by the motion of acoustic waves.

Energy is exchanged in the Brillouin scattering between the optical medium and the electromagnetic wave. Depending on the relative directions of the acoustic wave and the electromagnetic wave, the frequency of the scattered electromagnetic wave may be down-shifted to a lower frequency (i.e., "Stokes shift") or a higher frequency (i.e., "anti-Stokes shift").

Stimulated Brillouin scattering ("SBS") is a nonlinear optical effect which occurs when a coherent electromagnetic wave with an intensity above a certain threshold level is used as a pump in a Brillouin scattering process. See, for example, A. Yariv, Chapter 18, Quantum Electronics, 2nd ed., 1975 (John Wiley & Sons). The nonlinear interaction of the optical medium and the coherent optical pump wave at a frequency $v_p$ generates an acoustic wave due to the electrorestrictive effect. This acoustic wave forms a moving acoustic grating in the medium which moves in the same direction of the optical pump wave. The grating scatters the pump wave.

In general, multiple scattered waves are generated by the grating. However, due to the phase-matching restraints, the strongest scattered wave is the back-scattered wave which propagates in the opposite direction of the pump wave. Thus, the frequency $v_B$ of the back-scattered optical wave from the acoustic grating is down-shifted relative to the pump wave frequency $v_p$ by $v_D=2nu_a/\lambda_p$ due to the Doppler effect, where $u_a$ is the velocity of the acoustic wave in the medium, n is the refractive index of the medium, and $\lambda_p$ is the wavelength of the optical pump wave. The remainder of the input pump wave transmits through the medium.

When the input optical power exceeds the SBS threshold, a significant portion of the input power is transferred into the back-scattered optical wave. This results in a saturation behavior in the transmitted wave, i.e., the power of the transmitted wave will no longer increase linearly with the input power. The SBS threshold is known to be linearly proportional to the spectral linewidth of the optical pump wave. Therefore, an optical pump wave with a narrow linewidth can be used to reduce the SBS threshold. For example, in many commercial silica fibers, a SBS threshold of several milliwatts may be achieved by using a pump wave at about 1.3 μm.

When a narrow-band seed signal in the opposite direction of the pump wave with the same frequency of the back scattered wave at $v_B=(v_p-v_D)$ is injected into an optical medium, the interaction between the seed signal and the pump wave can significantly enhance the acoustic grating initially induced by the pump wave. This effect, in turn, increases the back-scattering of the pump wave into the seed signal and thereby effectively amplifies the seed signal. Therefore, the influence of the seed signal converts the spontaneous Brillouin scattering into a stimulated Brillouin scattering, at a pump power much below the SBS threshold. The stimulated back scattering light adds up in phase with the seed signal. This process is known as Brillouin amplification. See, for example, G. P. Agrawal, *Nonlinear Fiber Optics*, Academic Press, San Diego (1989), Chapter 9.

Brillouin scattering and amplification in optical fibers has been investigated for optical communication applications. See, for example, Olsson and Van Der Ziel, "Characteristics of a semiconductor laser pumped Brillouin amplifier with electronically controlled bandwidth", Journal of Lightwave Technology, Vol. LT-5, No. 1, pp. 147–153 and Tang, "Saturation and spectral characteristics of the stokes emission in the stimulated Brillouin process", Journal of Applied Physics, vol. 37, pp. 2945–2955 (1966). Stimulated Brillouin processes was considered by many as unsuitable for digital fiber optical communication systems at least partially due to its narrow gain bandwidth and high spontaneous emission noise. Many conventional optical communication systems are designed with provisions to suppress the Brillouin scattering in fibers as noise.

SUMMARY OF THE INVENTION

The present invention includes a use of the Brillouin scattering in an optical medium to effect selective sideband amplification for photonic devices and systems.

One embodiment of the invention includes a first signal light source that generates an optical carrier signal, a modulator for imposing information on the carrier signal and generating sidebands around the carrier frequency, an optical medium having an electrorestrictive effect, and a second pump light source that generates an optical pump signal in the opposite direction of the carrier signal within the optical medium. The frequency of the Brillouin signal is tuned to align with a selected frequency sideband or to be near the selected sideband within the bandwidth of the Brillouin gain profile to amplify the selected sideband.

Photonic RF signal mixing can be achieved by using the Brillouin selective sideband amplification. A sideband around a carrier frequency in a carrier signal produced by a modulation of a local oscillator can be aligned with the Brillouin signal to be amplified by tuning the relative frequency between the pump light source and the signal light source. Since the down or up converted signal is the beat between the amplified local oscillator sideband and a signal sideband, the converted signal is also amplified. A conversion gain can be realized when the selectively amplified local oscillator sideband is larger than the carrier signal by the amplification. In addition, when a higher order location oscillator sideband is selectively amplified, a harmonic signal up- or down-conversion can be effected. Furthermore, the amplified sideband is automatically phase and frequency locked to the signal light source with a stability determined by the modulation driving signal.

Another aspect of the Brillouin selective sideband amplification is conversion of a phase modulation into an amplitude modulation by selectively amplifying a phase-modulated sideband. Since amplitudes of the amplified sideband and the opposite-phase counter part on the other side of the carrier signal are no longer the same, the beat signals between the symmetric sidebands and the carrier signal are only partially canceled to produce a net amplitude modulation signal. High phase-to-amplitude conversion can be achieved with this scheme due to the Brillouin gain. When a high order sideband in a phase-modulated signal is selectively amplified, a beat signal between the sideband and the carrier signal has a frequency that is a multiplication of the phase modulation frequency by a factor of the order number of the amplified sideband. This effects a frequency multiplication.

Yet another aspect of the Brillouin selective sideband amplification is pulse generation and manipulation. This may achieved, for example, by producing multiple Brillouin signals with multiple pump light sources at different wavelengths in resonance with the in-phase modulation sidebands in a carrier signal. The in-phase modulation sidebands are amplified due to the Brillouin gain and are summed to produce a pulsed signal in both optical and electrical domains. When the signal light source is a mode-locked laser and the multiple Brillouin signals overlap with certain selected laser modes, amplitudes or relative phase of the selected laser modes can be altered to change the shape of the laser pulse produced by the mode-locked signal laser.

Still another aspect of the Brillouin selective sideband amplification is frequency locking of different lasers. The average optical power of the optical signals in the direction of the Brillouin scattering signal can be used to indicate the degree of the frequency alignment between the amplified sideband and the pump beam. The average power reaches a maximum value when the alignment is perfect. Therefore, this average power can be used as an error signal to control the frequencies of the pump and the signal lasers within a range with respect to each other. In one implementation, an electrical signal separator is connected to the output of a photodetector to extract the low-frequency signal components for measuring the average optical power. A control circuit is used to control the frequency of one of the pump and signal lasers to increase or maximize the average optical power. Multiple lasers may be so stabilized with respect to a reference laser.

One advantage of the invention is that only the selected sideband is amplified due to the narrow bandwidth of the Brillouin scattering signal (e.g., about 10 MHZ in fibers). This makes the system energy efficient since the pump power is not converted into the carrier signal and other sidebands. In addition, this also avoids the saturation of the optical amplifier and the receiving photodetector.

Another advantage is that the Brillouin scattering signal can be tuned by changing either the signal or the pump frequencies to select any desired sideband in the carrier signal.

Another advantage of the invention is the selectively amplified sideband is automatically phase and frequency locked to the signal laser.

Furthermore, the device and system implementation of the invention is structurally simple and provides flexibility in many applications, and in particular, for fiber-based photonic systems.

These and other aspects and advantages of the present invention will become more apparent in light of the following detailed description, the accompanying drawings, and the appended claims.

DETAILED DESCRIPTION OF THE INVENTION

The present invention as disclosed herein may be practiced with any optical medium that is suitable for the Brillouin scattering and applications. A number of optical materials are known in the art for use in the Brillouin scattering, including materials in gaseous, aqueous and solid state phases. $CS_2$ and certain glasses are such examples. Optical waveguides and fibers may be the preferred optical media for optical communication applications. Other applications may use other suitable optical materials in implementation of the invention.

The following description will use examples based on Brillouin scattering in optical fibers to illustrate the invention and the particularities of the examples should not be construed as limitations.

1. Brillouin Selective Sideband Amplification

An optical signal in many optical communication systems typically includes an optical carrier signal and lower and upper modulation sidebands. In detection, the received signal in a photo detector is usually the beat between the carrier and the sidebands. The carrier signal in general does not contain information and only the sidebands carry the useful information. Since the sidebands are usually much weaker than the carrier signal, it is desirable to amplify the sidebands in many applications.

An conventional optical amplifier, such as a semiconductor optical amplifier ("SOA"), an $Er^+$ doped fiber amplifier ("EDFA"), or a fiber Raman amplifier, may be used to amplify the signal. A common feature of the conventional amplifier is that both the strong carrier signal and the weak sidebands are amplified. Such amplification is not efficient because much energy is needed to amplify the already strong carrier signal. In addition, the amplified strong carrier signal may saturate the optical amplifier, resulting in insufficient amplification of the weak sidebands. Furthermore, the amplified strong carrier signal may saturate the photo detector, further limiting the amplification of the information-carrying sidebands.

One aspect of the invention is the concept of Brillouin Selective Sideband Amplification ("BSSA"). The narrow bandwidth of Brillouin amplification is used advantageously to selectively amplify one or more desired sidebands and to leave the strong carrier essentially unchanged.

Figure 1A:
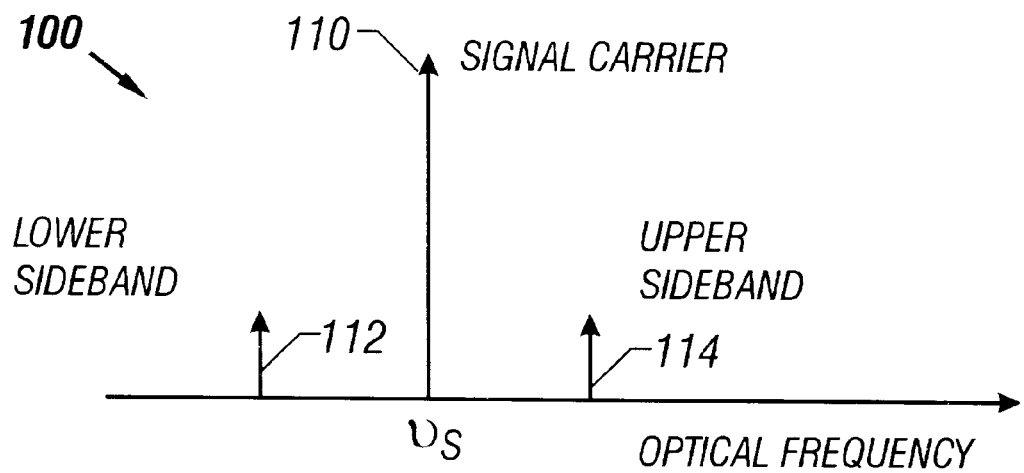
FIG. 1A is a diagram showing a typical spectrum of an RF signal imposed on an optical carrier.
Figure 1B:
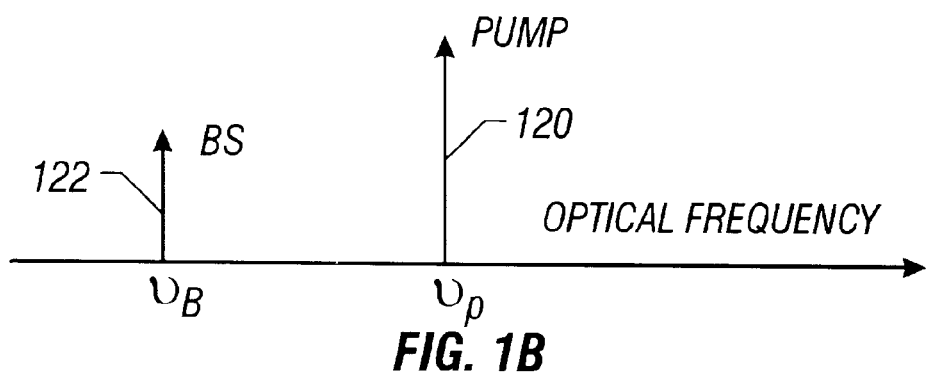
FIG. 1B is a spectrum diagram showing the frequencies of a pump signal and the down-shifted Brillouin scattering signal.

The Brillouin selective sideband amplification is illustrated in FIGS. 1A and 1B. FIG. 1A shows the spectrum of an exemplary optical signal 100 in a communication system. The optical signal 100 includes a strong carrier signal 110 at a carrier signal frequency $v_s$ and two sidebands 112 and 114 located on each side of the carrier signal. The sidebands 112 and 114 are produced by modulation of the carrier signal 110. An RF modulation scheme is typically used in modulating the carrier signal 110, which may have a modulation frequency ranging from the radio frequencies to millimeter wave frequencies. According to the invention, the BSSA process can be used to select only the lower sideband signal 112 for amplification by overlapping the Doppler-shifted back scattered Brillouin wave with the lower sideband signal 112. FIG. 1B shows that a back scattered Brillouin wave at $v_B$ produced by scattering of a pump wave at $v_P$ in an optical medium is tuned to overlap with the lower sideband 112. The energy of the pump beam 120 is transferred into the lower sideband signal 112 by coupling between the back scattered Brillouin wave 122 and the lower sideband signal 112. Such a scheme is efficient because essentially all Brillouin scattering energy in the back scattered Brillouin wave 122 from the pump laser 120 goes into the desired weak sideband 112. Furthermore, because the strong carrier 110 is not amplified, the saturation of the receiving photo detector can be avoided.

Figure 2:
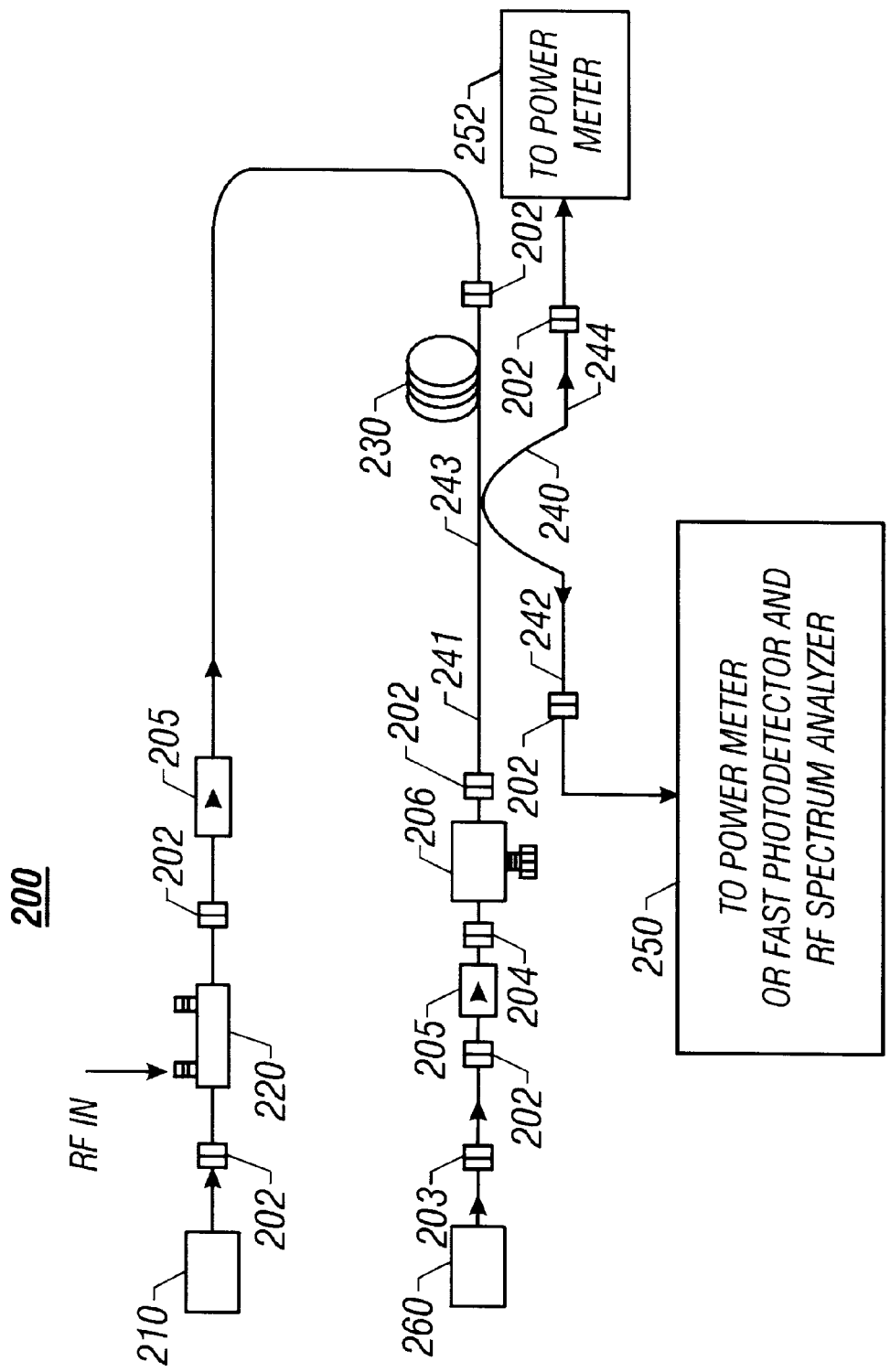
FIG. 2 is a diagram showing one embodiment of a photonic system that implements the Brillouin selective sideband amplification of the invention, where the frequency of one of the sidebands coincides with the frequency of the Brillouin scattering.

FIG. 2 shows a photonic system 200 that implements the above Brillouin selective sideband amplification. The system 200 includes a signal laser 210 which produces the optical carrier signal, an optical modulator 220 that modulates the carrier signal to produce information-bearing sidebands, an optical medium 230 which is shown as optic fiber, and a pump laser 260 that produces a pump wave for producing the Brillouin scattering. The optical carrier signal and the pump wave propagate in opposite directions and overlap with each other within the optical medium 230.

The system 200 as shown in FIG. 2 is implemented as a fiber-based system. Both lasers 210 and 260 operate at wavelengths within the transmission spectral range of the fiber used. For example, lasers near 1.3 µm may be used for silica fibers. The lasers 210 and 260 in general may be any laser, including but not limited to solid-state lasers, diode lasers, and diode-pumped solid-state lasers. The optical modulator 220 may be any modulator capable of imposing an RF modulation on the optical carrier signal by either phase modulation or amplitude modulation (e.g., a Mach-Zehnder modulator). Preferably, an electro-optic modulator may be used, such as a LiNbO$_3$ modulator. Alternatively, the optical modulator 220 may be eliminated and the laser output may be directly modulated by a varying current or a voltage (e.g., in the case of a diode laser). An optical fiber coupler 240 may be used in the fiber medium 230 to obtain signals for diagnosis and data extraction. A terminal 242 may be used to detect either the back scattered Brillouin scattering signal or the optical carrier signal. Another terminal 244 of the coupler 240 may be used to monitor the power of the pump laser 260.

It is desirable to reduce or minimize optical reflections other than the Brillouin back scattering in the photonic system 200. This may be achieved by, as shown in FIG. 2, using anti-reflection interfacing devices such as fiber-to-fiber and fiber-to-air interface angle polished connectors 202 ("FC/APC"). An interface connector with index-matched gel 203 may also be used. Furthermore, optical isolators 205 can be used to reduce or minimize the amount of light from entering the lasers 210 and 260.

Figure 3A:
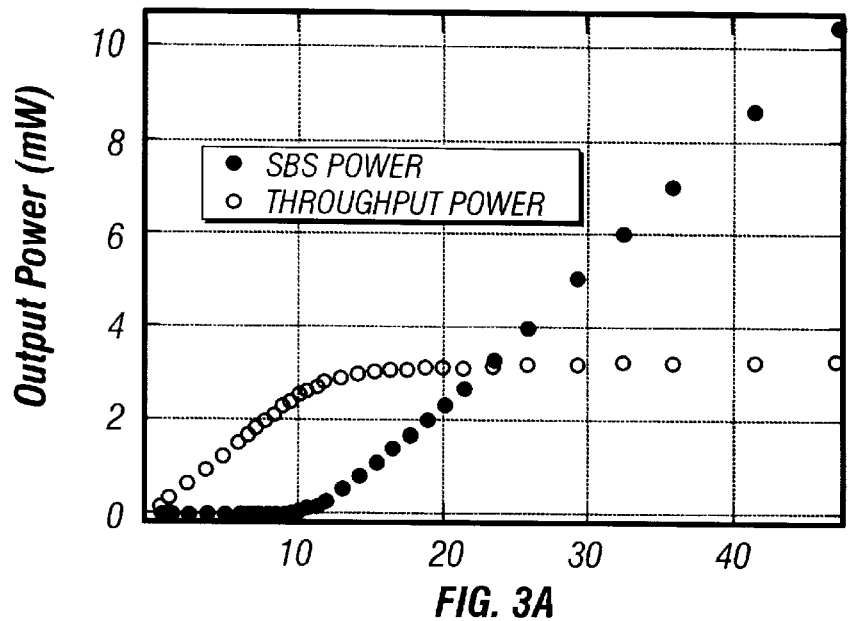
FIGS. 3A and 3B are charts showing measured Brillouin signal and the transmission of the pump signal in a fiber.
Figure 3B:
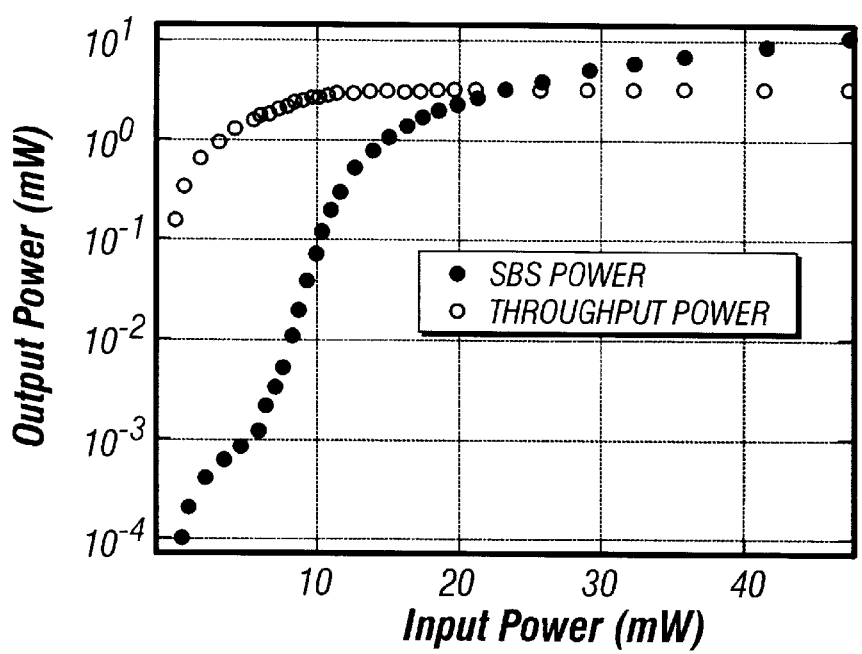
Figure 4A:
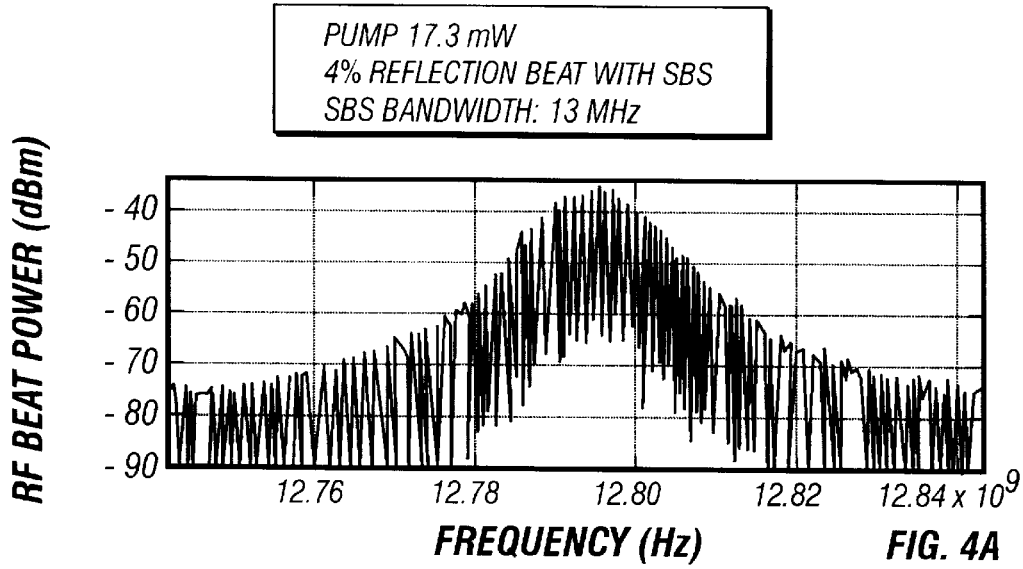
FIGS. 4A, 4B, 4C, 4D and 4E are charts showing the measured spectrum of the beat signal between the Brillouin scattering signal and the pump beam at various pump power levels.
Figure 4B:
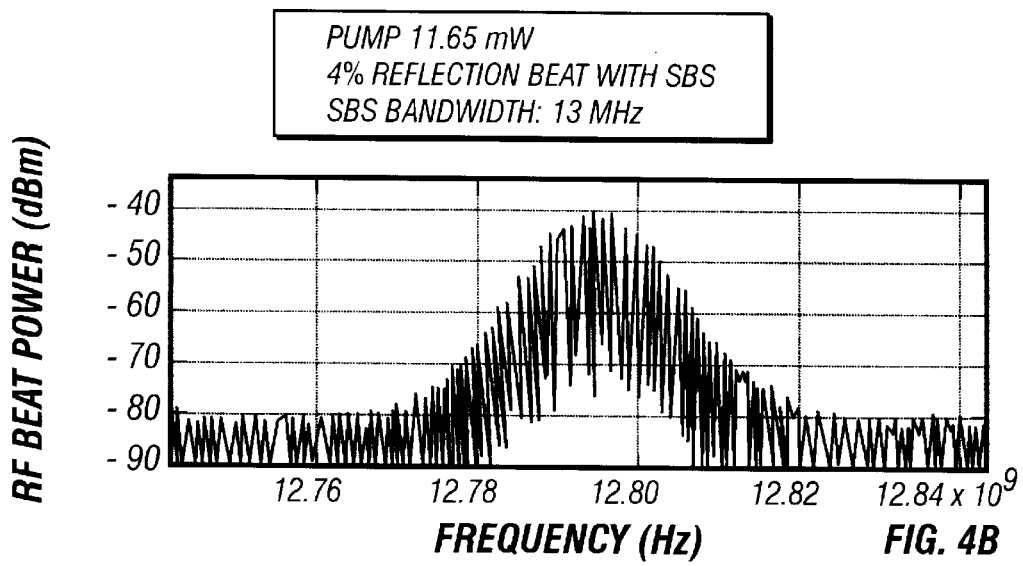
Figure 4C:
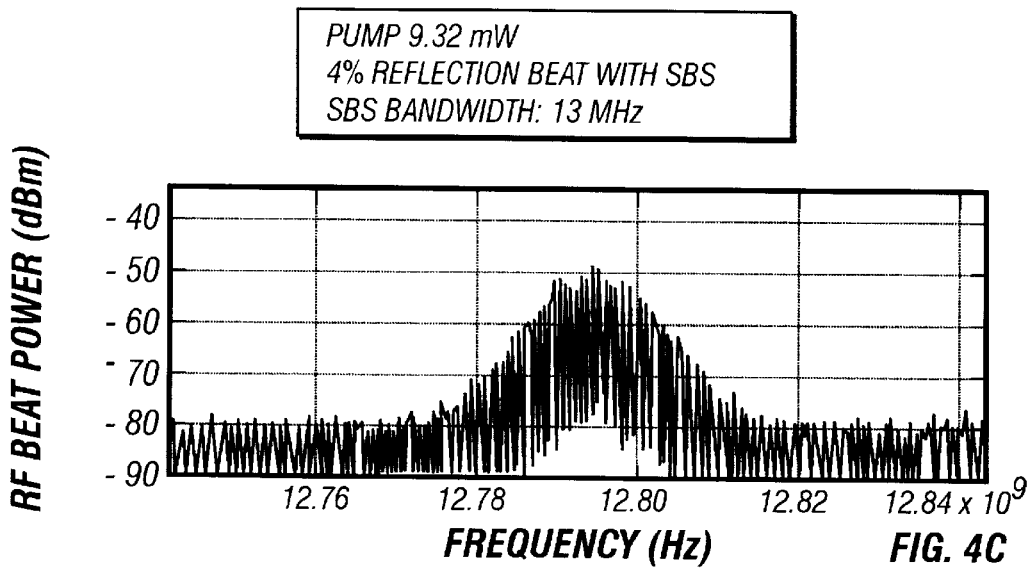
Figure 4D:
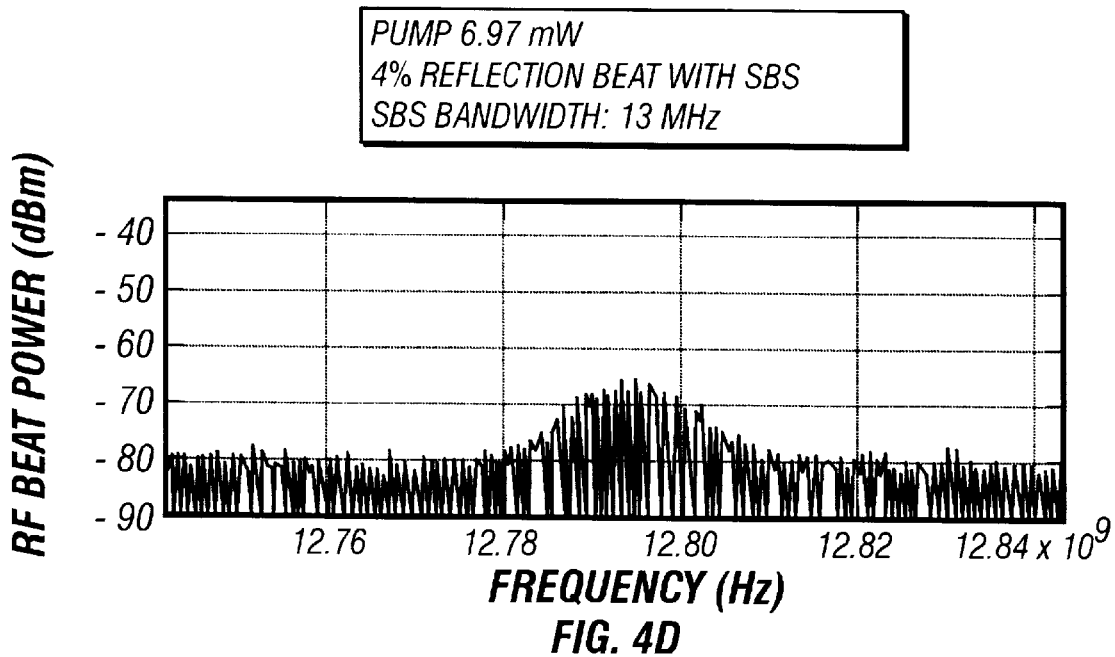
Figure 4E:
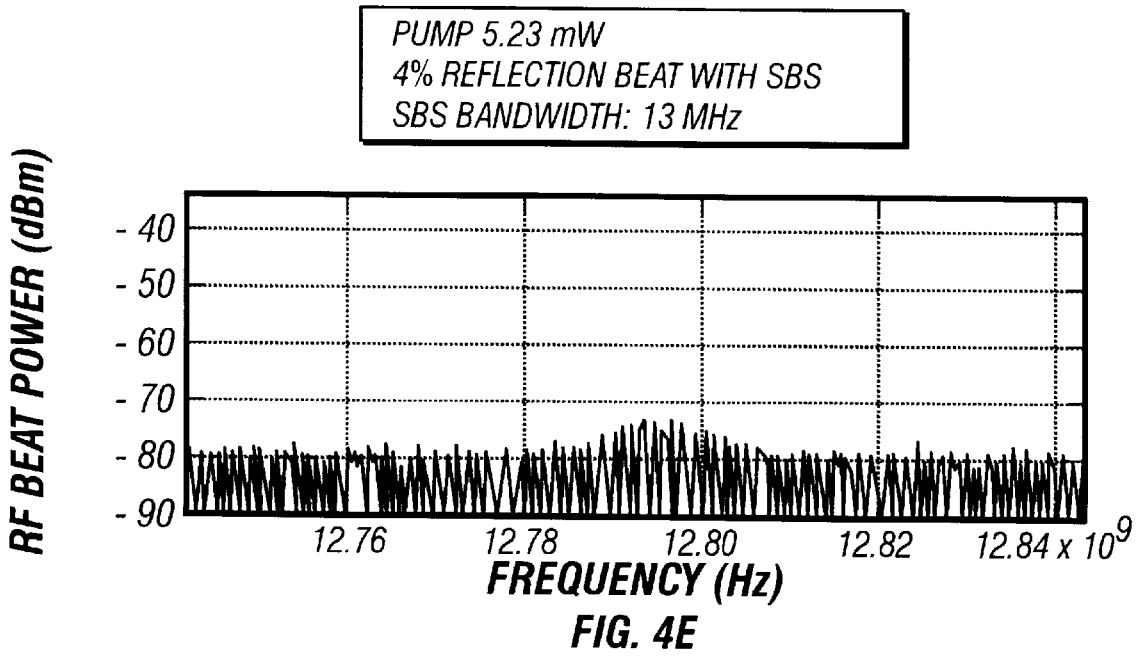

Measurements were performed in the system 200 by using two diode-pumped YAG lasers at 1320 nm as the lasers 210 and 260 and a silica fiber of 12.8 km in length. FIGS. 3A and 3B show the back-scattered Brillouin signal (solid dots) and the transmitted pump signal (circles) as a function of the input pump power from the pump laser 260 with FIG. 3B further showing the measured data at low input pump power. The signal laser 210 was turned off. The Brillouin scattering signals were measured at the terminal 242 of the coupler 240 using the power meter 250. An optical power meter was connected at the fiber connector between the fiber loop 230 and the optical modulator 220 to measure the throughput power of the fiber loop 230. At low pump power below 10 mW, the backscattered Brillouin effect is small (FIG. 3B) and the signal is resulted from spontaneous emission. The transmitted pump signal increases linearly with the input pump power. Above a threshold power level approximately at 10 mW, the stimulated Brillouin scattering becomes dominant, the backscattering Brillouin signal exhibits a nearly linear dependence on the pump power and the transmitted pump power is saturated. Thus, most of the pump power above the threshold power level is transferred into the backscattered Brillouin signal. This provides an efficient energy coupling between pump wave and the SBS signal.

FIGS. 4A–4E show the measured spectrum of the beat between the Brillouin scattering signal and the pump signal at various pump power levels. An approximately 4% of reflection was introduced at port 242 so that some of the power form the pump laser 260 went into port 242. The spectrum was measured with a fast photodetector and a RF spectrum analyzer. The measurements were achieved by beating the Brillouin scattering signal with the pump signal from the pump laser 260. The peak of the spectra is at about 12.8 GHZ and the 6-dB optical bandwidth is about 13 MHZ. The data indicates that the frequency of the Brillouin scattering is shifted from the pump signal by about 12.8 GHZ and has a 3-dB optical bandwidth of about 13 MHZ. It is observed that the linewidth and the frequency of the Brillouin scattering signal is substantially independent of the pump power.

When the signal laser 210 is turned on, the Brillouin selective sideband amplification can be observed and measured. One important condition is that the frequency of the desired sideband and the frequency of the Brillouin scattering signal overlaps with each other or are separated by an amount less than the bandwidth of the Brillouin gain profile. This desirable condition may be achieved by several methods depending on the specific requirements of an application. One technique tunes the frequency $v_p$ of the pump wave from the laser 260 to shift the frequency $v_B=(v_p-v_D)$ of the Brillouin scattering signal in order to overlap with the desired sideband for amplification. This may be done by directly tuning the laser or using a frequency-shifting device such as an acousto-optic device. Another technique adjusts the RF modulation frequency of the optical modulator 220 to match the frequency of the sideband to the frequency $v_B$ of the Brillouin scattering signal. The frequency of the signal laser 210 may also be tuned to change the carrier signal frequency $v_s$ so that the frequency of the sideband matches the frequency $v_B$. Furthermore, any combination of the above techniques can be used.

Figure 5A:
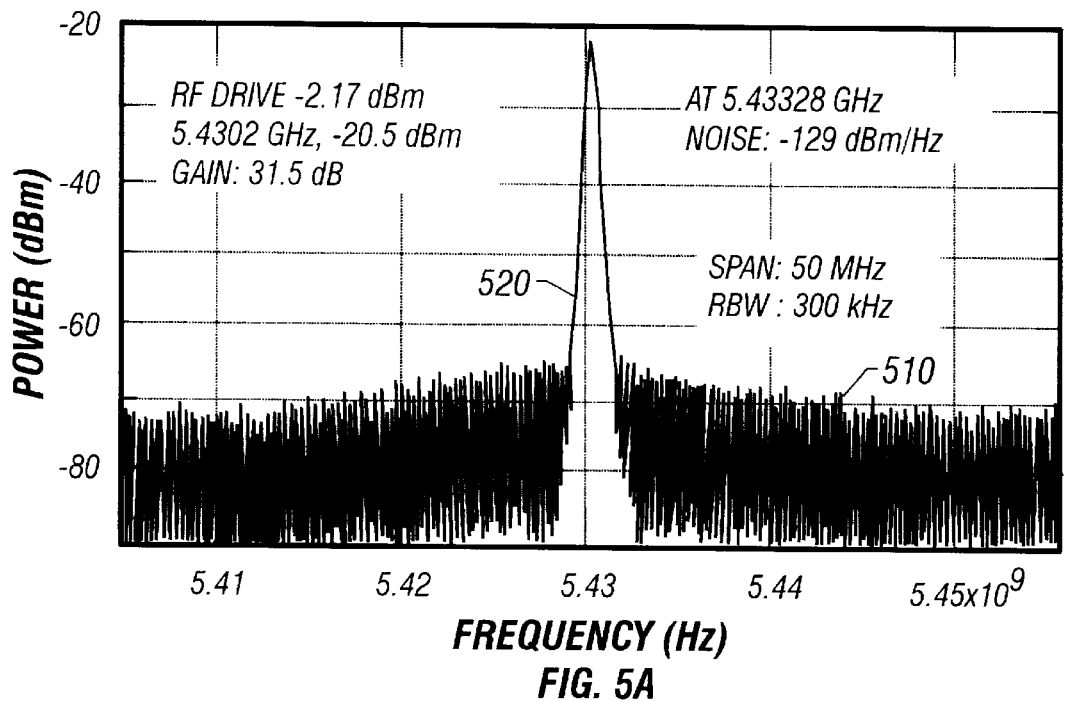
FIG. 5A is a chart showing the measured Brillouin scattering signal by using the system in FIG. 2 when a desired sideband is aligned with the frequency of the Brillouin scattering signal.
Figure 5B:
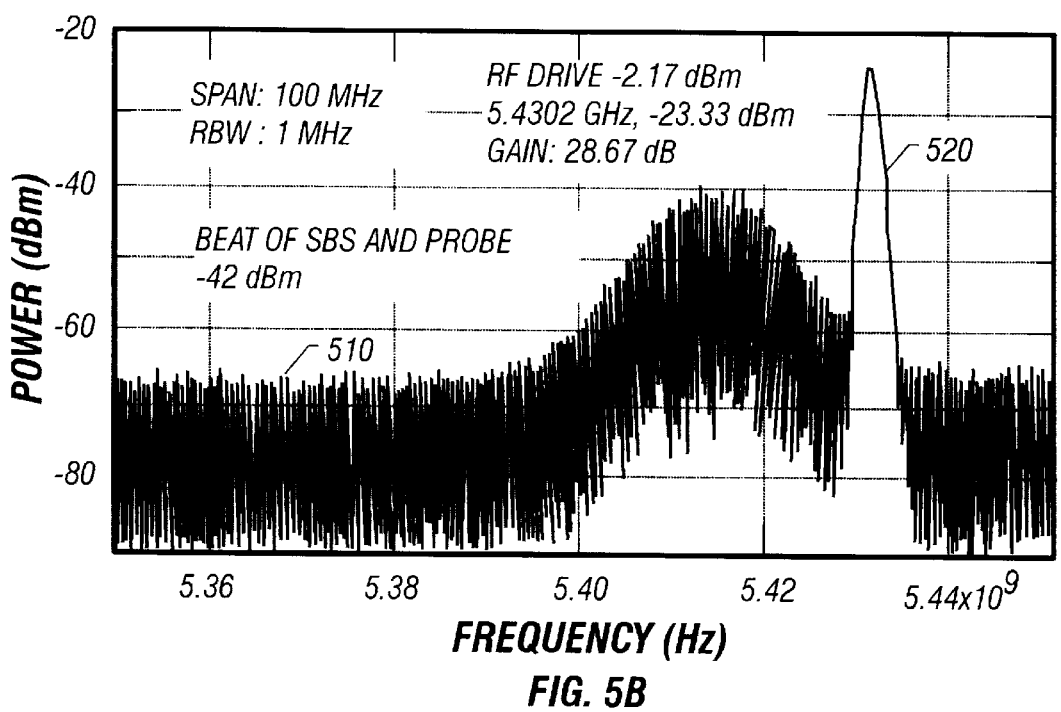
FIGS. 5B, 5C and 5D are charts showing reduced Brillouin scattering signal as the desired sideband is tuned away from the frequency of the Brillouin scattering signal.
Figure 5C:
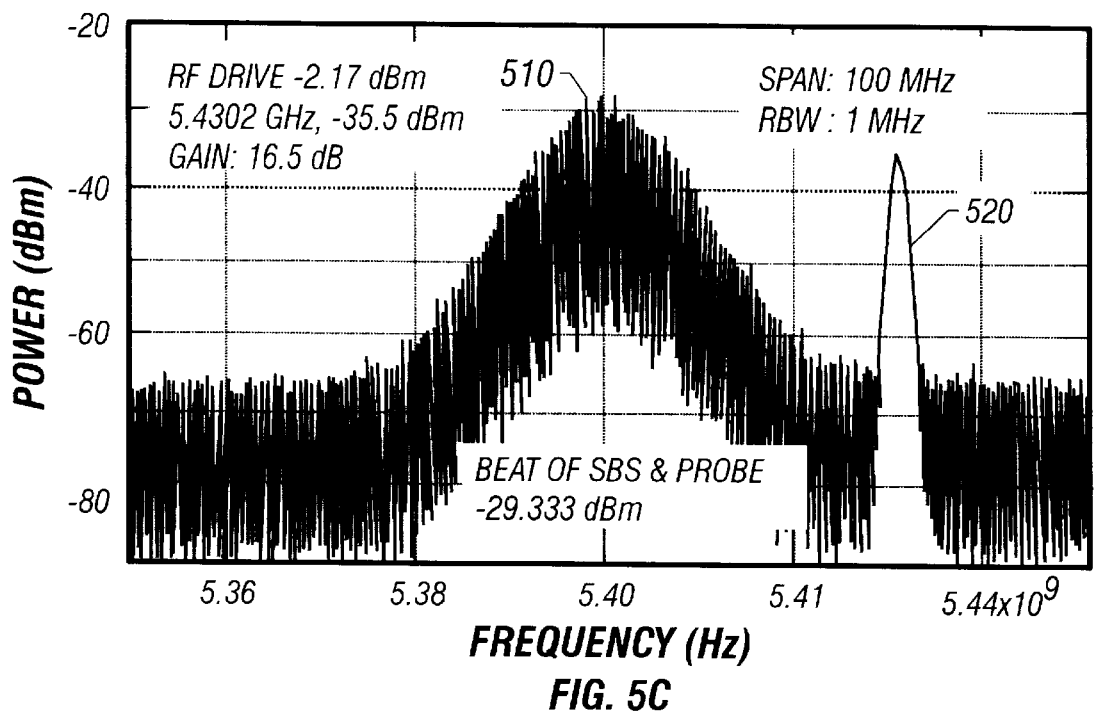
Figure 5D:
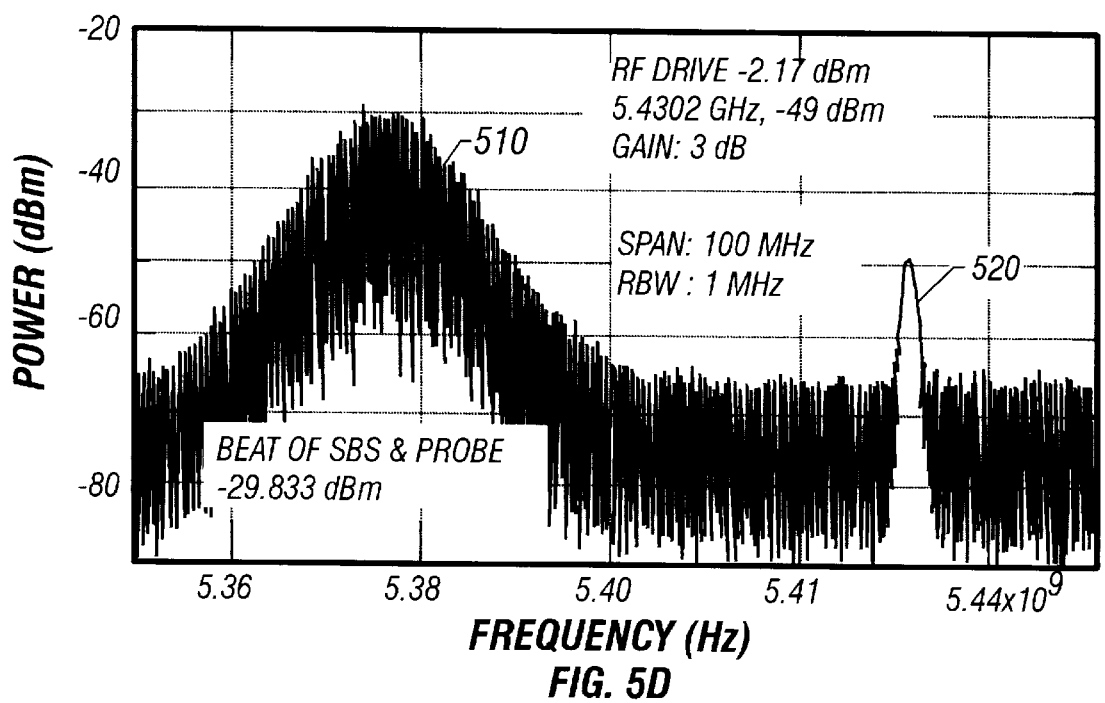

FIG. 5A shows the measured RF signal by using the system 200 when a desired sideband overlapped with the frequency of the Brillouin scattering signal. The broad peak 510 of about 10 MHZ is the beat signal between the signal carrier and the Brillouin scattering signal. The width of that signal essentially represents the Brillouin gain bandwidth. The clean and narrow peak 520 is the received RF signal or the beat of the signal carrier and the RF modulation sidebands. When the lower sideband of the RF signal is aligned with the Brillouin scattering peak, it is amplified with a gain of more than 30 dB. When the Brillouin scattering peak is tuned away from the sideband, the amplification diminishes gradually as evident in FIGS. 5B, 5C, and 5D.

Figure 6A:
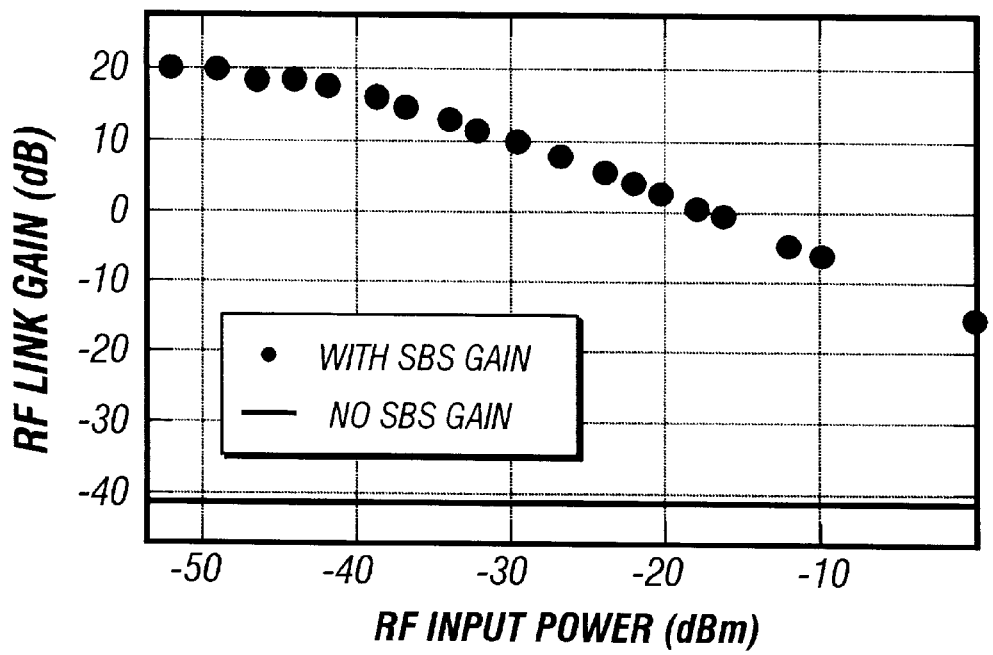
FIG. 6A is a chart showing RF link gain as a function of RF input power to the modulator using the system of FIG. 2.

A useful parameter for characterizing the system 200 is the RF link gain which is the ratio between the RF output power from a photo detector at the terminal 242 of the coupler 240 and the RF input power to the optical modulator 220. The measured RF link gain as a function of RF input power for the system 200 is shown in FIG. 6A. With a pump power of about 12.23 mW, a small signal RF link gain of more than 20 dB at 5.5 GHZ was achieved. As a comparison, the RF link loss without Brillouin selective sideband amplification is about −41 dB. This accounts for a total RF signal amplification of about 61 dB.

Figure 6B:
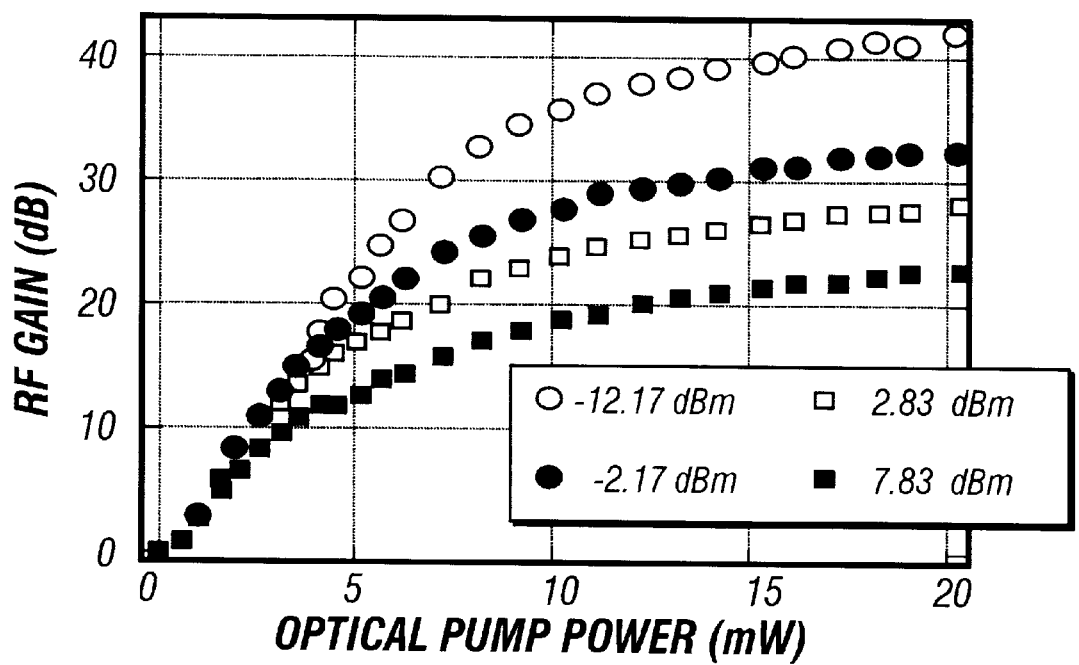
FIG. 6B is a chart showing the gain of RF signals as a function of the optical pump power for different RF input powers to the modulator.

FIG. 6B further shows the RF signal gain versus optical pump power for different RF input levels. It is evident that a substantial gain of the RF signals can be achieved even when the optical power is much less than the SBS threshold. At high pump powers, the gain also saturates. Part of the observed gain saturation may be due to the photo detector saturation.

The above measurements illustrate several advantages of the Brillouin selective sideband amplification ("BSSA"). For example, the amplification in general is efficient and requires low pump power. A distributed feedback diode laser with a few milliwatts output power can be sufficient to achieve adequate signal amplification. This is much less expensive to implement than an EDFA or an SOA. The gain bandwidth is narrow. This is advantageous for the efficient selective sideband amplification. The gain of the weaker sideband signal is generally higher than the gain of a stronger sideband signal. Although this amplification is accompanied by higher amplifier noise due to the spontaneous Brillouin scattering, the stimulated emission dominants and depletes the energy that may otherwise be converted to spontaneous Brillouin scattering if the initial sideband signal is sufficiently strong. For an externally modulated link, measurements show that the amplifier noise becomes insignificant if the input RF signal is sufficiently strong to limit the RF gain to less than about 30 dB. It can be further shown that the BSSA gain saturates for large signals with a fast response time. As in an SOA, this fast gain saturation will generate intermodulation products and distort the signal. Despite the disadvantages, there are many applications in which the advantages of the Brillouin amplification can be fully utilized, while its limitations can be circumvented, such as in the applications disclosed below.

2. Photonic RF Signal Mixing with Brillouin Gain

RF signal up- and down-conversions using photonic RF techniques are attractive alternative to the conventional RF conversion techniques. One advantage is that the photonic RF conversion has virtually infinite isolation between the local oscillator (LO), radio frequency (RF), and intermediate frequency (IF) ports. Another advantage is that the single-stage conversion from RF to IF or from IF to RF can be achieved no matter how large the IF and RF frequencies differ from each other.

Photonic mixing has been demonstrated by using two cascaded Mach-Zehnder electro-optic amplitude modulators. See, for example, Gopalakrishnan et al. "Microwave-Optical Mixing in LiNbO3 Modulators," IEEE transactions on Microwave Theory and Technologies, Vol. 41, No. 12, pp. 2283–2391 (1993). One of the modulators is driven by the LO and the other modulator is driven by the RF signal. The beating between the optical carrier and the RF modulation sidebands in the photo detector converts the signal back to electrical domain, while the beating between the LO modulation sidebands and the RF modulation sidebands in the photo detector produces the down and up converted signals.

Figure 7A:
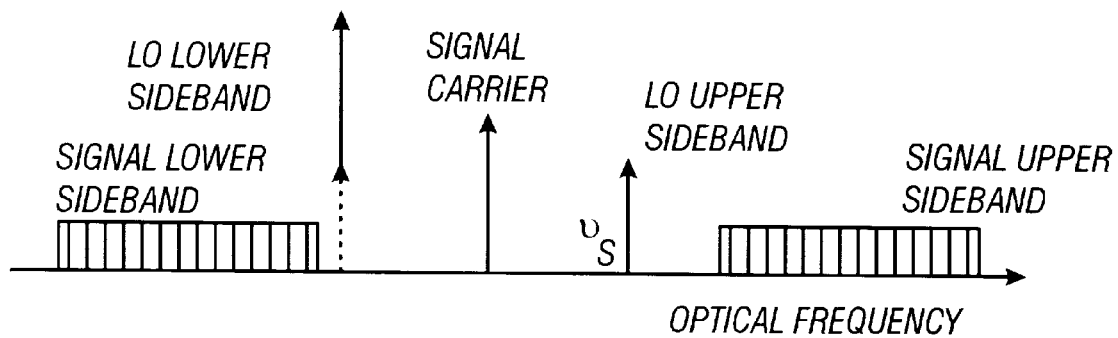
FIGS. 7A and 7B are spectrum diagrams showing the photonic signal mixing with Brillouin gain in which one of the LO modulation sidebands that is aligned with the Brillouin frequency can be selectively amplified.
Figure 7B:
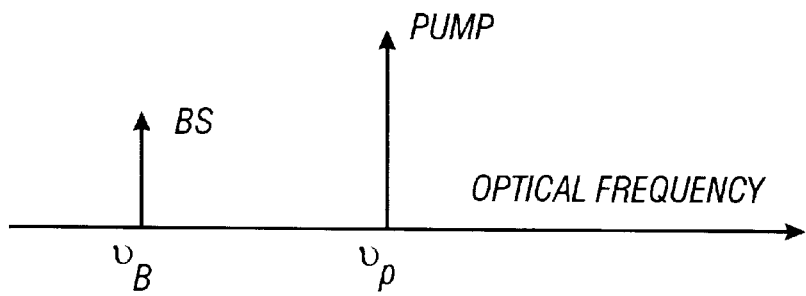

The Brillouin selective sideband amplification ("BSSA") can be used to achieve a novel photonic RF mixing with gain of the local oscillator modulation sidebands (often not information-bearing) and RF signal sidebands (usually information-bearing). Brillouin amplification can be used to significantly increase one of the LO modulation sidebands that is aligned with the Brillouin frequency. This technique is illustrated in FIGS. 7A and 7B wherein the lower LO modulation sideband is amplified. The down converted signal involves the beat between the lower LO sideband and the lower RF sideband. Thus, amplification of the lower LO sideband increases the down-converted signal. Similarly, since the up-converted signal involves the beat between the lower LO sideband and the upper RF sideband, the amplification of the lower LO sideband will cause the up converted signal to be amplified. When the LO sideband is amplified to be larger than the carrier signal, a net gain in the conversion is achieved.

The above signal mixing based on Brillouin amplification is independent of the bandwidth of the RF signal in spite of the narrow bandwidth of the Brillouin amplification. This is because only the single tone LO sideband band is amplified. Therefore, using Brillouin amplification for signal mixing can avoid the shortfall of its narrow amplification bandwidth. Alternatively, the RF signal sideband may be amplified instead of LO to achieve the same IF amplification but the signal bandwidth will be limited by the Brillouin amplification bandwidth.

It should also be noticed that because only one of the LO sidebands (i.e., a single tone) is amplified, the intermodulation distortion from the gain saturation can be avoided.

Moreover, the strong optical power in the LO sideband of the RF photonic system can effectively saturate the Brillouin gain and greatly suppress the spontaneous emission noise.

Therefore, many shortcomings of the Brillouin amplification such as narrow gain bandwidth, nonlinearity from gain saturation, and high spontaneous emission noise, can be avoided by using the above signal mixing technique.

A device implementation of the above signal mixing technique can be similar to the system 200 for signal amplification in FIG. 2 except that an extra input port is needed in the optical modulator 220 for the LO input from the local oscillator. Alternatively, a second optical modulator may be disposed in series with the modulator 220 to superimpose the LO signal onto the RF modulated carrier signal beam.

Figure 8A:
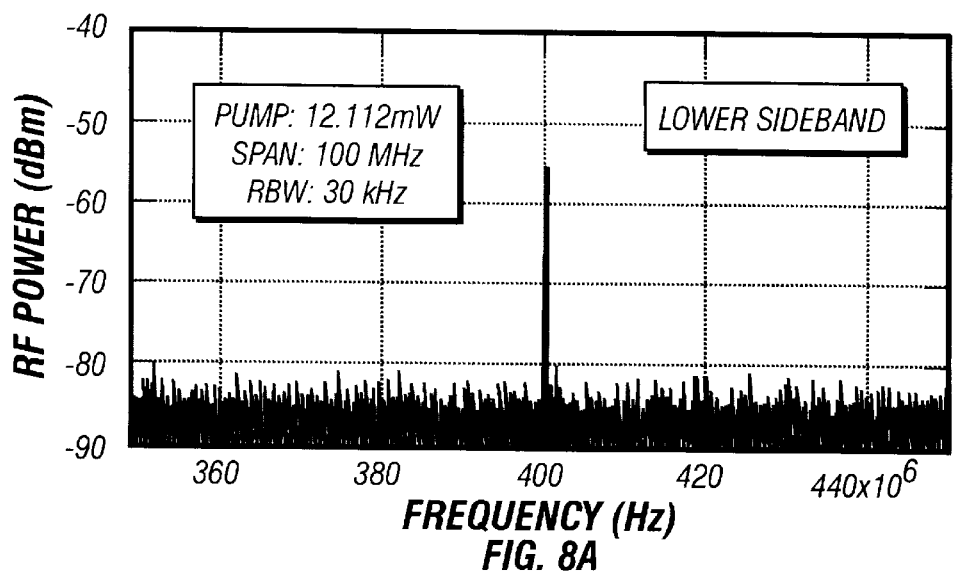
FIGS. 8A, 8B, and 8C are charts showing measured data for photonic signal mixing by the Brillouin selective sideband amplification.
Figure 8B:
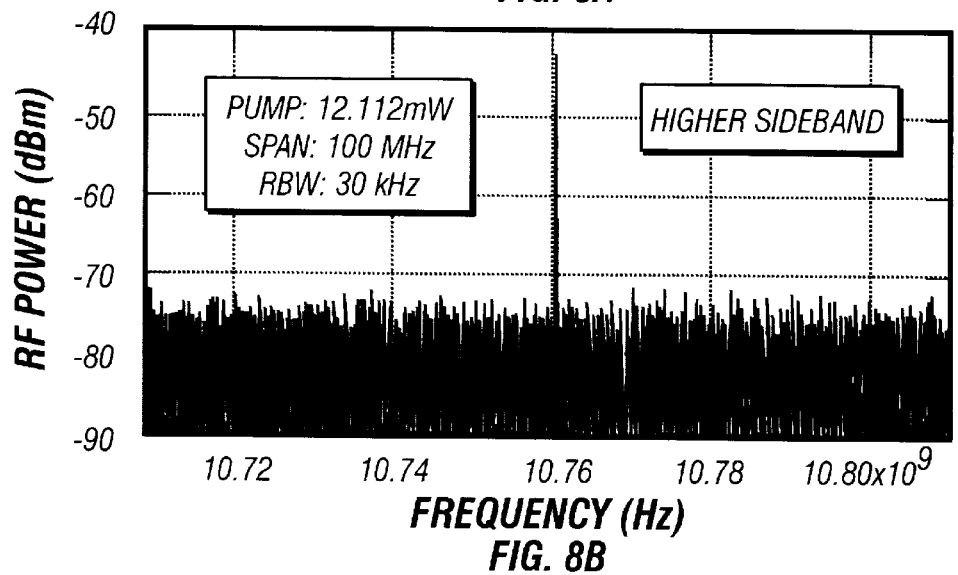
Figure 8C:
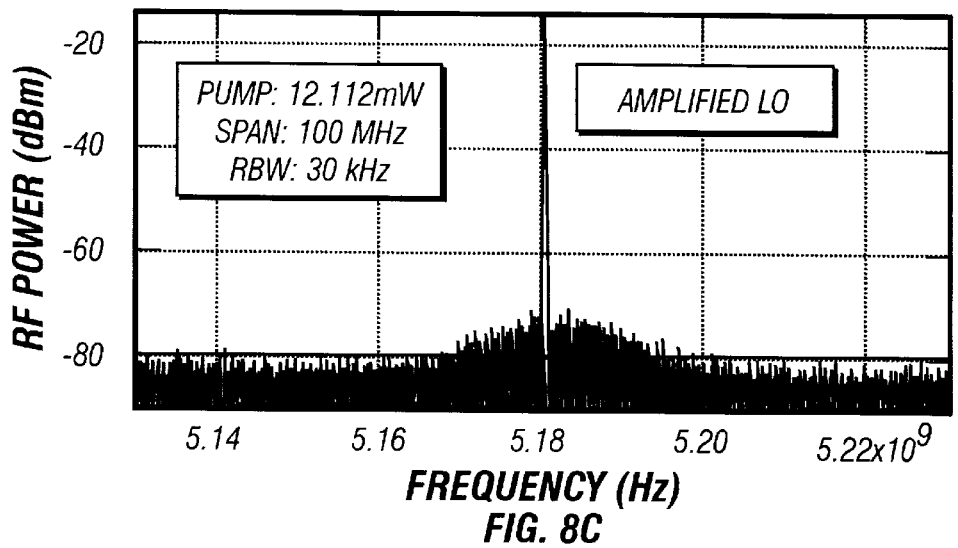

In one embodiment, the electro-optical modulator 220 for this implementation has two independent RF input ports with a mutual isolation of more than 40 dB. FIGS. 8A–8C show the measurements. An LO signal at a level of about 4.83 dBm at 5.18 GHZ was injected into one of the port and an RF signal of −5 dBm at 5.5873 GHZ was injected into the other port. The electro-optical modulator was biased at 50% of the transmission peak. Without the Brillouin amplification, the total optical power at the detector at the terminal 242 of the coupler 240 was about 0.314 mW, the received LO signal was about −40 dBm (electrical), and the received RF was about −52 dBm. At an optical pump power of 12.112 mW, the Brillouin amplification increased the total optical power at the detector to 2.61 mW and increased the LO power to −15 dBm (electrical). The received down converted signal is −40 dBm and the up converted signal is −42 dBm, resulted in a down-conversion gain of 12 dB and up-conversion gain of 10 dB. The spectra of the down converted signal, up converted signal, and the amplified LO are shown in FIGS. 8A, 8B, and 8C, respectively. BSSA-assisted Photonic signal mixing can also be accomplished by using other setups as shown in FIGS. 13A, 13B, 15A, and 15B, as will be described below.

3. Conversion from Phase Modulation to Amplitude Modulation

Efficient and stable conversion of phase modulation ("PM") to amplitude modulation ("AM") is a critical aspect of a system employing phase modulation scheme since the phase-modulated signal needs to be converted into amplitude modulation in order to be received by photodetctors for further processing. Many techniques for converting the phase modulation to amplitude modulation use either the homodyne scheme in which a phase modulated optical carrier is made to beat with an unmodulated optical carrier of the same frequency, or the heterodyne scheme in which the phase modulated optical signal is made to beat with another optical carrier of different frequency.

For example, the Mach-Zehnder modulator can be used to implement the homodyne scheme. An optical carrier is first split into two channels. One channel is then phase modulated. The modulated channel and the unmodulated channel finally combines in the photo detector to produce a amplitude modulation caused by interference of the two channels.

Figure 9A:
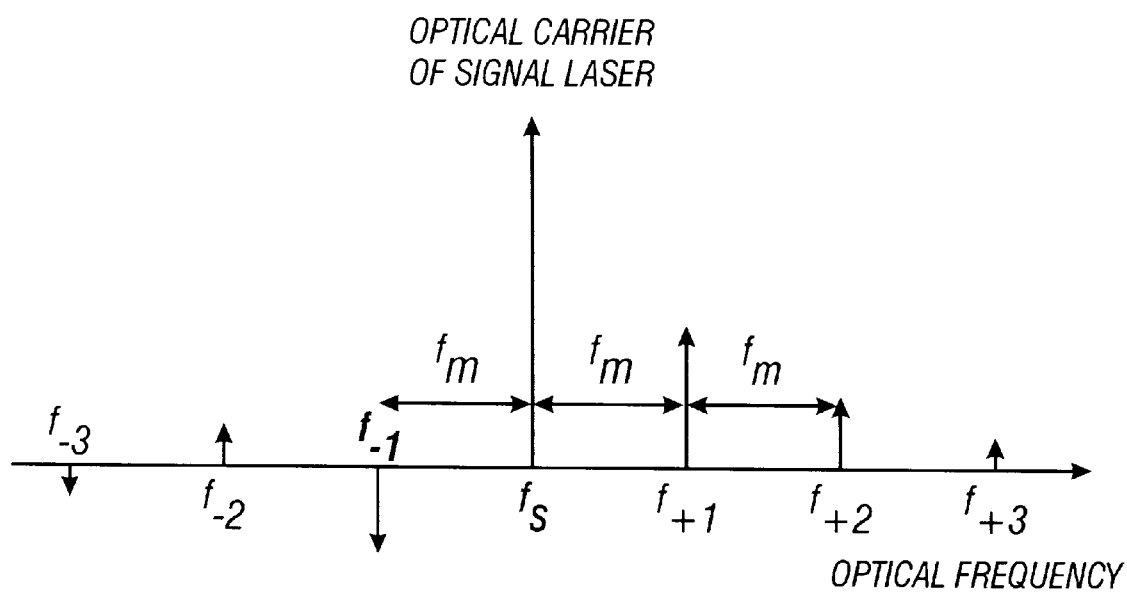
FIG. 9A is a spectrum chart showing the symmetric phase-modulated sidebands in a carrier signal.

Phase modulation of an optical carrier can introduce multiple sidebands. For example, a sinusoidal phase modulation at a modulation frequency $f_m$ with a phase modulation depth $\delta$ applied on a sinusoidal signal $A\cos(2\pi f_s t)$ can be represented by the following:

$$E = A\cos[2\pi f_s t + \delta\sin(2\pi f_m t)]$$

$$A\cos[J_0(\delta)\cos(2\pi f_s t) +$$

$$J_1(\delta)\cos(2\pi(f_s + f_m)t) - J_1(\delta)\cos(2\pi(f_s - f_m)t) +$$

$$J_2(\delta)\cos(2\pi(f_s + 2f_m)t) + J_2(\delta)\cos(2\pi(f_s - 2f_m)t) +$$

$$J_3(\delta)\cos(2\pi(f_s + 3f_m)t) - J_3(\delta)\cos(2\pi(f_s - 3f_m)t) + \ldots],$$

where $J_n(\delta)$ is nth-order Bessel Function (n=0, 1, 2, . . . ). The sidebands generated by the phase modulation are symmetric with respect to the carrier signal at $f_s$. In particular, the two symmetric sidebands in an odd order are phase shifted by $\pi$ relative to each other. This is illustrated in FIG. 9A. The sidebands beat with the carrier and beat with each other. However, because of the phase and amplitude relationship of the sidebands, each beat signal has a corresponding beat signal which has the same amplitude and frequency shift relative to the carrier signal $f_s$ but in the opposite direction with an opposite phase. Such a pair of symmetric sidebands cancels each other and therefore produces no net amplitude modulation. Amplitude modulation may rise if this perfect balance is broken.

The above-described Brillouin selective sideband amplification ("BSSA") technique can be used to efficiently convert a phase-modulated signal into an amplitude-modulated signal by providing a selective sideband amplification. The amplification of a single or multiple sidebands can cause breakdown of the perfect amplitude balance of sidebands of a phase modulation. This unbalanced amplification can be used to convert the phase modulation to an amplitude modulation. Such converted amplitude modulation can be highly stable and insensitive to the fluctuations in the carrier frequency $f_s$, the temperature, and the fiber length. In addition, the conversion is highly efficient due to the Brillouin gain obtained by the sidebands.

Figure 9B:
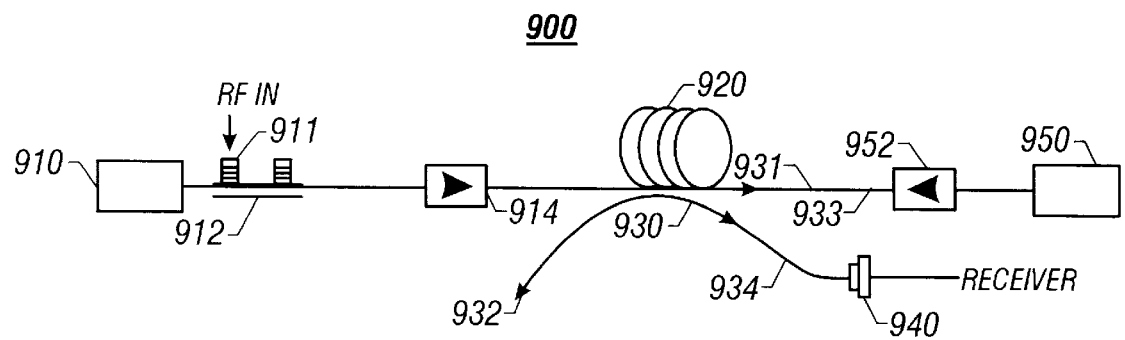
FIG. 9B is a diagram showing one embodiment of the photonic system for conversion from phase modulation to amplitude modulation.

FIG. 9B shows one embodiment of a modulation conversion device. A signal laser 910 produces a laser beam as the carrier signal and an optical phase modulator 912 performs a phase-modulation on the carrier signal to impose RF sidebands. Alternatively, the output laser beam from the signal laser 910 may be directly modulated by applying a varying control electrical signal. The optical signal is injected into an optical medium 920 suitable for Brillouin scattering. A pump laser 950 produces a pump wave that overlaps with the phase-modulated carrier signal in the medium 920 but propagates in the opposite direction. The embodiment of FIG. 9B shows a fiber-based device in which the medium 920 is optic fiber and an optical coupler 930 is implemented to couple optical signals from the medium 920. At a terminal 934 of the coupler 930, a photo receiver 940 is disposed to receive the converted amplitude-modulated RF signal.

Figure 9C:
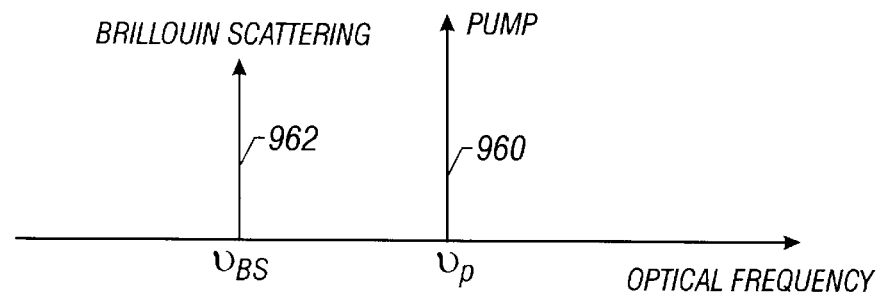
FIGS. 9C and 9D are spectra showing frequencies of the pump laser, Brillouin signal, and the selectively amplified phase-modulated sideband for phase-to-amplitude modulation conversion.
Figure 9D:
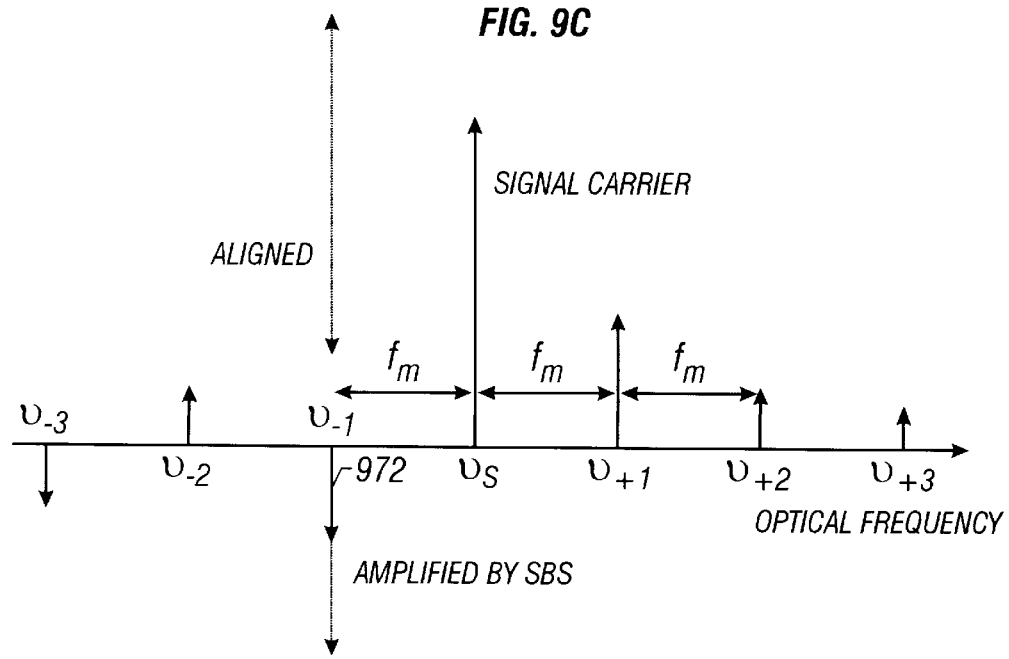

The spectrum of the phase modulated signal generated by the signal laser 910 and the phase modulator 912 is shown in FIG. 9D and the spectrum of the pump laser 950 and its Brillouin scattering are shown in FIG. 9C. In order to amplify a desired phase modulation sideband (e.g., the first order sideband 972 as shown), either the pump laser frequency (960) or the signal laser frequency (970) should be tuned so that the desired sideband to be amplified is aligned with the Brillouin scattering frequency $\nu_B$ (962). In a typical silica fiber, the Brillouin scattering frequency $\nu_B$ is about 12.8 GHZ below the pump laser frequency for a pump wavelength of 1320 nm. The amplified sideband (972) has a larger amplitude compared to another first-order sideband (974) on the opposite side the carrier signal frequency (970) with the opposite phase. Thus the symmetry between the two first-order sidebands (972 and 974) is broken and the beat signal between the amplified sideband (972) and the carrier signal (970) is no longer canceled. This beat signal is the converted amplitude modulation signal corresponding to the phase modulation. In general, any sideband in a phase-modulated signal may be selected as desired for Brillouin selective sideband amplification to achieve conversion from phase modulation to amplitude modulation.

Figure 9E:
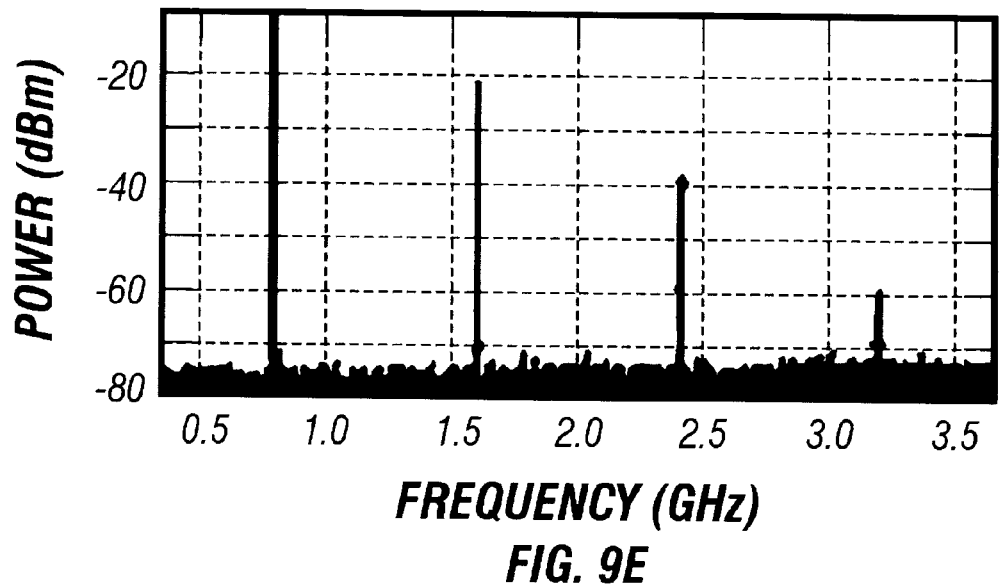
FIGS. 9E and 9F are charts showing experimental results of phase-to-amplitude modulation conversion using the system in FIG. 9B.
Figure 9F:
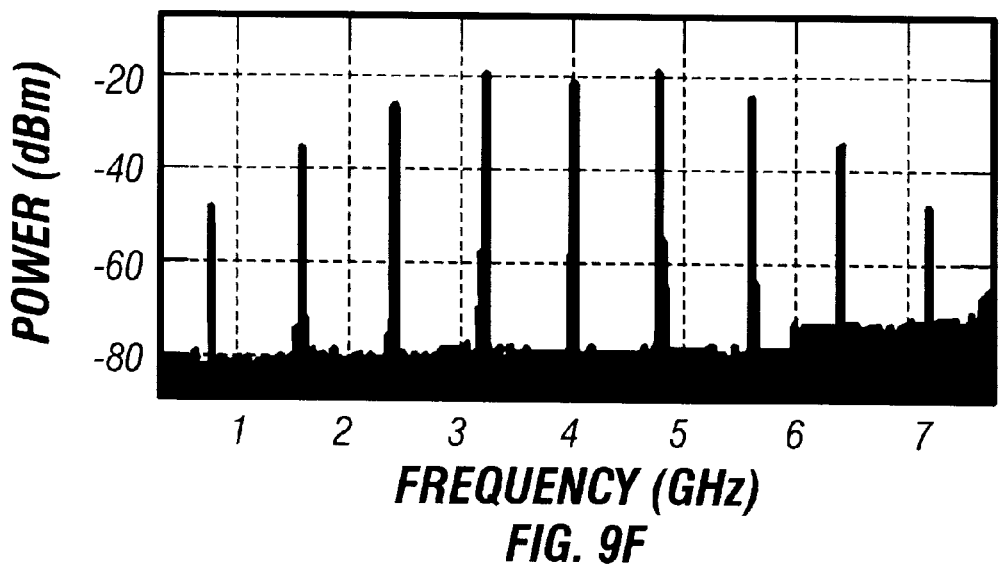

FIGS. 9E and 9F are charts showing experimental results of phase-to-amplitude conversion using the system in FIG. 9B. An RF signal 9011 of about 10.83 dBm was used to drive the phase modulator 912 at about 800 MHZ and the output from the photo detector 940 was connected to an RF spectrum analyzer (not shown). Without the Brillouin pump from laser 950, no RF signal was observed. When the pump laser 950 was turned on and its frequency was adjusted to align the frequency of the back-scattered Brillouin signal with the −1 order sideband in the phase-modulated signal, a strong signal was detected by the spectrum analyzer as shown in FIG. 9E with a measurement resolution of about 100 kHz. This indicates an efficient phase modulation to amplitude modulation conversion. FIG. 9F shows the output RF spectrum at the photo detector 940 when the −5 order sideband of the same phase-modulated signal was aligned with the Brillouin signal and amplified. The input RF modulation power was about 20 dBm and the resolution bandwidth was about 30 kHz.

4. Brillouin Frequency Multiplication

Figure 9G:
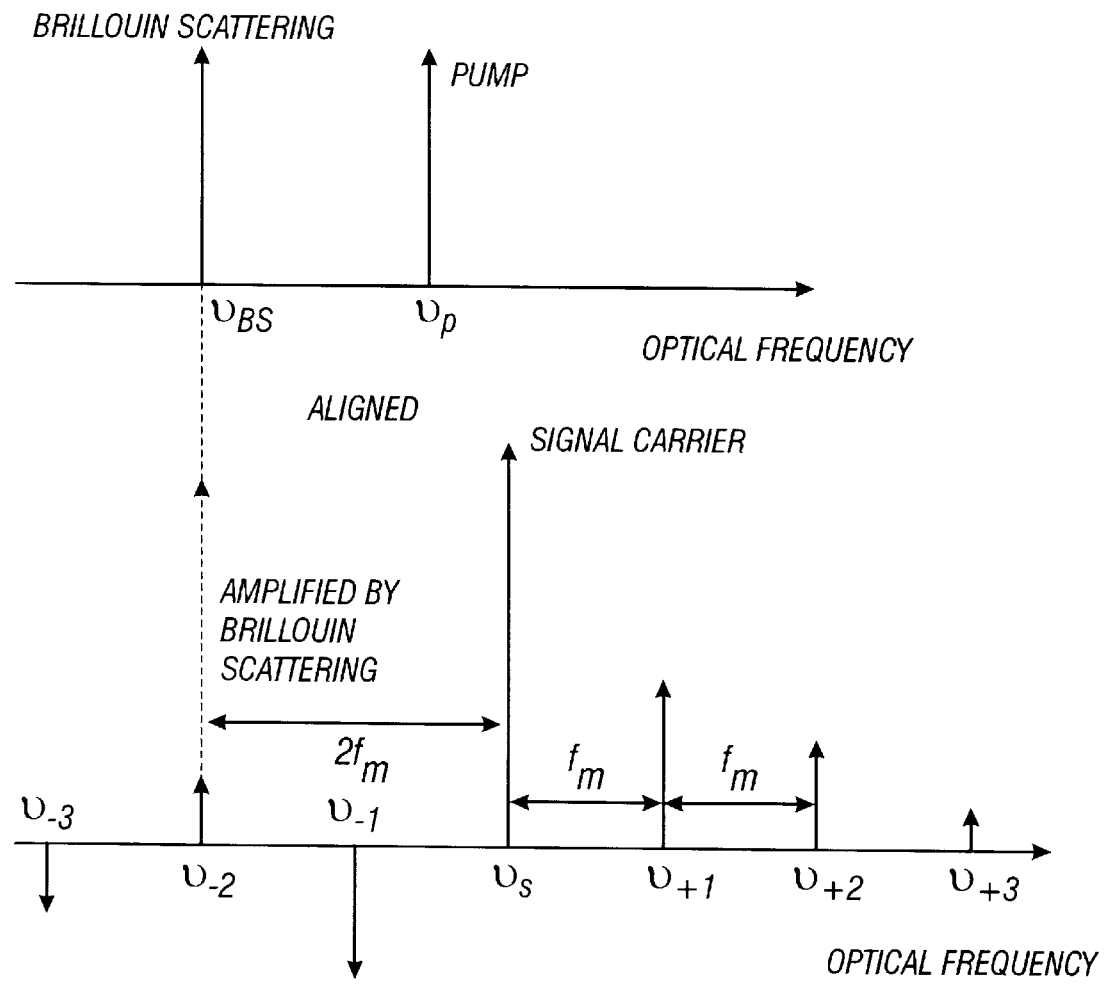
FIG. 9G is spectrum diagrams showing signal frequency multiplication by the Brillouin selective sideband amplification.
Figure 10A:
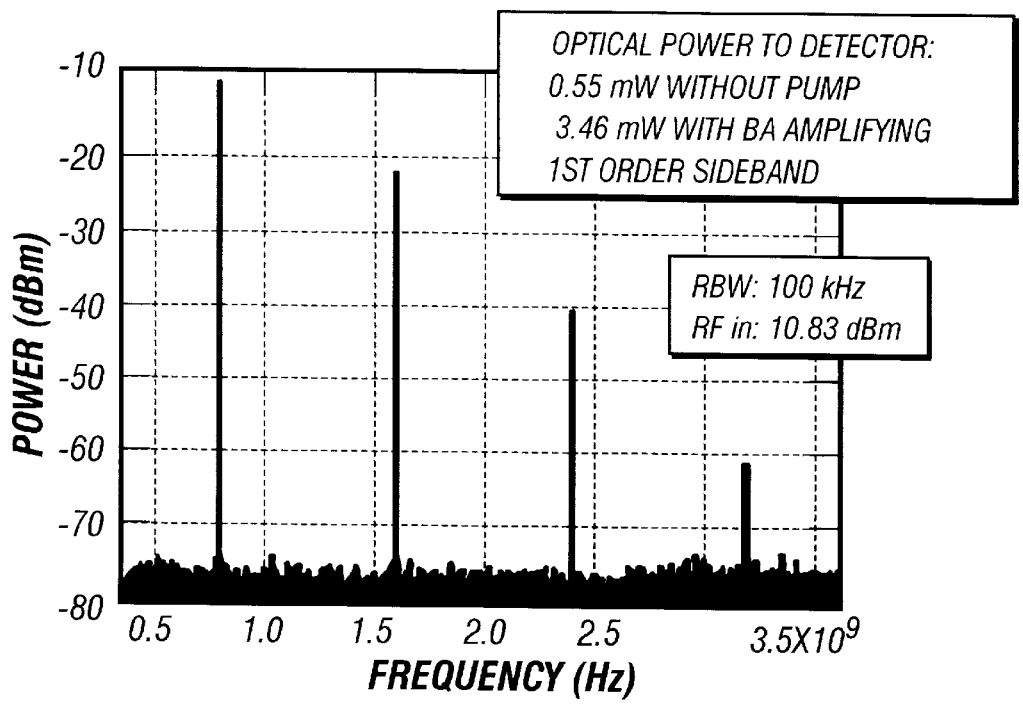
FIGS. 10A, 10B, 10C, 10D, 10E, and 10F are charts showing measured frequency multiplication signals by selectively amplifying different sidebands in a phase-modulated signal.
Figure 10B:
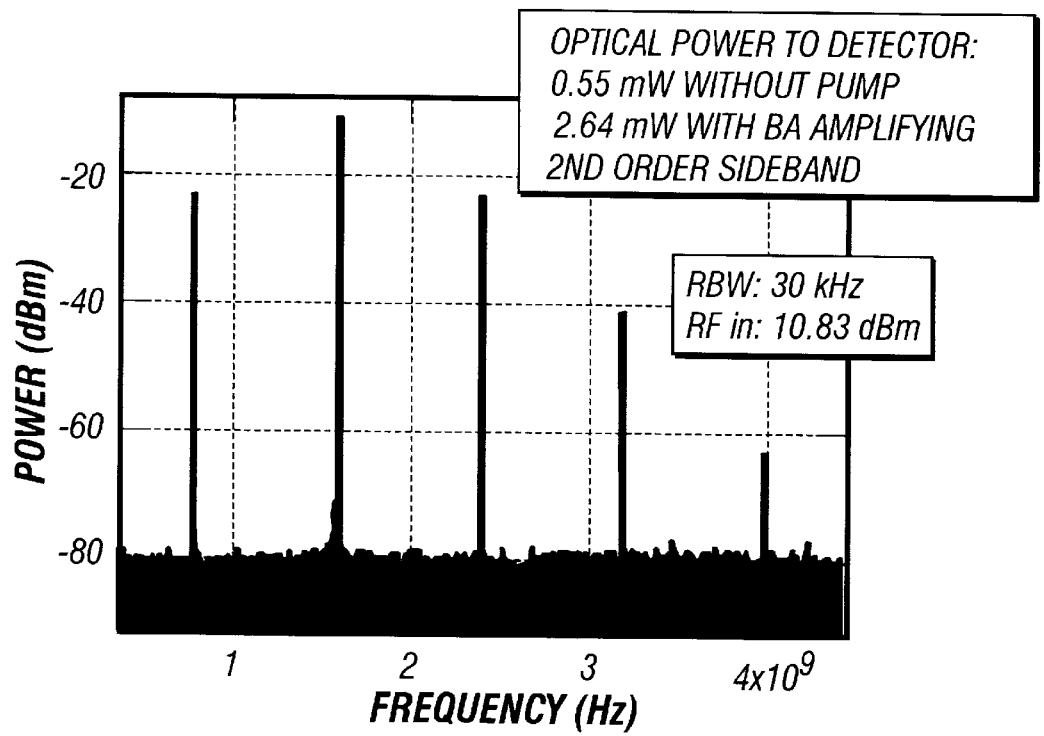
Figure 10C:
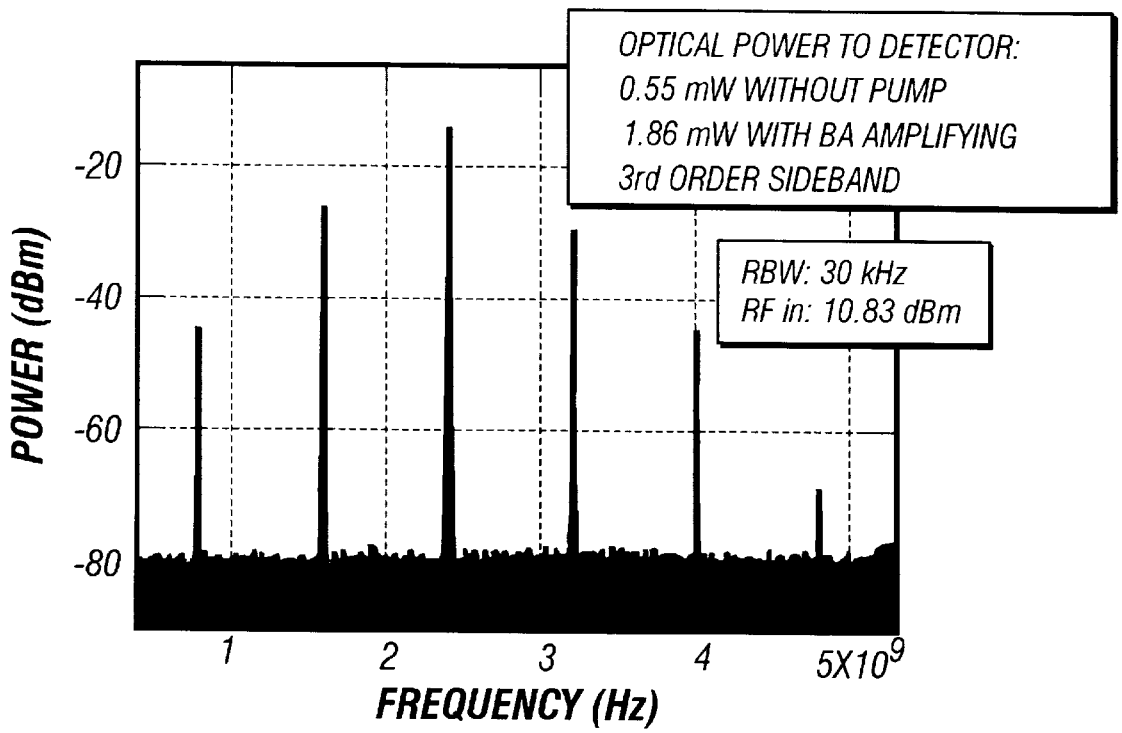
Figure 10D:
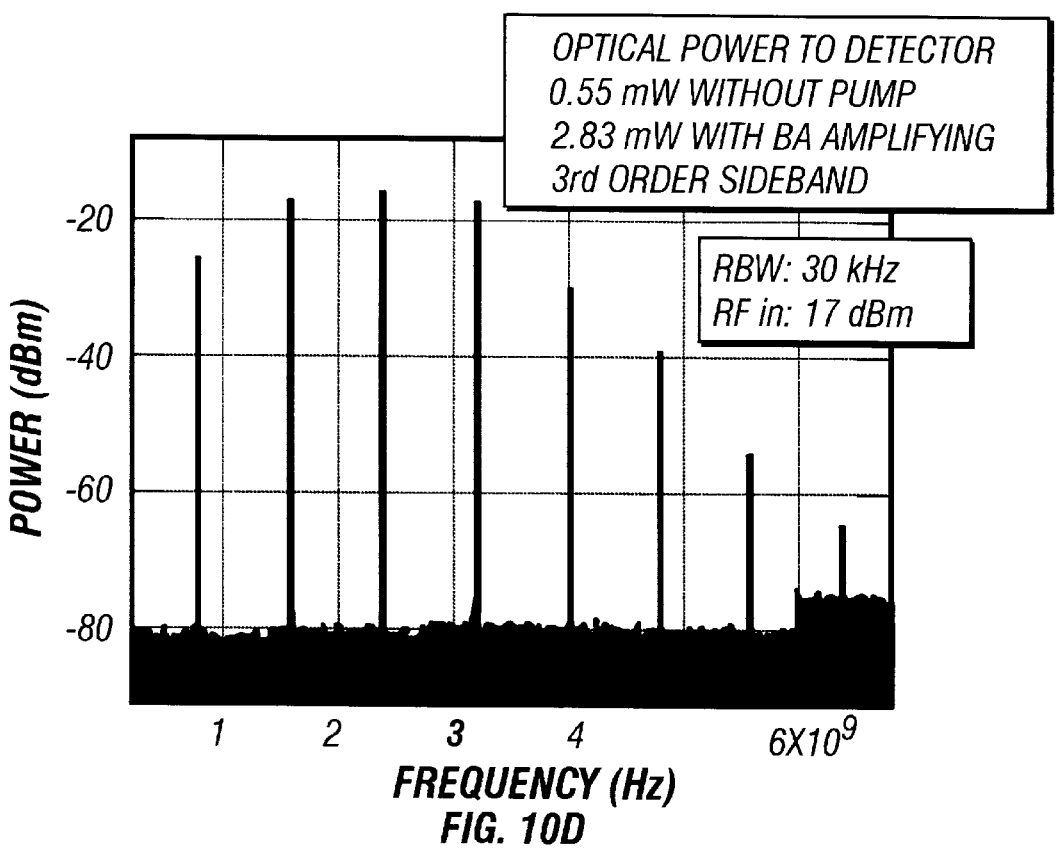
Figure 10E:
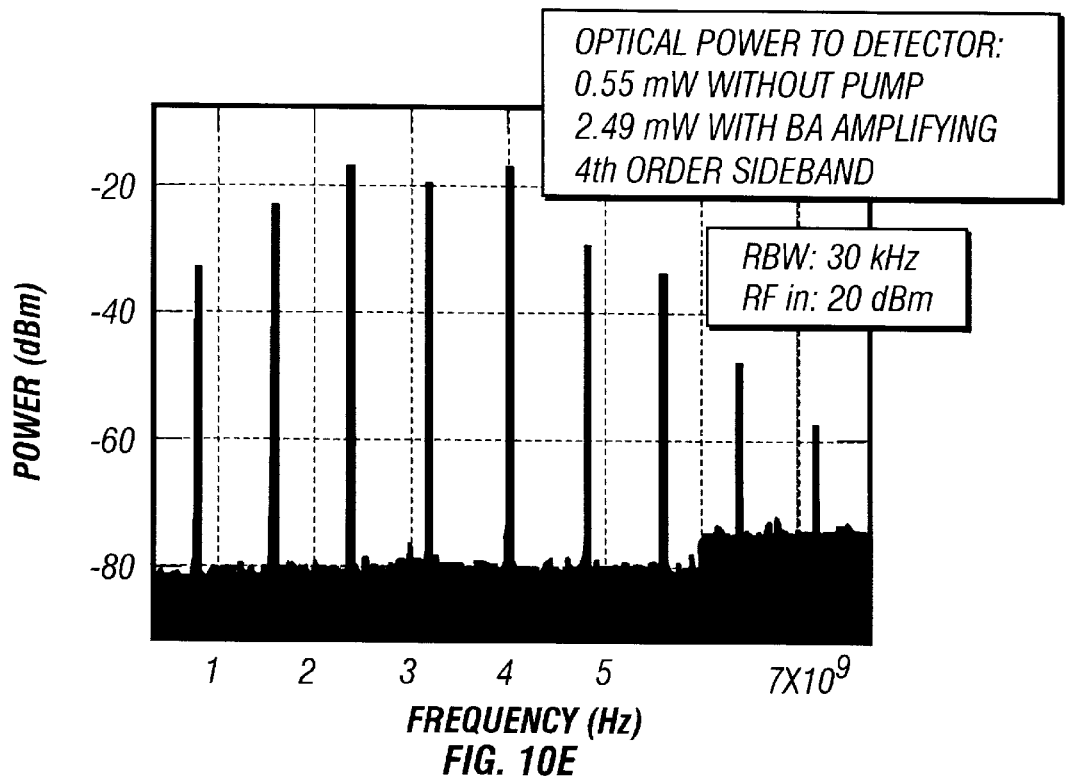
Figure 10F:
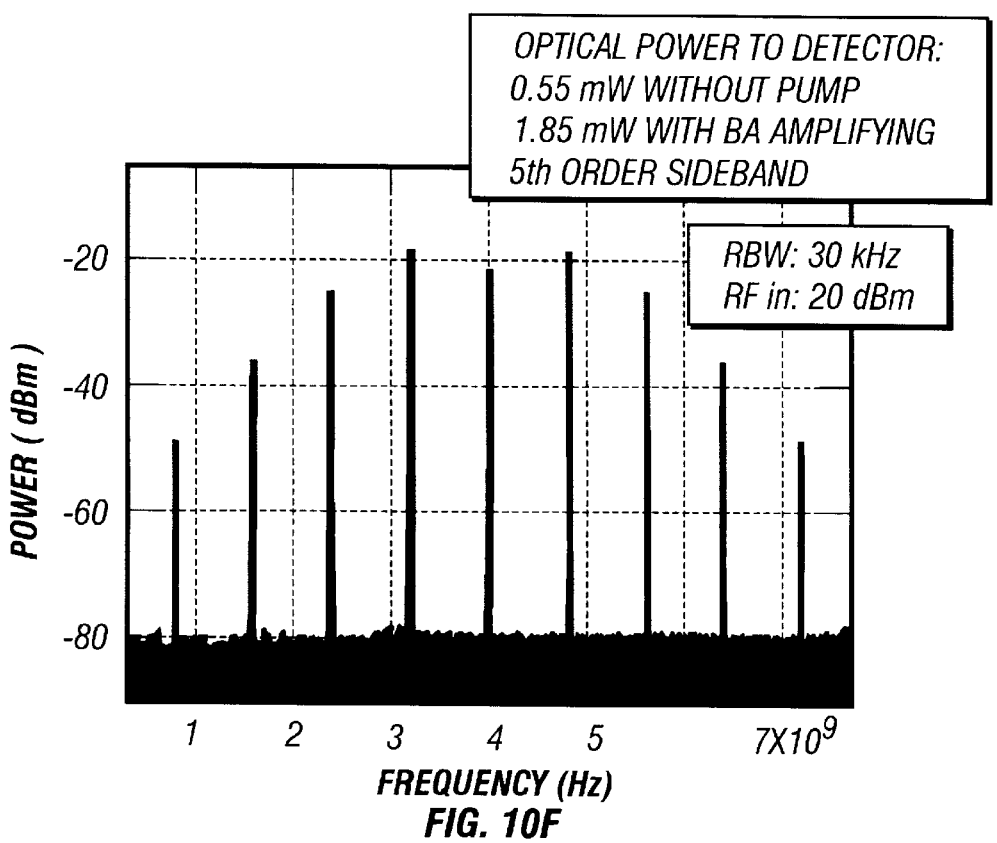

Phase modulation of an optical carrier can generate many sidebands. As shown in FIG. 9G, a higher order sideband (e.g., the −2 order) in the phase-modulated signal may be selected for amplification based on the Brillouin selective sideband amplification. Thus, a beat between the signal carrier and the amplified harmonic sideband of the phase modulation produce a beat signal having a frequency multiple times of the frequency of the RF modulation signal. This process effects a frequency multiplication mechanism.

FIGS. 9E and 9F show the received RF spectrum when the −1 order sideband and −5 order sideband were amplified respectively. It is evident from FIG. 9F that frequency components as large as nine times of the frequency of the driving signal can be efficiently generated. Note that the phase modulator used has a specified bandwidth of only 0.5 GHZ. However, with the aid of the BSSA, a signal with a frequency as high as 7 GHZ can be produced. It can be reasonably expected that a common 10-GHZ modulator can be used to obtain signals exceeding 100 GHZ. This efficient Brillouin frequency multiplication is useful for generating millimeter wave photonic signals, without the need for expensive high speed modulators, high-frequency sources, or overly driving the modulator.

FIGS. 10A–10F further show measured frequency spectra in frequency multiplication by using Brillouin conversion from phase modulation to amplitude modulation to selectively amplify different phase-modulated sidebands.

Figure 11:
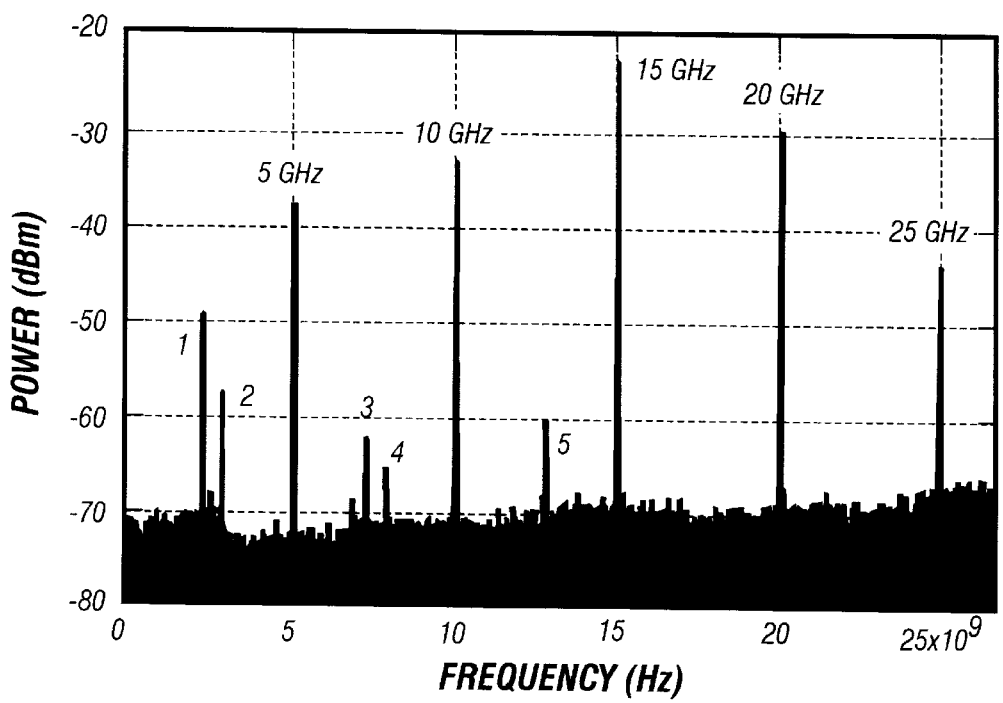
FIG. 11 shows a chart of a signal frequency spectrum in the Brillouin frequency multiplication by amplifying the (−3) sideband of a phase-modulated signal using the system shown in FIG. 9B.
Figure 12A:
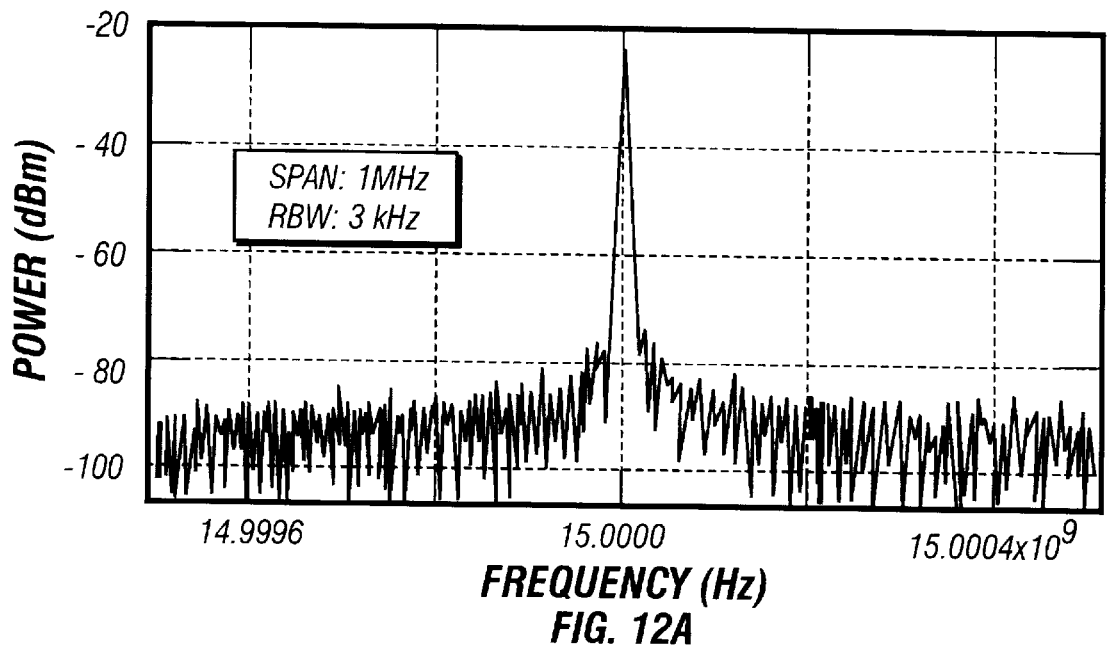
FIGS. 12A, 12B, 12C, and 12D are charts showing measured frequency multiplication signals at 15 GHz by beating a Brillouin selectively amplified (−3) sideband with a baseband in a carrier signal that is phase-modulated by a 5 GHZ modulation signal.
Figure 12B:
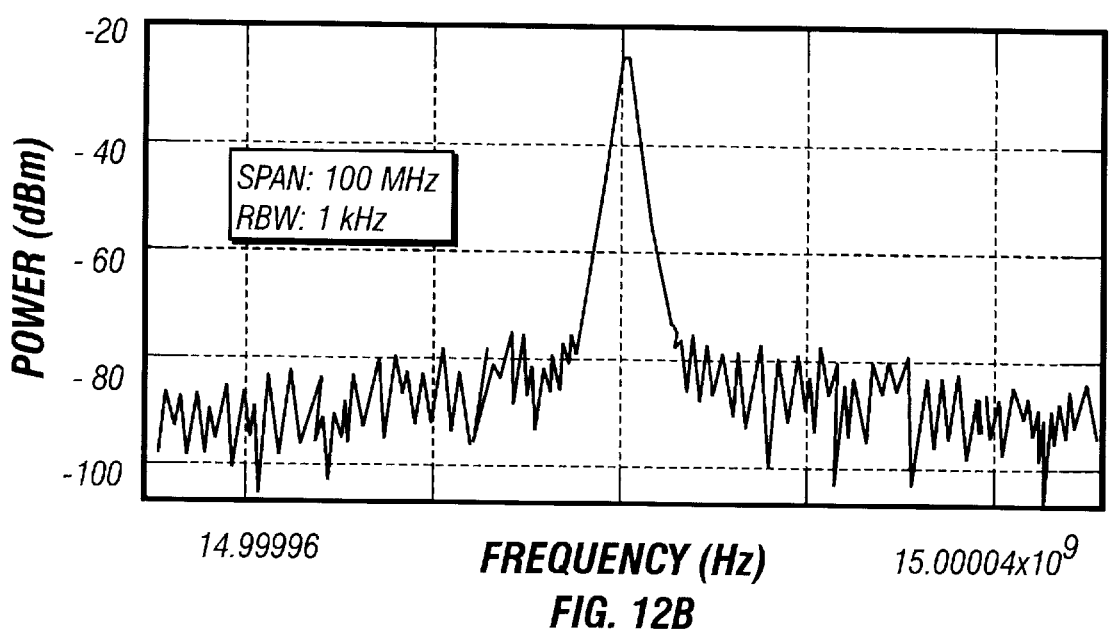
Figure 12C:
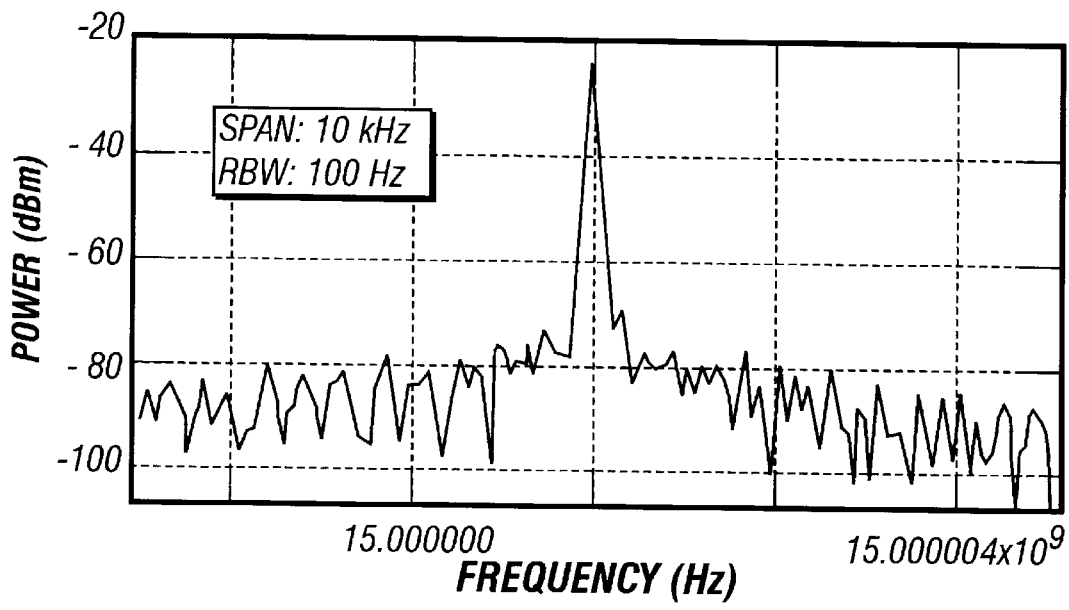
Figure 12D:
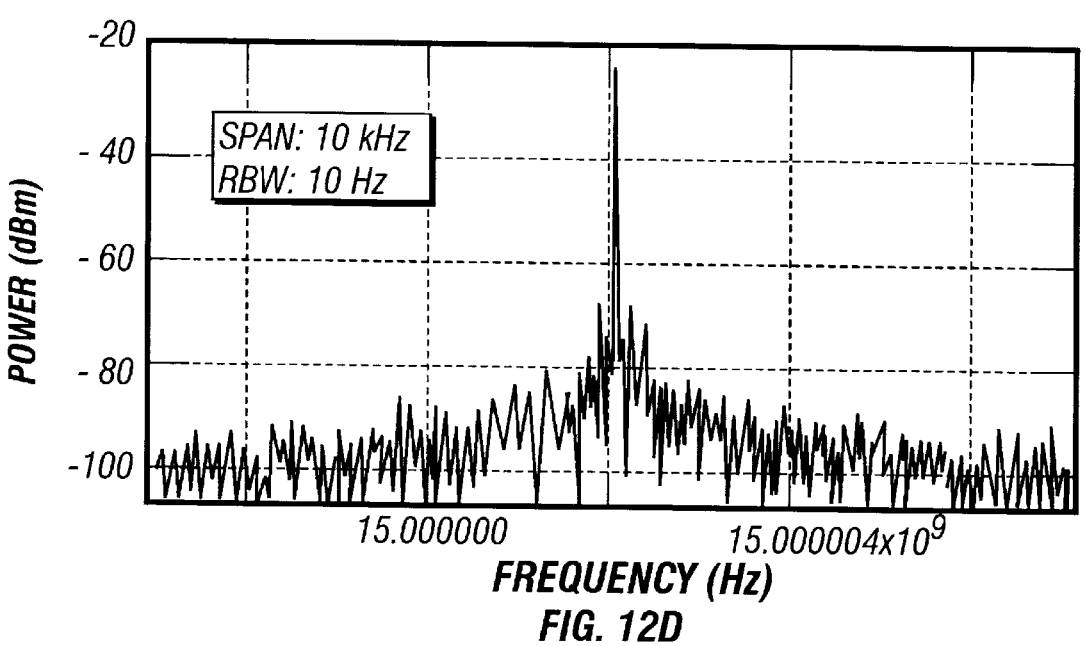
Figure 12E:
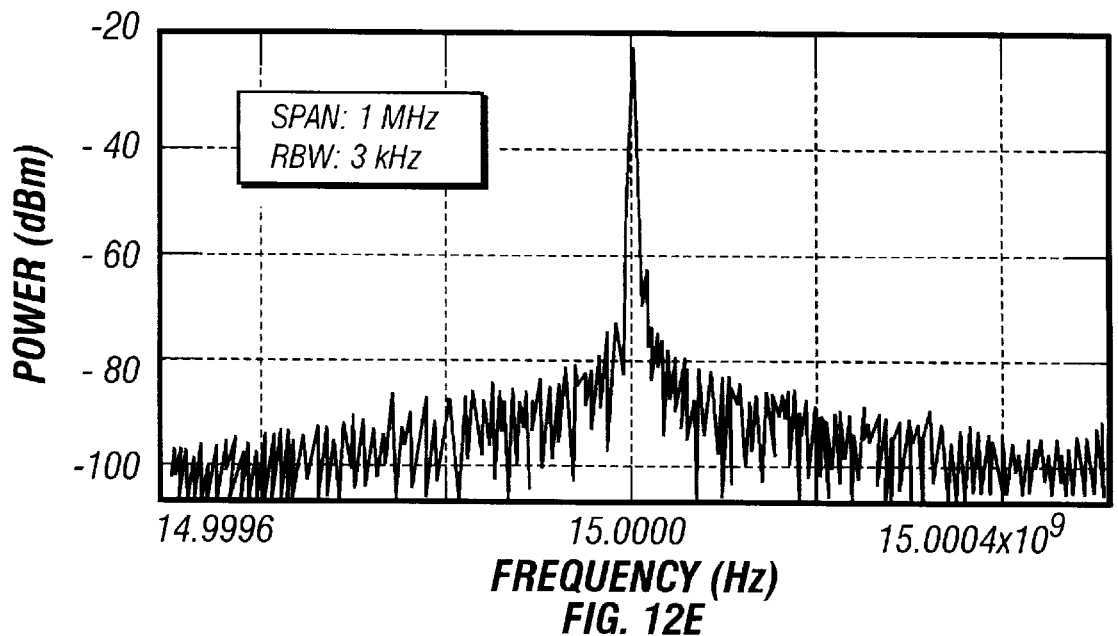
FIGS. 12E, 12F, 12G, and 12H are charts showing measured output signals at 15 GHZ from a commercial RF signal synthesizer.
Figure 12F:
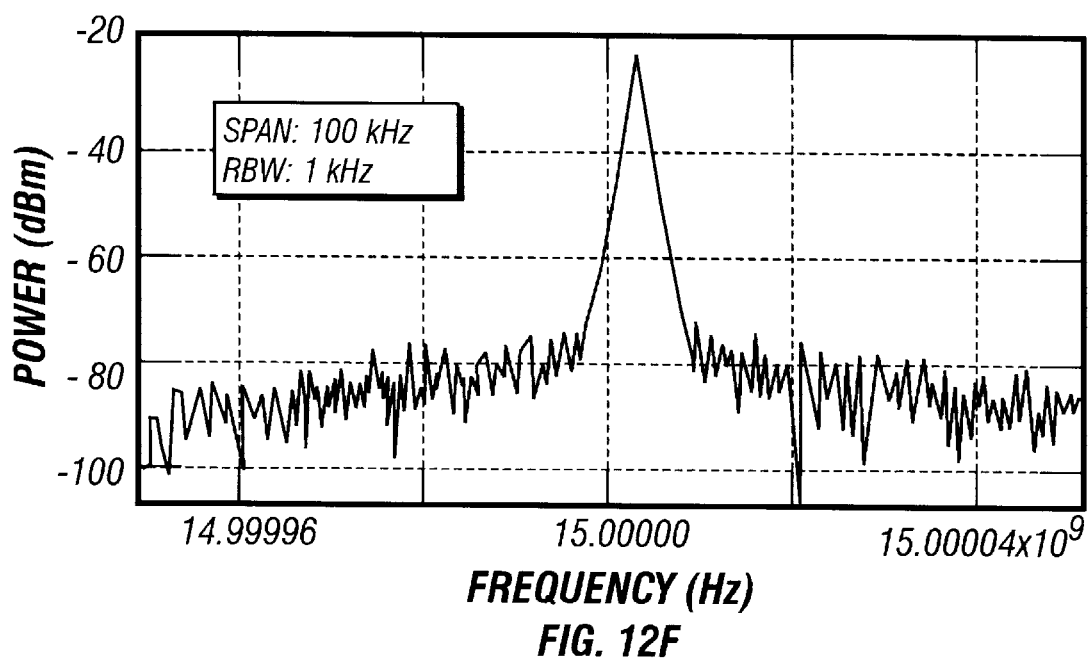
Figure 12G:
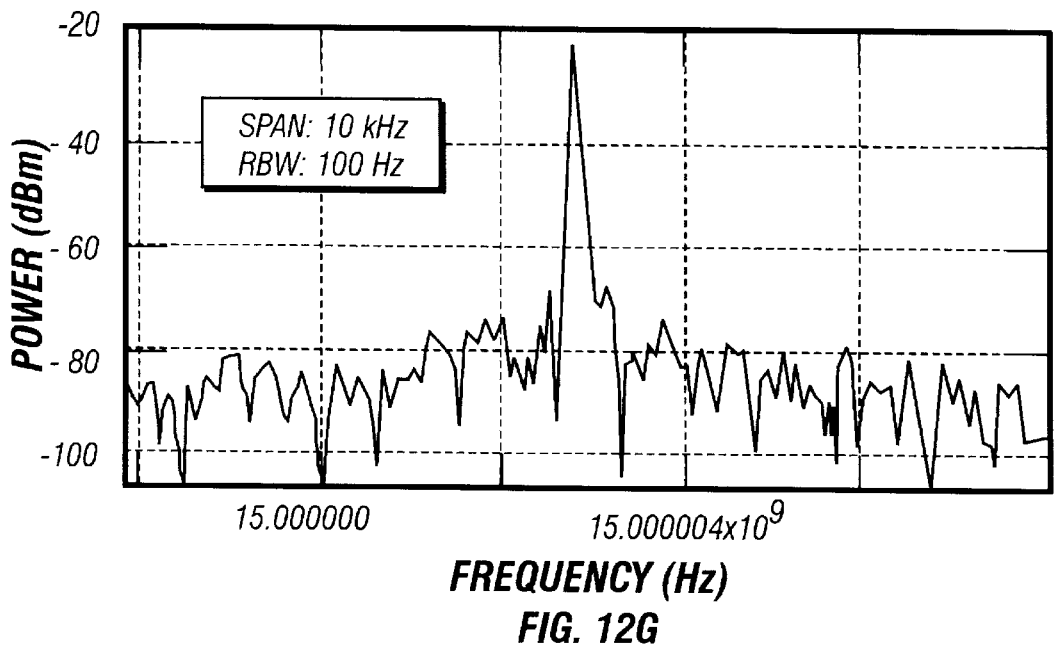
Figure 12H:
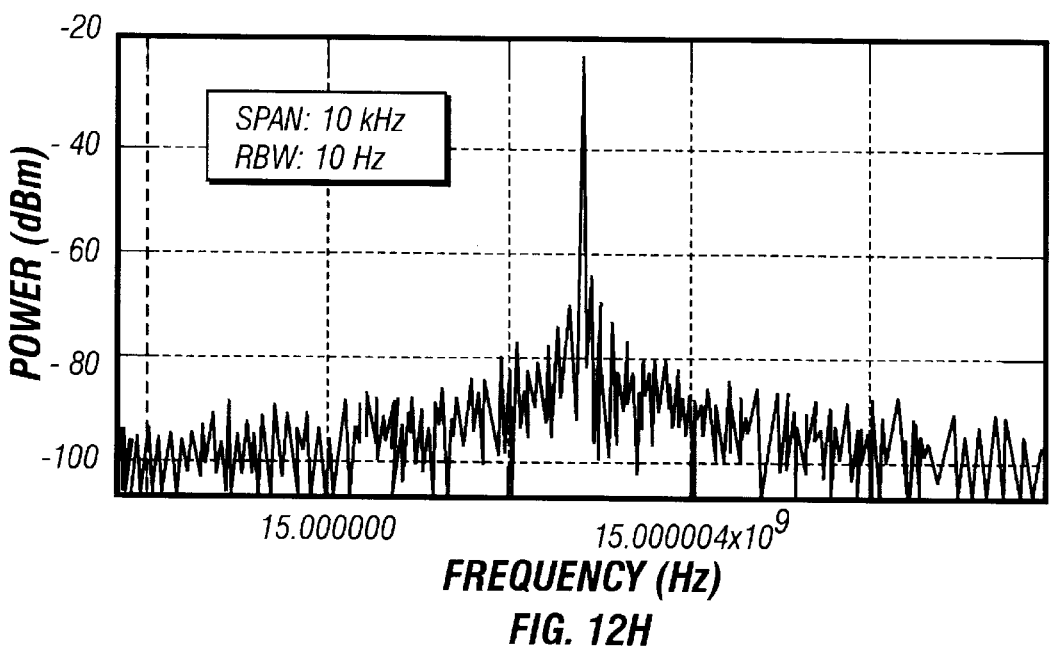

This aspect of the invention may be used to achieve a frequency multiplication to a high frequency by beating between an amplified sideband and another unamplified sideband or the baseband. FIG. 11 shows a chart of a signal frequency spectrum in the Brillouin frequency multiplication by amplifying the (−3) sideband of a phase-modulated signal using the system shown in FIG. 9B. Referring to FIG. 9B, a RF driving signal at $f_m$=5 GHZ was used to drive the phase modulator 912. The frequencies of the signal laser 910 and the pump laser 950 were tuned relative to each other so that the Brillouin scattering signal overlap the (−3) order sideband in the modulated signal from the phase modulator 912. The signal at 5 GHZ is the beat between the selectively amplified (−3) sideband and the unamplified (−2) sideband; the signal at 10 GHZ is the beat between the selectively amplified (−3) sideband and the unamplified (−1) sideband; the signal at 15 GHZ is the beat between the selectively amplified (−3) sideband and the baseband at the carrier frequency; the signal at 20 GHZ is the beat between the selectively amplified (−3) sideband and the unamplified (+1) sideband; and the signal at 25 GHZ is the beat between the selectively amplified (−3) sideband and the unamplified (+2) sideband. The smaller signals located from 2 to about 13 GHZ are other beat signals that do not involve the amplified (−3) sideband.

FIGS. 12A, 12B, 12C, and 12D are charts showing measured frequency multiplication signals at 15 GHZ by beating a Brillouin selectively amplified (−3) sideband with a baseband in a carrier signal that is phase-modulated by a 5 GHZ modulation signal from a commercial RF signal synthesizer. As a comparison, FIGS. 12E, 12F, 12G, and 12H further show the measured output signals at 15 GHZ directly generated by the commercial RF signal synthesizer.

5. Harmonic Signal Up- and Down-Conversion

In the above-described RF signal mixing with Brillouin gain, if a higher order LO modulation sideband in FIG. 7A is amplified, the beat between the higher order LO sideband and the signal sidebands converts the IF signal not only to the LO frequency, but also to the multiple of the LO frequency. Therefore, this effects a harmonic signal up-conversion. Similarly, harmonic signal down-conversion can also be achieved.

Figure 13A:
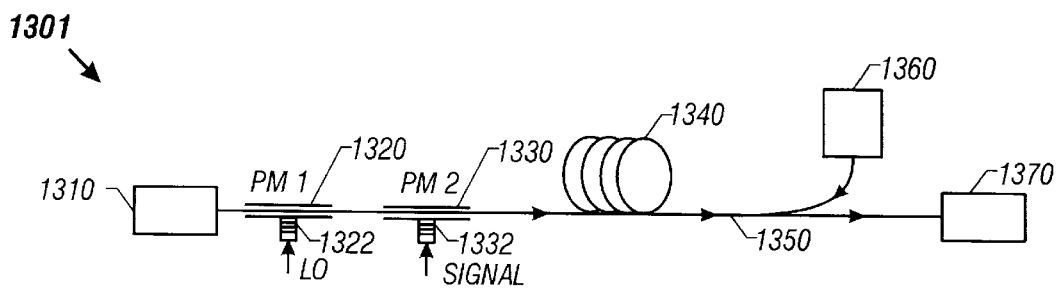
FIG. 13A is a diagram showing a fiber photonic system that implements the signal up- and down-conversion including harmonic signal conversion.

FIG. 13A shows a fiber photonic system 1301 that implements such frequency multiplied signal up-conversion. A signal laser 1310 (e.g., a diode-pumped YAG laser near 1320 nm) produces a carrier signal beam. An optional optical isolator may be disposed at the output of the signal laser 1310 to reduce the optical feedback. Two phase modulators 1320 and 1330 are located in series in the path of the carrier signal beam from the laser 1310. The first phase modulator 1320 receives a local oscillator ("LO") signal from a RF port 1322 and modulates the phase of the carrier signal beam to produce LO sidebands. The second phase modulator 1330 receives an electrical RF modulation signal from its RF port 1332 and further imposes the RF bands onto the carrier signal beam by phase modulation. The phase-modulated carrier signal beam is then fed into a Brillouin medium, optical fiber 1340. An optical fiber coupler 1350 is used to couple a pump laser beam from a pump laser 1360 into the fiber 1340 which propagates in the opposite direction of the carrier signal beam. A photodetector 1370 is connected to the fiber 1340 for measurements.

Figure 13B:
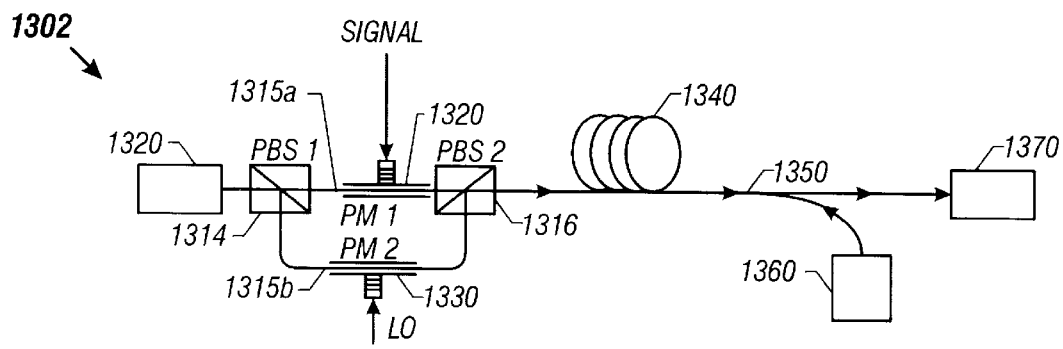
FIG. 13B is a diagram showing an alternative embodiment to the system of FIG. 13A for signal up- and down-conversion including harmonic signal conversion.

FIG. 13B shows an alternative embodiment 1302 to the system shown in FIG. 13A in which the phase modulators 1320 and 1330 are optically connected in parallel rather than in series. A first polarizing beam splitter ("PBS") 1314 is located at the output of the signal laser 1310 to divide the signal carrier into a first portion 1315a with a first polarization to the phase modulator 1320 and a second portion 1315b with a second polarization orthogonal to the first polarization to the phase modulator 1330. The two signal carrier beams 1315a and 1315b are almost simultaneously modulated by the phase modulators 1320 and 1330 respectively with a RF signal and LO signal. A second polarizing beam splitter 1316 is disposed before the fiber 1340 to combine the first and second signal carrier signals 1315a and 1315b from the two modulators 1320 and 1330. The second PBS 1316 is configure to transmit light with the first polarization from one input facet and reflect light with the second polarization from another facet. In the frequency domain, the output beam from the second PBS 1316 is different to the output from the second phase modulator 1330 in FIG. 13A if the same RF and LO modulation signals are used. The output of the PBS 1316 is simply a linear superposition of a first set of sidebands produced by the first phase modulator 1320 and a second set of sidebands produced by the second phase modulator 1330. Each sideband produced by the first phase modulator 1320 in the output of the second phase modulator 1330 in the system 1301 is modulated by the second phase modulator 1330.

Figure 13C:
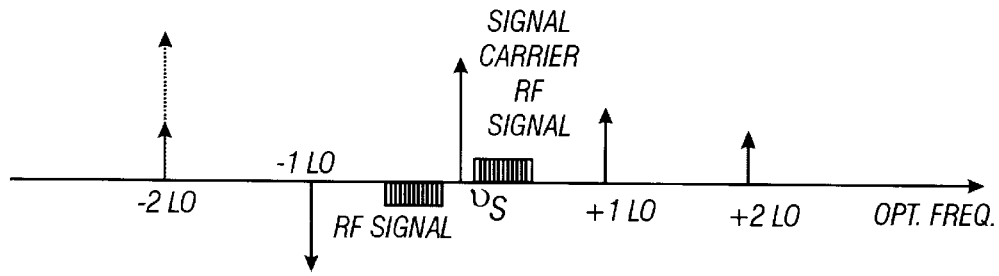
FIG. 13C is a spectrum diagram showing the modulated signal carrier signal after modulations by a RF signal and a local oscillator signal.
Figure 13D:
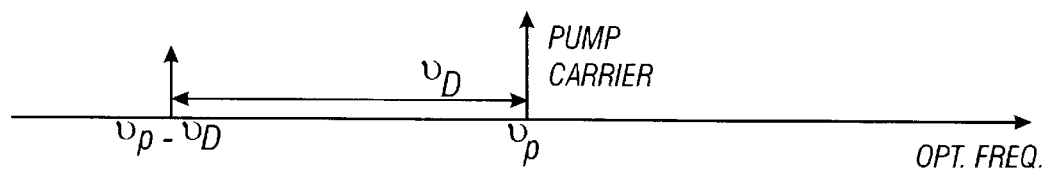
FIG. 13D is a spectrum diagram showing the frequencies of the pump laser and the Brillouin signal for selective amplification of a local oscillator sideband (e.g., −2 order) in a frequency up-conversion.

FIG. 13C shows the spectrum of the input beam to the fiber 1340 in FIG. 13B. The first order RF sidebands and LO sidebands up to the second order are shown. FIG. 13D shows one scenario in which the pump laser 1360 and the signal laser 1310 are tuned relative to each other in the frequency domain such that the frequency of the Brillouin scattering signal propagating in the direction of the signal carrier beam overlaps with (−2) order LO sideband. The (−2) LO sideband is amplified due to the BSSA effect. In general, the frequency of the pump laser 1360 can be tuned to amplify any of the LO sidebands by aligning the frequency of the back-scattered Brillouin signal with a desired sideband of the LO signal.

Figure 13E:
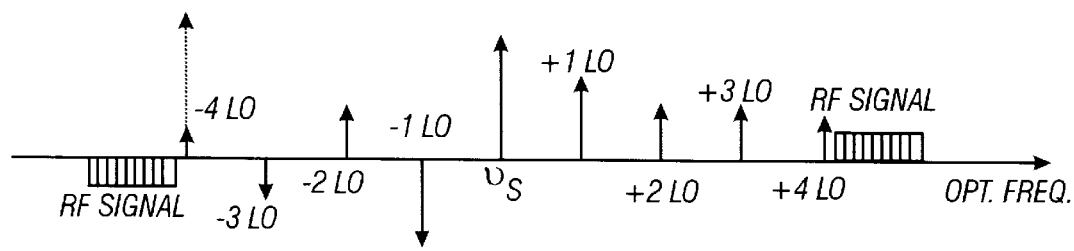
FIG. 13E is a chart showing a signal spectrum in a signal down-conversion using the Brillouin selective sideband amplification to amplify (−4) order sideband located near a lower signal sideband.

FIG. 13E further shows a signal spectrum in a signal down-conversion using the Brillouin selective sideband amplification. The (−4) order sideband located near the lower signal sideband is selectively amplified. The beat between the amplified (−4) sideband and the lower signal sideband produces a copy of the lower signal sideband at a lower frequency with a gain.

Figure 14:
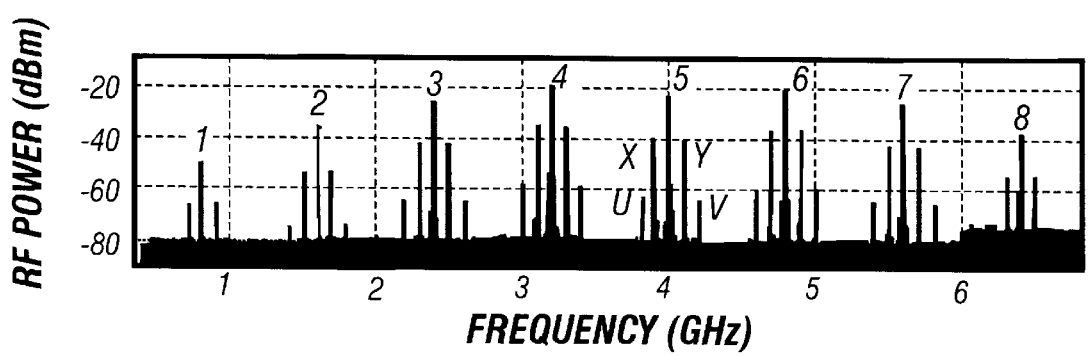
FIG. 14 is a chart of the measured data using two 0.5 GHZ phase modulators in the system of FIG. 13A.

FIG. 14 shows the measured data using two 0.5 GHZ phase modulators in the system of FIG. 13A. The RF and LO frequencies are set at 5.5873 GHZ and 5.18 GHz, respectively. By adjusting the frequency of the Brillouin signal to overlap the (−5) order sideband of a LO modulation at 0.8 GHz and 21 dBm, an IF signal at 0.1 GHZ and −1.83 dBm was up converted to 6.4 GHZ, a 64 times signal up-conversion. The received optical power at the photodetector 1370 (See, FIG. 13A) was about 1.72 mW with the Brillouin amplification and about 0.55 mW without the Brillouin amplification. The optical pump power from the pump laser 1360 was about 11.5 mW. The numbers labeled on top of each signal peak in FIG. 14 indicate the number of harmonics of the LO signal. The peaks labeled 1 through 8 are the beat signals of the amplified (−5) order LO sideband and LO sidebands of (−4), (−3), (−2), and (−1), the baseband, and the LO sidebands of (+1), (+2), and (+3), respectively. Since each LO sideband is also modulated by the second phase modulator 1332, the harmonic signals produced by the first phase modulator 1330 are also up-converted.

It is reasonable to expect that a 10-GHZ modulator and 10-GHZ LO source can be used to convert a low frequency signal to 100 GHZ and beyond.

Figure 15A:
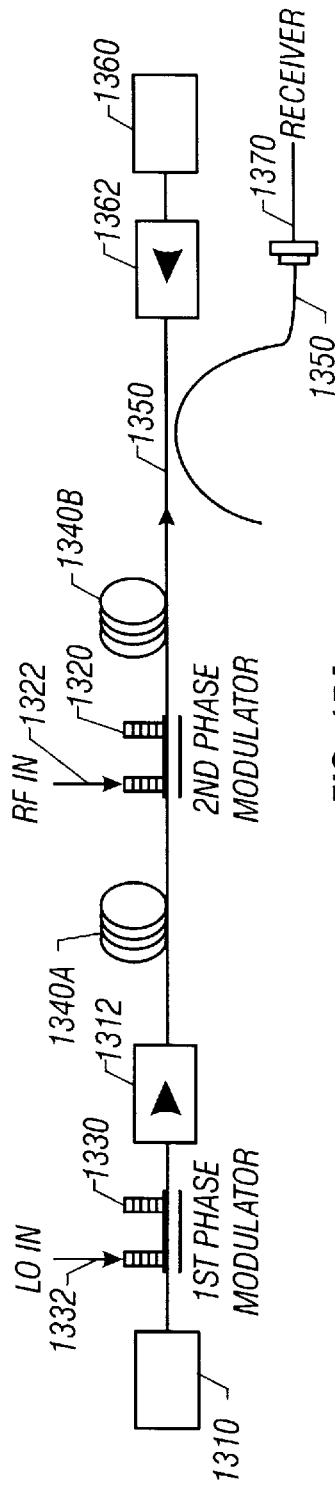
FIG. 15A is a diagram showing another fiber photonic system that implements the harmonic signal up-conversion.
Figure 15B:
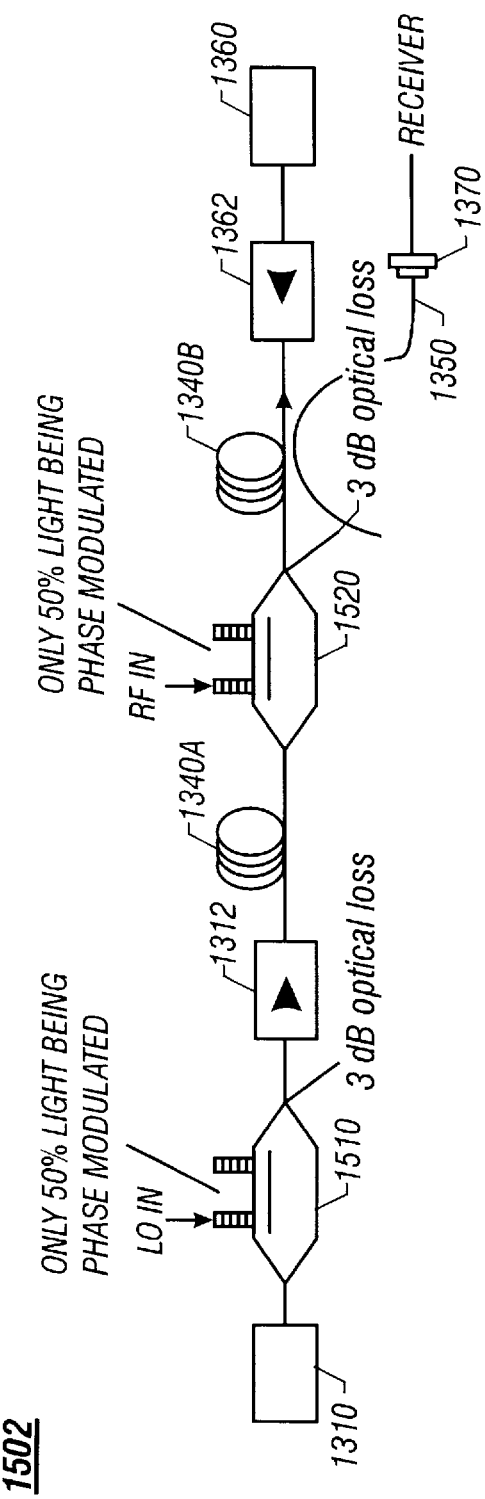
FIG. 15B is a diagram showing a fiber photonic system that implements the harmonic signal up-conversion by using two Mach-Zehnder amplitude modulators.

FIGS. 15A and 15B show other alternative embodiments of the system shown in FIG. 13A. In FIG. 15B, two Mach-Zehnder amplitude modulators 1510 and 1520 are used to perform the phase modulation. Since only one channel of the two channels in each modulator is used, a total of 12 dB less light is phase-modulated in the system of FIG. 15B than the systems of FIGS. 13A, 13B, and 15A.

The systems 1301 in FIG. 13A, 1302 in FIG. 13B, 1501 in FIG. 15A, and 1502 in FIG. 15B may also be configured as a frequency comb generator. A RF driving signal can be used to drive both phase modulators (or one path of a Mach-Zehnder modulator). When both modulators are in phase with respect to each other, the frequency components in the carrier signal produced by the two modulators add up in phase and the amplitude variation in the frequency components is reduced. Thus, the above systems may be operated under this condition to produce a frequency comb. Conversely, if a phase delay is introduced between the two modulators to cause a relative phase delay of π, certain frequency components produced by the two modulators may cancel one another and increase amplitude variation of the frequency components.

Figure 15C:
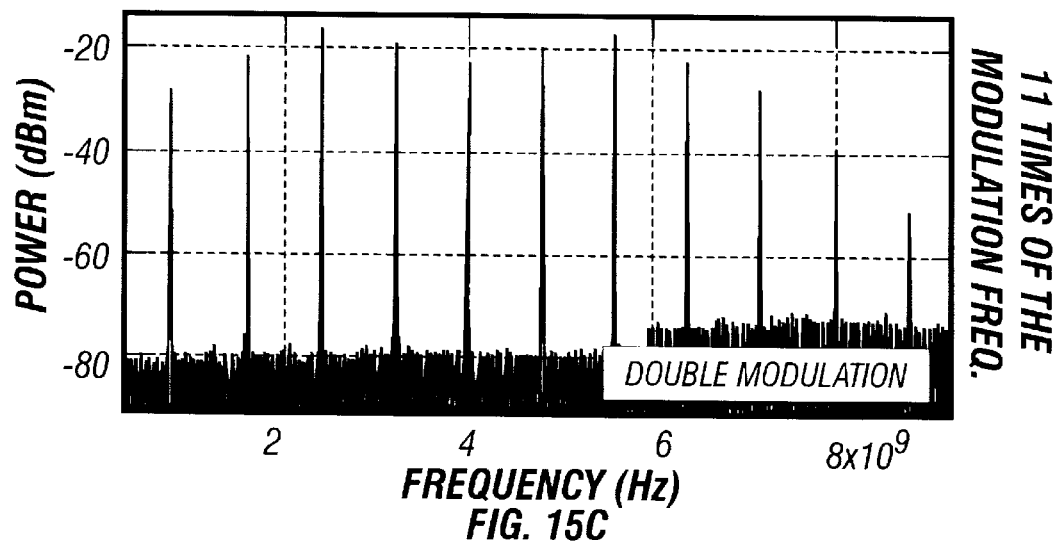
FIG. 15C is a chart of the measured spectrum from the photodetector in the system in FIG. 13A when both modulators driven by the same signal are in phase with respect to each other.
Figure 15D:
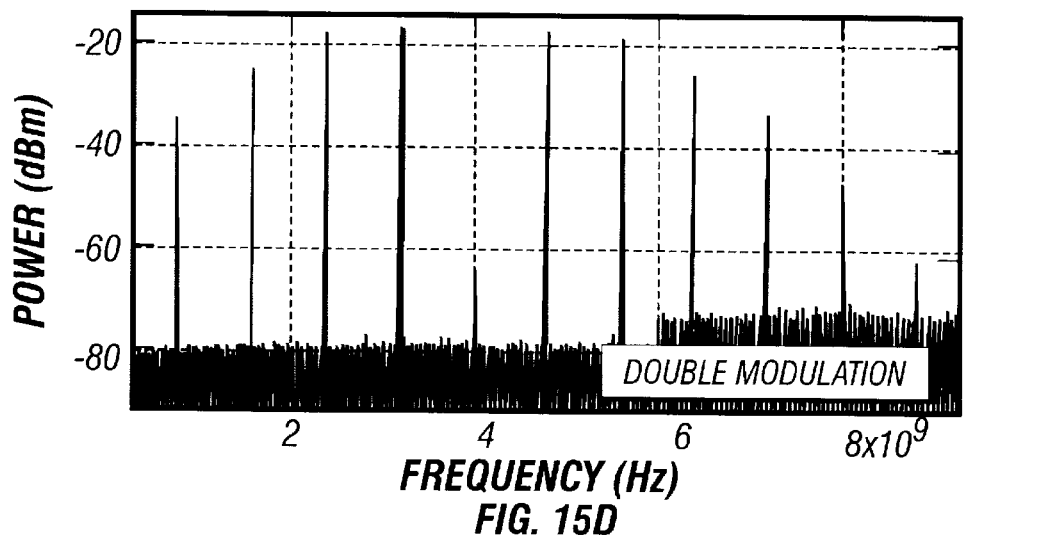
FIG. 15D is a chart of the measured spectrum from the photodetector in the system in FIG. 13A when the two modulators driven by the same signal are out of phase.
Figure 15E:
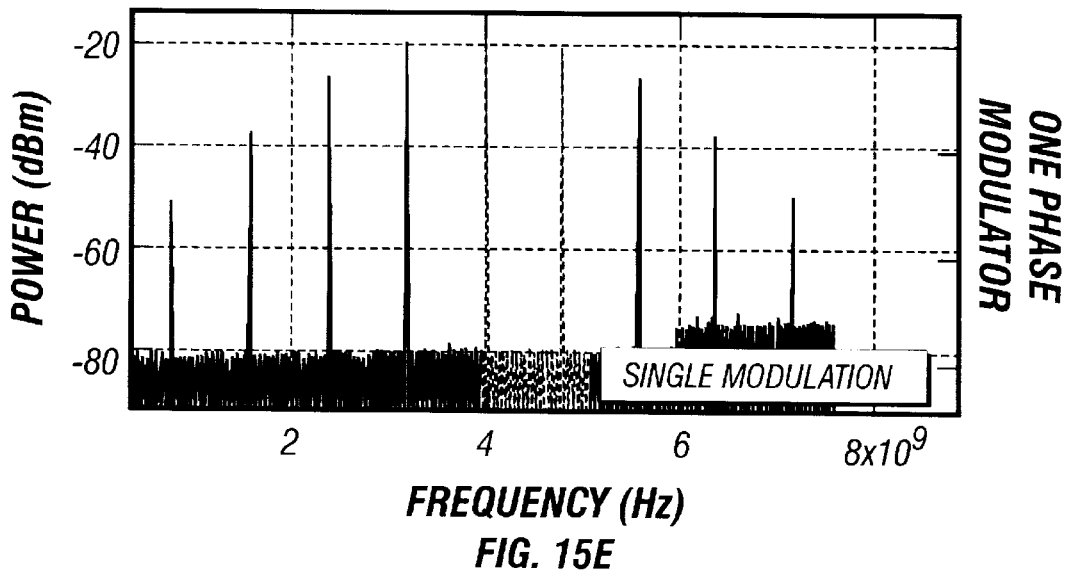
FIG. 15E is a chart of the measured spectrum from the photodetector in the system in FIG. 13A when only one phase modulator is used to modulate the signal beam.

FIGS. 15C and 15D show measured signal spectra from the system 1302 of FIG. 13A. A RF signal of 0.8 GHZ was used to drive both modulators 1320 and 1330. The received optical power at the photodetector 1370 without the pump laser 1360 was about 0.54 mW. The (−5) order sideband was selected for Brillouin amplification. FIG. 15C shows the spectrum when both modulators are in phase with respect to each other. When the two modulators 1320 and 1330 are out of phase, as shown in FIG. 15D, a peak at 4 GHZ was nearly canceled the amplitude variation at other frequencies increases. As a comparison, FIG. 15E shows the spectrum detected by the photodetector when only one modulator was used with the same driving signal. The signal amplitude is the highest at the center peak at 4 GHZ and decays significantly as the frequency deviates from 4 GHZ.

6. Phase and Frequency Locking in Coherent Heterodyne Systems

In a conventional coherent homodyne or heterodyne communication link, a strong local oscillator (e.g., a laser) is generally placed in front of the receiver to interfere with a phase modulated optical signal and to convert it into an amplitude modulated signal. Since the local oscillator is much stronger than the original optical carrier of the signal, the receiving sensitivity can be improved. The phase and frequency of the local oscillator must be locked with respect to the signal laser in order to achieve a stable operation.

The Brillouin selective sideband amplification technique can be used to implement an automatic phase locking mechanism for the local oscillator. Instead of directly sending the LO laser signal into the photo detector as in a conventional heterodyne system, the optical local oscillator signal propagates in the opposite direction of the carrier signal beam according to the invention. The systems shown in FIGS. 13A, 13B, 15A and 15B can be used as such a system wherein the pump laser 1360 serve as the local oscillator. Tuning the frequency of the LO laser to one of the LO modulation sidebands, the LO sideband will be amplified by the LO laser via the Brillouin amplification process. Because the phase and frequency of the amplified LO sideband are derived from the signal laser they are automatically locked to the signal laser with a stability determined by the electrical LO driving signal. On the other hand, most of the power of the amplified sideband comes from the LO laser. Therefore, the LO laser is indirectly phase locked to the signal laser through the seeded Brillouin amplification process.

7. Optical Pulse Generation and Manipulation with Brillouin Selective Sideband Amplification The system in FIG. 10 may include two or more pump lasers at different wavelengths to produce multiple Brillouin signals at different wavelengths. When the carrier signal is phase modulated, multiple phase-modulated sidebands may be selectively amplified simultaneously using the multiple Brillouin signals. In particular, when the in-phase sidebands in the phase-modulated carrier signal are selectively amplified, the beat of these frequency components can produce a sharp pulse in the time domain. The pulse shape may be manipulated by changing the Brillouin gain of at least one of the amplified sidebands.

Figure 16A:
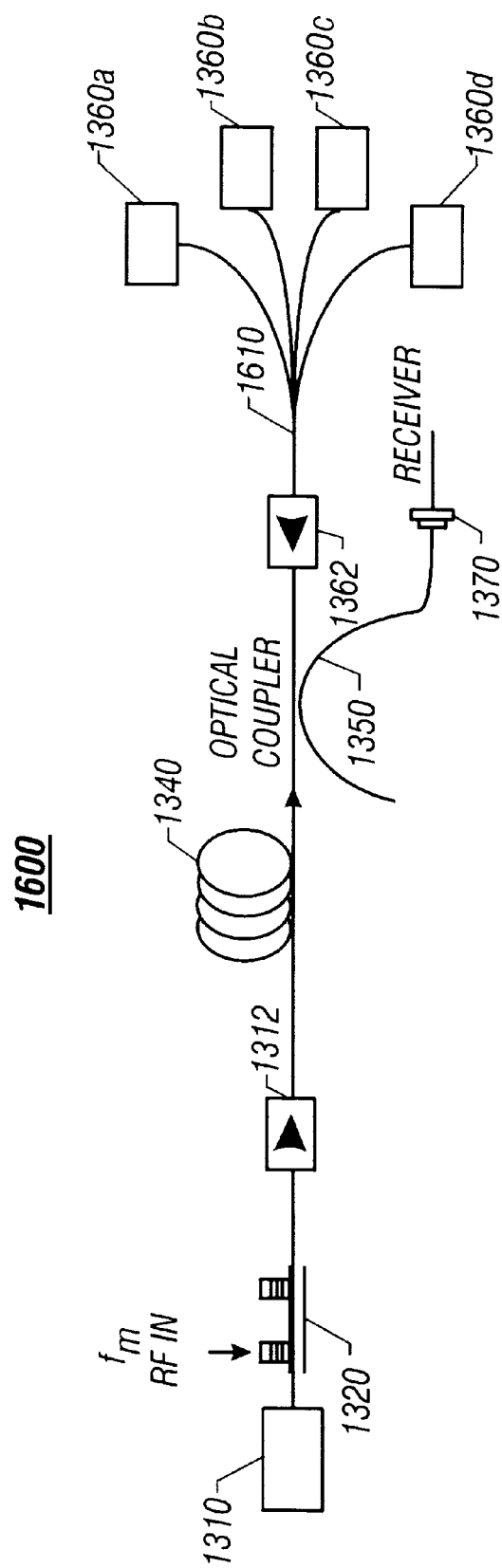
FIG. 16A is a diagram showing a Brillouin amplifier using multiple pump lasers to simultaneously amplify multiple sidebands in the carrier signal.
Figure 16B:
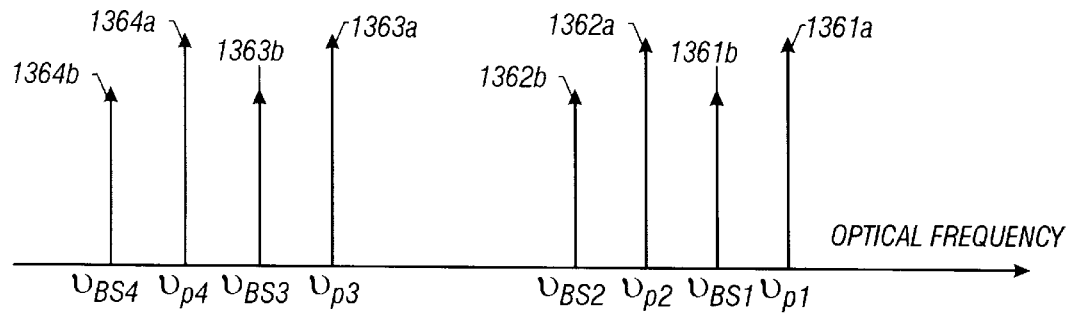
FIG. 16B is a spectrum diagram showing frequencies of the multiple pump lasers and respective Brillouin signals in the system of FIG. 16A.
Figure 16C:
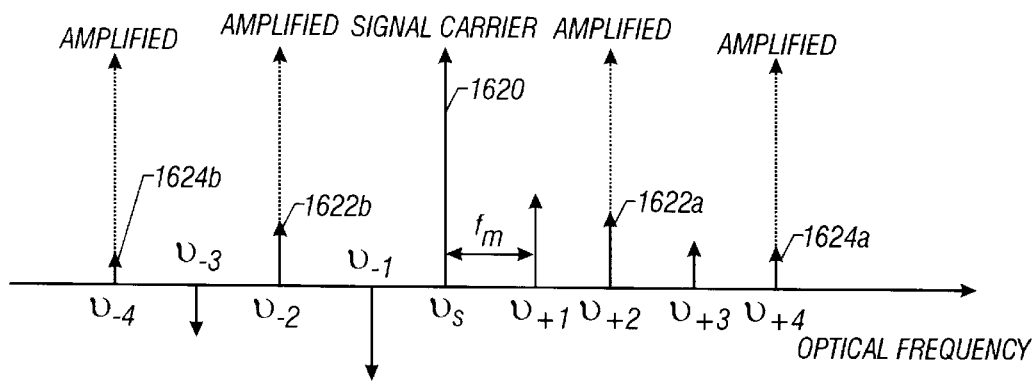
FIG. 16C is a spectrum diagram showing that the Brillouin signals are aligned with the first four even order sidebands in the phase-modulated carrier signal to produce selective Brillouin amplification.

FIG. 16A shows one embodiment of such an RF pulse generator 1600 based on the Brillouin selective sideband amplification. Multiple pump lasers are used to generate multiple Brillouin pump beams at different frequencies to the optical fiber loop 1340. Four such pump lasers, 1360a, 1360b, 1360c, and 1360d, are illustrated in FIG. 16A. An optical coupler 1610 is implemented to couple the pump beams into the fiber loop 1340 at the opposite end from the signal 1310. FIG. 16B shows the spectra of the pump laser beams (e.g., 1361a, 1362a, 1363a, and 1364a) and the respective Brillouin signals (e.g., 1361b, 1362b, 1363b, and 1364b). The optical phase modulator 1320 performs a phase modulation at a frequency $f_m$ on the carrier signal from the signal laser 1310 to produce multiple sidebands. FIG. 16C shows the spectrum of the phase-modulated carrier signal in which all even-order sidebands are in phase with respect to one another.

In order to effect pulse generation, the frequencies of the pump lasers (e.g., 1360a, 1360b, 1360c, 1360d) and the frequency of the signal laser 1310 are adjusted relative to one another so that the Brillouin signals (e.g., 1361b, 1362b, 1363b, and 1364b) are aligned with the first several even-order sidebands (e.g., second-order sidebands 1622a and 1622b, fourth-order sidebands 1624a and 1624b, etc.) in the phase-modulated carrier signal to produce selective Brillouin amplification. The amplified sidebands are in phase and interfere with one another to produce an optical pulse which can be converted into an RF pulse at the output of the photodetector 1370.

The Brillouin gains for the selected even-order sidebands may be controlled by adjusting the power levels of the pump lasers to achieve desired amplitudes of the amplified even-order sidebands. This amplitude control can be used to control the shape of the generated optical or RF pulses.

Figure 17A:
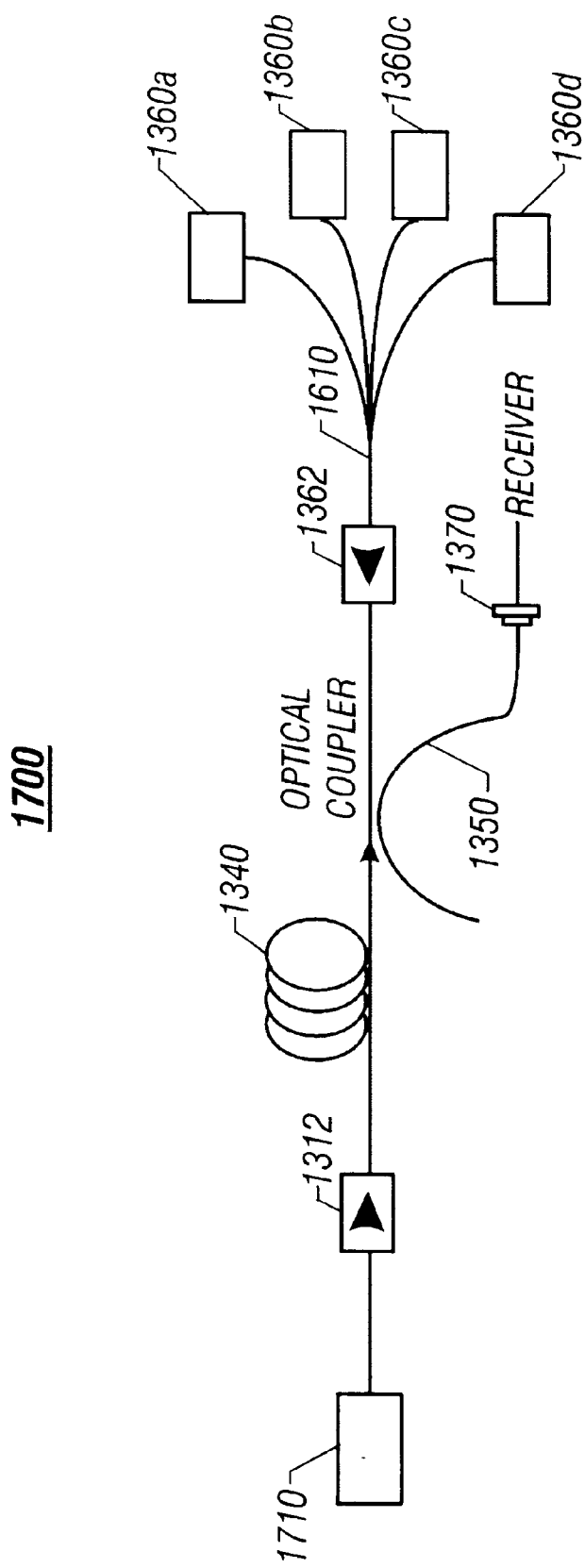
FIG. 17A is a diagram showing a photonic system that uses Brillouin selective sideband amplification to manipulate a mode-locked laser.
Figure 17B:
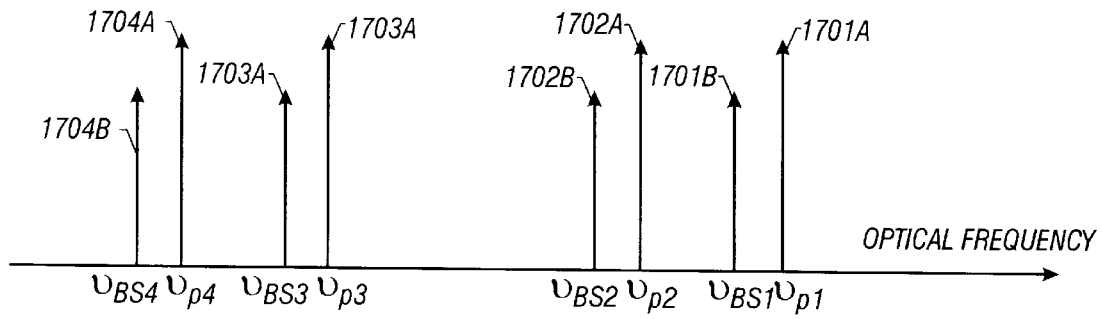
FIG. 17B is a spectrum diagram showing the frequencies of the multiple pump lasers and respective Brillouin signals in the system of FIG. 17A.
Figure 17C:
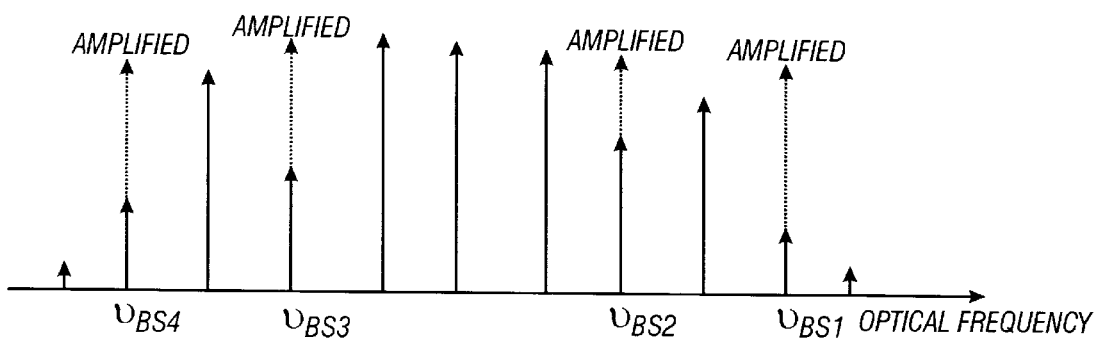
FIG. 17C is a diagram showing the oscillation modes of a mode-locked laser and the selectively amplified modes by the Brillouin amplification in the system of FIG. 17A.

FIG. 17A shows a photonic system 1700 that uses Brillouin selective sideband amplification to manipulate the output of a mode-locked laser 1710. The system 1700 is similar to the system 1600 except that the mode-locked laser 1710 replaces the signal laser 1310 and the phase modulator 1320. The pump lasers are adjusted individually so that the Brillouin signals (e.g., 1701*b* produced by the pump laser beam 1701*a* from the pump laser 1360*a* etc. shown in FIG. 17B) are aligned with a selective set of the oscillation modes of the mode-locked laser 1710. FIG. 17C shows the oscillation modes of the mode-locked laser and the selectively amplified modes by the Brillouin amplification. The amplification of the selected modes can change the pulse shape in the time domain and amplify the pulse.

Figure 17D:
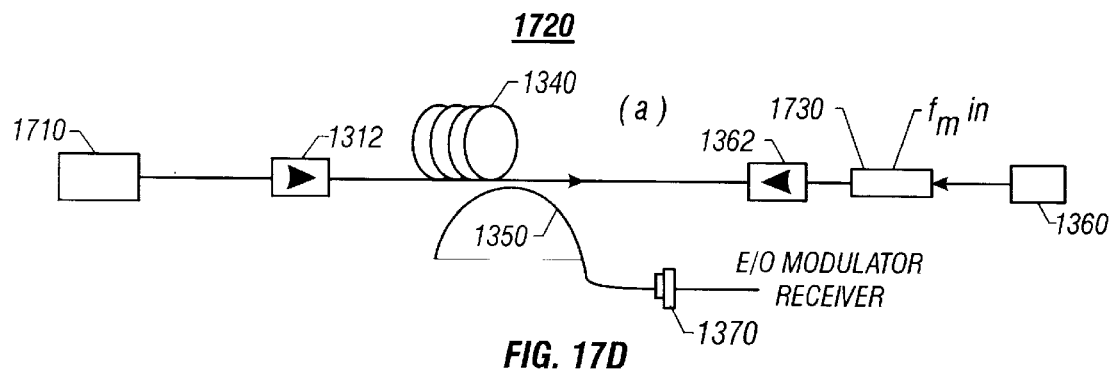
FIG. 17D is a diagram showing an alternative embodiment to the system in FIG. 17A, using a single pump light source.

FIG. 17D shows an alternative embodiment 1720 to the system 1700 of FIG. 17A. A single tunable pump laser 1360 is used. In order to produce multiple frequency components to alter certain laser modes of the mode-locked laser 1710 through BSSA, an optical modulator 1730 can be used to modulate the pump beam to produce multiple sidebands by either phase modulation or amplitude modulation. Each frequency component in the modulated pump beam can produce a back-scattered Brillouin scattering signal. Such produced Brillouin scattering signals can be used to amplify certain selected laser modes to alter the shape of the laser pulse. The driving frequency of the optical modulator 1720 is preferably set at or near the mode spacing of the mode-locked laser 1360 so that the spacing of the modulation sidebands and the spacing of the generated Brillouin scattering signals are equal to or near the mode spacing of the mode-locked laser 1360. The frequency of the pump laser 1360 can be tuned to overlap the Brillouin scattering signals with the selected laser modes. The amplification of each laser mode can be changed by adjusting the modulation depth by changing the RF power of the driving signal of the optical modulator 1730.

Figure 17E:
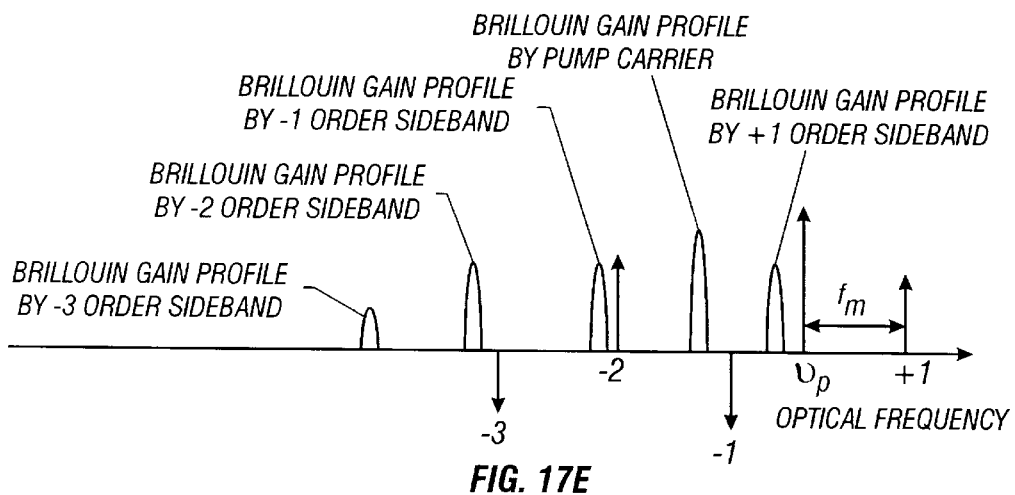
FIG. 17E is a diagram showing the spectrum of the Brillouin signals and the frequency components in the modulated pump beam.
Figure 17F:
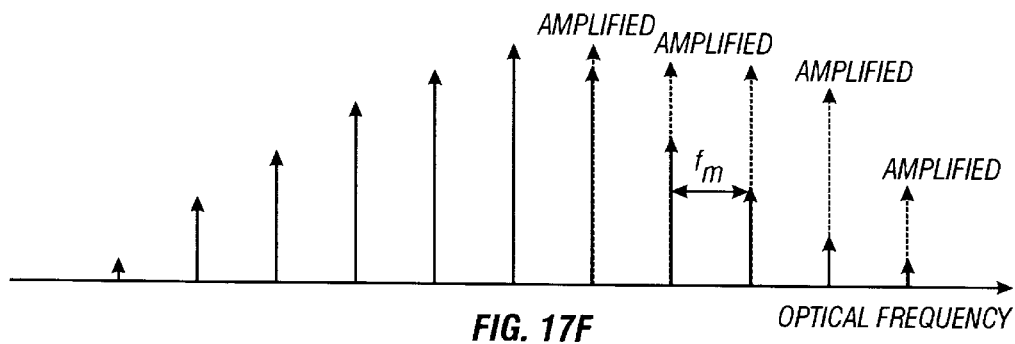
FIG. 17F is a diagram showing the laser modes produced by the mode-locked laser in the system of FIG. 17D.

FIG. 17E shows the spectrum of the Brillouin signals and the frequency components in the modulated pump beam when a phase modulator is used as the modulator 1730 in the system 1720 of FIG. 17D. FIG. 17F shows the laser modes produced by the mode-locked laser 1710. In this example, the pump laser 1360 is tuned to a value so that the Brillouin scattering signals overlap with the laser modes in the high frequency range within a pulse to effect Brillouin amplification.

The scheme of pump modulation used in the system 1720 in FIG. 17D may also be used to generate pulses in a similar manner as the system 1600 in FIG. 16A. The multiple pump lasers (e.g., 1360*a*, 1360*b*, etc.) in FIG. 16A can be replaced by a single tunable pump laser 1360 and an optical modulator 1730. Multiple frequency components can be produced by modulating the pump beam. Specifically, a Brillouin scattering signal is generated by the Brillouin scattering effect in the fiber loop 1340 around each frequency component in the modulated carrier signal (including the baseband at the carrier signal frequency).

The modulation frequency of the optical modulator 1730 may be set to be substantially equal to the modulation frequency of the phase modulator 1312 which modulates the signal beam from the signal laser 1310 or a harmonic frequency of the modulation frequency of the phase modulator 1312. Similar to the operation of the system 1600, the relative frequencies of the signal laser 1310 and the single pump laser 1730 are tuned relative to each other so that the multiple Brillouin scattering signals are at or near selected sidebands in the modulated signal beam. The selected sidebands in the signal beam are therefore amplified and are added to generate a pulse.

In the above description, multiple Brillouin scattering signals produced by either the system 1700 in FIG. 17A or 1720 in FIG. 17D are aligned with certain laser modes by tuning the frequency of the pump lasers or the mode-locked laser. Alternatively, both systems may be operated to intentionally misalign the Brillouin scattering signals with respect to the laser modes within the bandwidth of the Brillouin gain profile. The frequency misalignment can cause an amplified laser mode to have a phase shift or change with respect to the unamplified laser modes. This effect may be understood by the Kramer-Kronig dispersion. As a result, the amplitude and shape of the final laser pulse can be changed due to this frequency misalignment. This technique may also be used to generate optical pulses using the system in FIG. 16A with multiple pump lasers or a single modulated pump laser.

In the system 1720 of FIG. 17D, all amplified laser modes can be phase shifted by approximately the same amount since the frequency misalignment is the same to all amplified laser modes due to the use of the single pump laser 1360. In the system 1700 of FIG. 17A, however, each pump laser may be individually tuned to produce a different frequency misalignment and thereby a different phase shift in a corresponding laser mode.

The above phase-shift technique and the Brillouin gain adjustment may be combined to change both the amplitude and the phase of a laser mode in manipulating the output of the mode-locked laser 1710 or generating a pulse using the system 1600 in FIG. 16A with multiple pump lasers or a single modulated pump beam.

The combination of pulse amplification and pulse shaping makes this system applicable to various applications based on pulsed lasers, including but not limited to, high intensity pulse generation, pump-probe spectroscopic measurements, and nuclear fusion.

8. Automatic Reduction of Fiber Dispersion Effect

Signal fading caused by the fiber dispersion is an undesirable effect present in many microwave photonic systems using fibers. When a modulated optical signal travels in a dispersive fiber, the lower sideband and the upper sideband can have different speeds and therefore accumulate different phases. Because the final received signal produced at the output of the photodetector is the sum of the beats of the optical carrier with the lower sideband and upper sideband respectively, the power of the received signal becomes a periodic function of fiber distance due to the fiber dispersion. At a distance corresponding to an accumulated phase difference of 180° between the lower and upper sidebands, the received signal power is essentially reduced to zero due to the destructive interference.

This problem may be alleviated by filtering out one of the sidebands to prevent the interference between the lower and upper sidebands. This method requires an optical filter of an extremely narrow bandwidth which may not be technically obtainable in many situations. See, for example, K. Yonenaga and N. Takachio, "A fiber chromatic dispersion compensation technique with an optical SBS transmission in optical homodyne detection systems," IEEE Photonics Technol. Lett., Vol. 5, No. 18, pp. 949–951, 1993. Another approach utilizes a single sideband modulator which is more complex than the conventional Mach-Zehnder design. Smith et al., "Technique for optical SSB generation to overcome dispersion penalties in fiber-radio systems," Electron. Lett., Vol. 33, No. 1, pp. 74–75, 1997.

The above signal fading can also be significantly reduced if one of the sidebands is greatly amplified by using the Brillouin selective sideband amplification. This novel technique not only amplifies the received microwave signals, but also automatically removes the signal fading problem caused by fiber dispersion. Such a signal fading elimination can also be applied to the photonic signal down- and up-conversion systems based on the Brillouin selective sideband amplification, where one of the LO sidebands is selectively amplified.

9. Laser Frequency Locking Schemes

The relative frequency drift of the pump and the signal lasers in a Brillouin selective sideband amplification arrangement can cause the Brillouin gain profile to shift in frequency domain. In order to achieve a stable operation, the relative frequency of the pump laser and the signal laser is preferably locked relative to each other so that the drift is confined to be within the Brillouin gain bandwidth, which is approximately 10 MHZ in fibers.

Locking the frequencies of two lasers relative to each other can be complex and difficult and generally requires complicated setups involving phase locked loop, high frequency RF signal detection and processing, and RF frequency references. The Brillouin selective sideband amplification, however, can be used to form a novel technique for stabilizing the relative frequency of two lasers with a much simplified feedback loop and control circuit.

This frequency locking is based on the observation that the Brillouin selective sideband amplification generally increases the power level of the amplified optical sideband so much that it is significantly higher (e.g., 4 to 5 times higher in general) than the power level of the optical carrier. Consequently, the total received optical power (average power) in the photodetector is much higher (e.g., 4 to 5 times higher) with Brillouin selective sideband amplification than without such amplification. Therefore, the total received average optical power can be used as an indication as to whether the frequency of the Brillouin scattering signal is aligned with the sideband to be amplified. By maintaining the total received optical power or photocurrent from the detector within a range near the maximum level, the relative frequency draft between the pump and the signal lasers is kept within a small range tolerable by the system. This effectively locks the two lasers together.

Figure 18A:
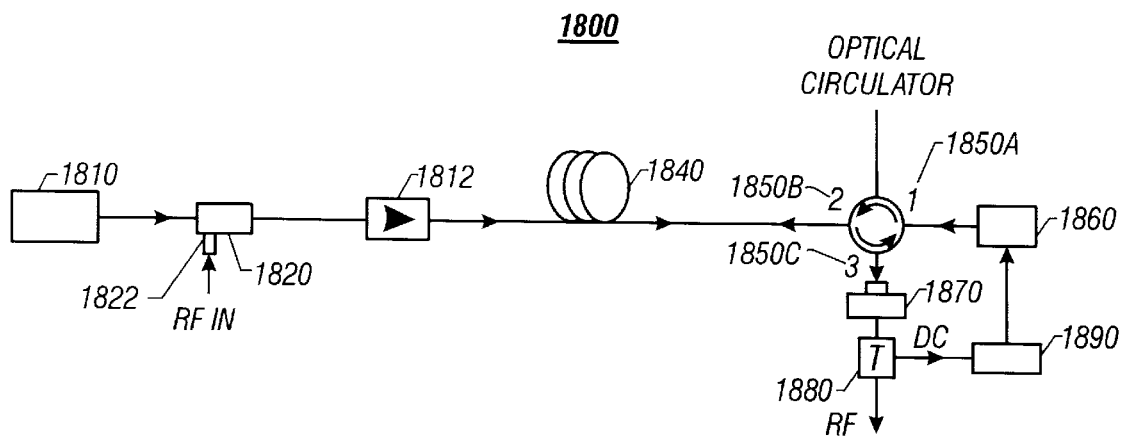
FIG. 18A is a diagram showing one embodiment of the frequency stabilization system of the invention.

An embodiment of the method is illustrated in FIG. 18A. A signal laser 1810 produces a signal beam which is modulated by an electro-optical modulator 1820 before being injected into a fiber loop 1840. A pump laser 1860 is coupled to the fiber loop 1840 from the opposite end to produce a pump laser for BSSA in the fiber loop 1840. This forms a system for the Brillouin selective sideband amplification. In this arrangement, an optical circulator 1850, having three terminals 1850a, 1850b, and 1850c for routing light from the terminals 1850a to 1850b and from the terminals 1850b to 1850c, is used to route the pump light from the pump laser 1860 into the fiber loop 1840 and the signal light from the fiber loop 1840 into a photodetector 1870. Alternatively, a 2×2 optical coupler may also be used to replace the circulator 1850, however with 3 dB optical penalty.

An electrical signal separator 1880 (e.g., a bias T) is connected at the output of the photodetector 1870 to separate low-frequency signal components (including the DC component) and high-frequency components of the electrical signal from the photodetector 1870. The high-frequency RF portion of the signal from the photodetector 1870 is directed to subsequent electronics for signal processing. The low-frequency portion of the signal, whose magnitude is an indication of the frequency alignment between an optical sideband to be amplified and the amplifying Brillouin signal effected by the pump laser, is directed to a control electronic circuit 1890 of either digital or analog in nature. The control circuit 1890 is configured to maintain the low-frequency signal at or near a maximum level by adjusting the frequency of the pump laser 1860 with respect to a reference frequency in the RF-modulated signal beam. Thus, the photodetector 1870, the signal separator 1880, and the control circuit 1890 effect a feedback loop for the pump laser 1860. The criterion for separating the low-frequency and high-frequency components is largely determined by the characteristics of the feedback loop such as the bandwidth or response speed. For example, in certain applications, low frequency components may be defined as signals below 1 MHZ or below several KHz in some other applications.

Figure 18B:
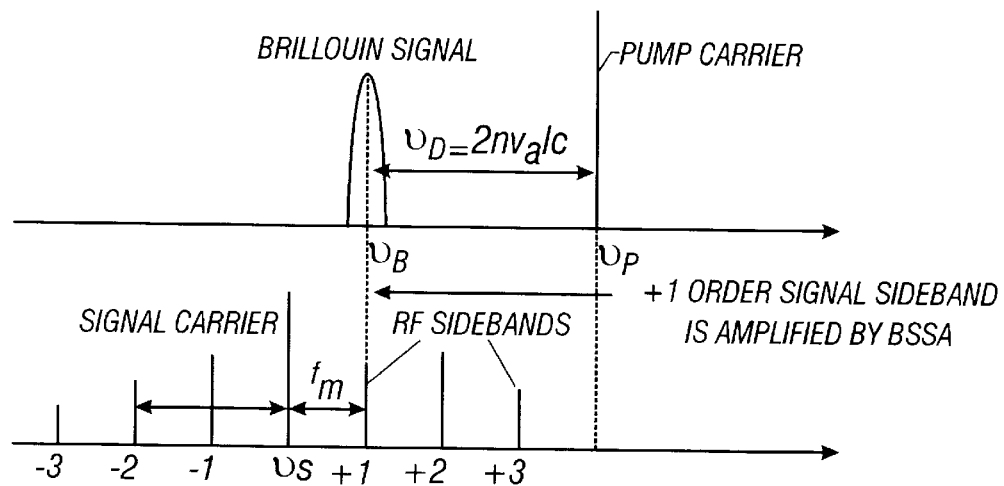
FIG. 18B shows an exemplary spectrum of the pump and signal lasers in which the +1 order sideband is selectively amplified.

The electro-optical modulator 1820 modulates the signal carrier beam from the signal laser 1810 to produce multiple sidebands in the signal carrier beam by an RF modulation signal at a modulation frequency $f_m$ at an RF input port 1822. As shown in FIG. 18B, the RF sidebands are harmonics of the modulation frequency $f_m$. When the frequencies of the signal and the pump lasers 1810 and 1860 are such that the frequency alignment between the optical sideband to be amplified and the amplifying Brillouin signal derived from the pump beam is perfect, a maximum low-frequency signal is generated at the photodetector 1870. This happens when the Brillouin signal at $(v_P-v_D)$ overlaps with the selected sideband at $(v_s+jf_m)$, i.e., $$v_P - v_D = v_S + jf_m,$$

where $v_P$ is the frequency of the pump laser 1870, $v_S$ frequency of the signal laser 1810, $v_D$ is the frequency difference between the pump and the Brillouin signals, $f_m$ is the modulation frequency of the RF signal at the input port 1822, and j is an integer (j=±1, ±2, ±3 . . . ) representing different harmonic orders of the modulation. The frequency shift, $v_D$, in the Brillouin signal can be expressed by $v_D = 2nu_a/\lambda_p$, where $u_a$ is the velocity of the acoustic wave in the medium, n is the refractive index of the fiber loop 1840, and $\lambda_p$ is the wavelength of the optical pump wave. Therefore, under the above perfect alignment, the frequency of the pump laser 1860 can be written as $$v_P = \frac{v_S + jf_m}{1 - \frac{2nu_a}{c}},$$

where c is the speed of light.

When the relative frequency drifts away from the perfect alignment, the low-frequency signal produced by the photodetector 1870 decreases. Such a decrease can be used to produce an error signal in the control circuit 1890. This error signal is fed back to the pump laser 1860 to adjust the frequency of the pump laser 1860 in a manner to reduce or minimize the error signal. Through such a low-frequency-signal feedback, the frequency of the pump laser 1860 is stabilized relative to the frequency of the signal laser 1810.

The frequency stabilization scheme shown in FIG. 18A has a simple layout, is easy to implement, and can manufactured at low cost because it does not require a high-frequency circuit, a rf reference source, or a phase locked loop. The above scheme can also be used in any of the photonic systems based on the Brillouin selective sideband amplification as described above, including the signal mixing and signal up-conversion systems.

Figure 19A:
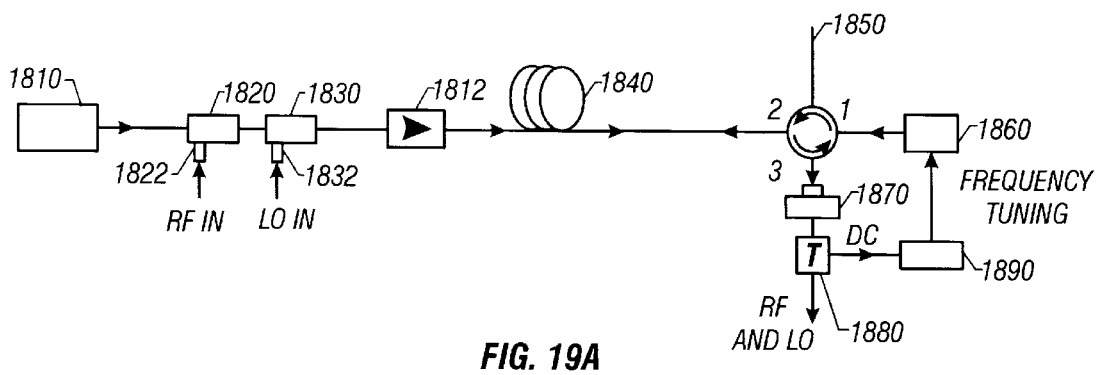
FIG. 19A is a diagram showing another embodiment of the frequency stabilization system of the invention having an additional optical modulator and a RF local oscillator.
Figure 19B:
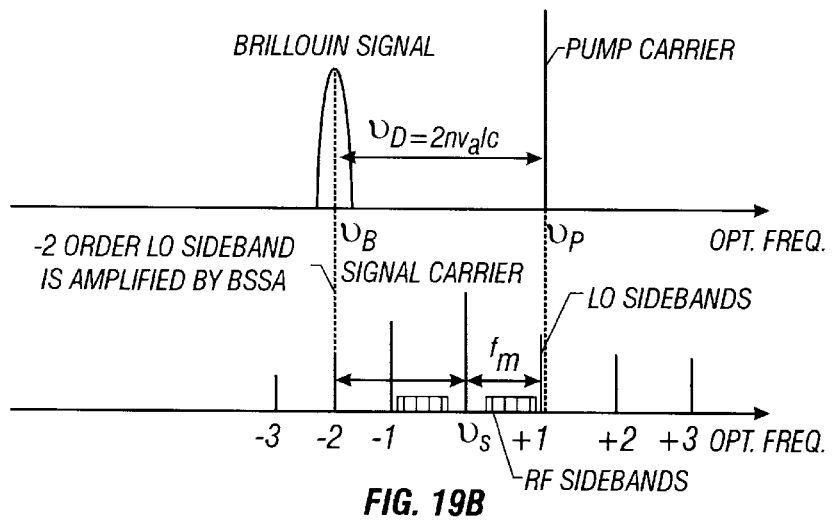
FIG. 19B shows an exemplary spectrum of the pump and signal lasers in which the −2 order sideband is selectively amplified.

FIGS. 19A and 19B show another embodiment of the invention where a local oscillator ("LO") is added to further modulate the signal beam and to produce LO sidebands by implementing a second electro-optic modulator 1830. In this embodiment, the pump laser 1810 can be locked to a selected LO sideband which is amplified by the Brillouin selective sideband amplification. Referring to an example illustrated in FIG. 19B, the control circuit 1890 stabilizes the pump frequency with respect to the signal laser 1810 by locking the Brillouin signal at the −2 order of the LO sideband.

10. Frequency Stabilization of Multiple Lasers

Many dense optical wavelength division multiplexing (WDM) systems require a channel spacing on the order of 10 GHZ or less in order to achieve a high overall data rate by increasing the number of channels within the available bandwidth. For such a small channel spacing, the frequencies of the data transmitting lasers need be controlled and stabilized within a small linewidth (e.g., 1 MHZ or less if possible). In addition, a large number of laser transmitters should be locked relative to one another with a fixed frequency spacing. For increased system flexibility, the frequency locking of multiple lasers should be able to implement either locally or remotely. In addition, the implementation of such a massive laser frequency locking scheme should be easy and at low cost to be practical in certain applications.

Figure 20A:
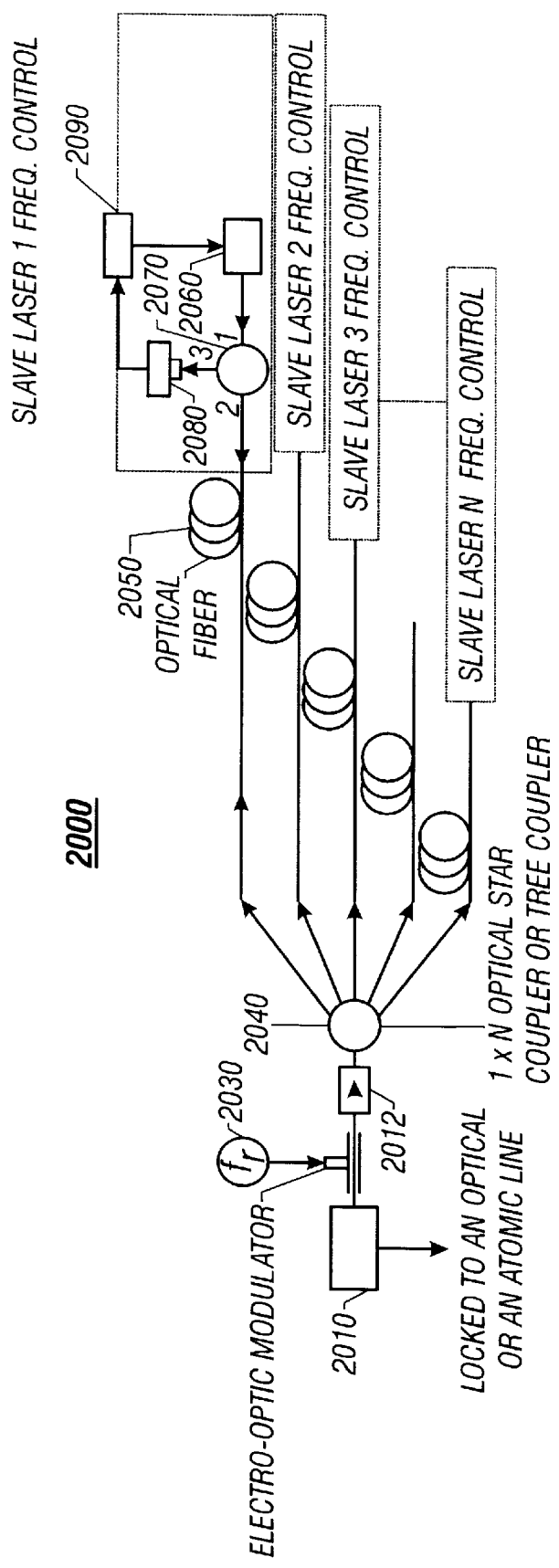
FIG. 20A is a diagram showing one embodiment of frequency stabilization of multiple lasers in a photonic system.
Figure 20B:
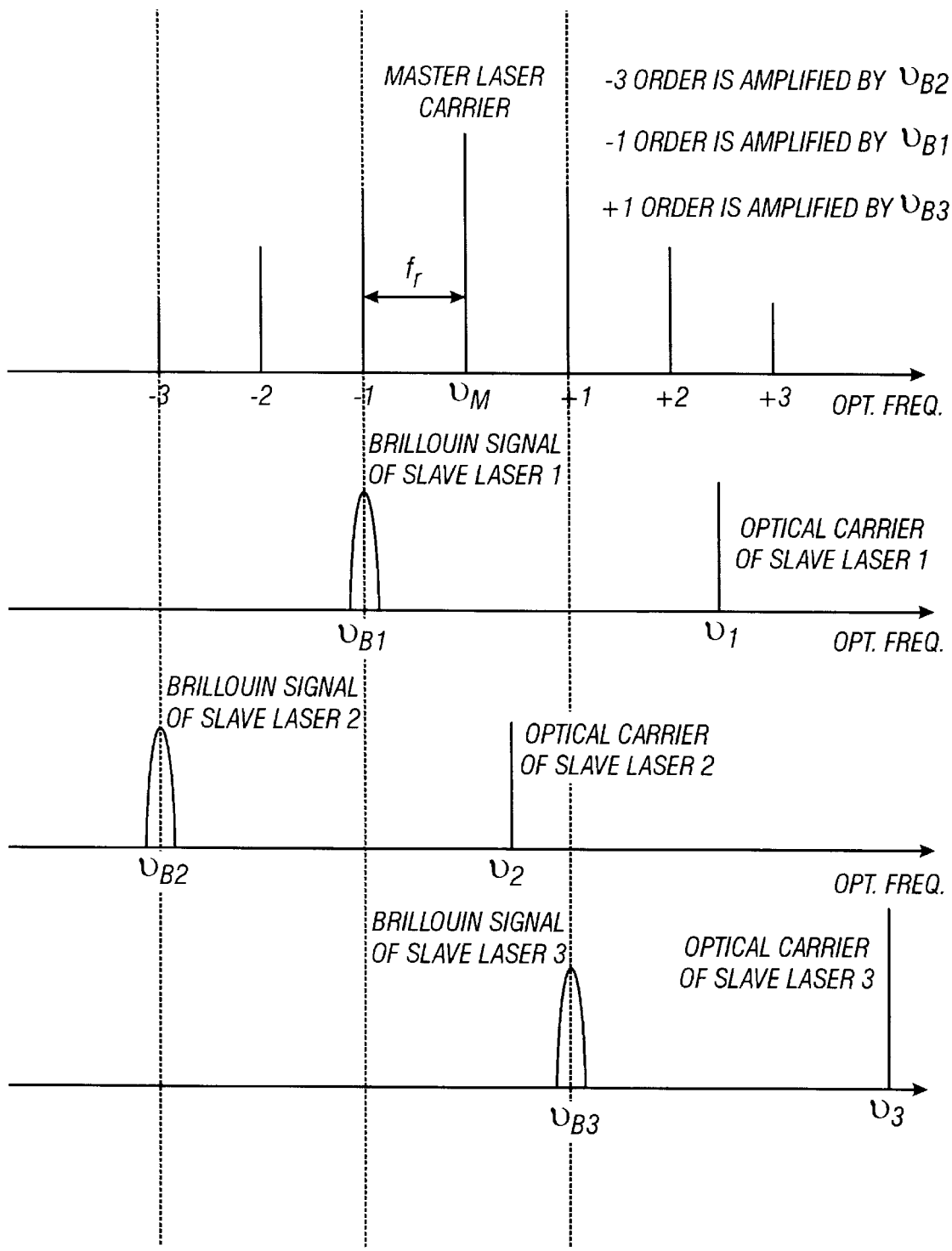
FIG. 20B shows an exemplary spectrum of the master lasers and slave lasers in the system of FIG. 20A.

The frequency locking scheme described above can be extended to lock multiple lasers in a dense WDM system. Referring to FIG. 20A, one embodiment of the frequency locking system comprises a master laser 2010 whose frequency $v_M$ is stabilized by, for example, locking to a frequency reference such as an optical cavity, an atomic absorption line, or using other frequency stabilization schemes. The output of the master laser 2010 passes through an electro-optic phase or amplitude optical modulator 2020 before being split into N paths by a 1×N optical coupler 2040 (e.g., a star coupler or tree coupler). A stable rf source 2030 with a frequency of $f_r$ drives the optical modulator 2020 to impose sidebands onto the optical carrier produced by the master laser 2010, as shown in the spectrum of FIG. 20B. The outputs from the coupler 2040 are respectively fed into N different optical fiber loops. At the opposite end of each fiber loop (e.g., a first fiber loop 2050), a slave laser (e.g., a fist slave laser 2060) is connected to inject a pump beam into the fiber loop via an optical circulator (e.g., a first circulator 2070) or optical coupler in the opposite direction of the optical carrier to selectively amplify one of the sidebands. For example, the kth loop and the respective kth slave laser may be used to selectively amplify the jth order sideband. The optical signal from the master laser 2010, including the carrier and sidebands, exits from port 3 of the kth circulator and is detected by a photodetector (e.g., a first photodetector 2080 connected to the first circulator 2070). When the pump frequency $v_{Pk}$ of the kth slave laser is tuned to the following frequency $$v_{Pk} = \frac{v_M + jf_r}{1 - \frac{2nu_a}{c}},$$

the total optical power received at the photodetector is maximized due to the Brillouin selective sideband amplification. When the frequency $v_{Pk}$ of the kth slave laser drifts away from the above optimal frequency, the low-frequency photocurrent form the photodetector decreases. Such a decrease causes the control circuit (e.g., a first control circuit 2090 connected to the first slave laser 2060) to produce an error signal. This error signal is then used to control the kth slave laser to reduce or minimize the error signal. Through such a low-frequency signal feedback, the frequency of the kth slave laser is stabilized with respected to that of the master laser.

Note that different slave lasers may be locked either via the same sideband or different sidebands. Slave lasers may also be frequency locked to the carrier frequency of the master laser 2010 (j=0). The frequency spacing for slave lasers that are locked via adjacent sidebands is:

$$\Delta v = v_k(j+1) - v_k(j) = \frac{f_r}{1 - \frac{2nu_a}{c}}.$$

Since $2nu_a/c$ is usually on the order of $10^{-4}$ in fibers, the channel spacing of the slave lasers is approximately the rf driving frequency at $f_r$. Because the bandwidth of the Brillouin gain is on the order of 10 MHZ in fibers, the minimum channel spacing is also on the order of 10 MHZ. Such a small channel spacing also makes this frequency locking method practical for optical frequency division multiplexing ("OFDM") systems.

Figure 21:
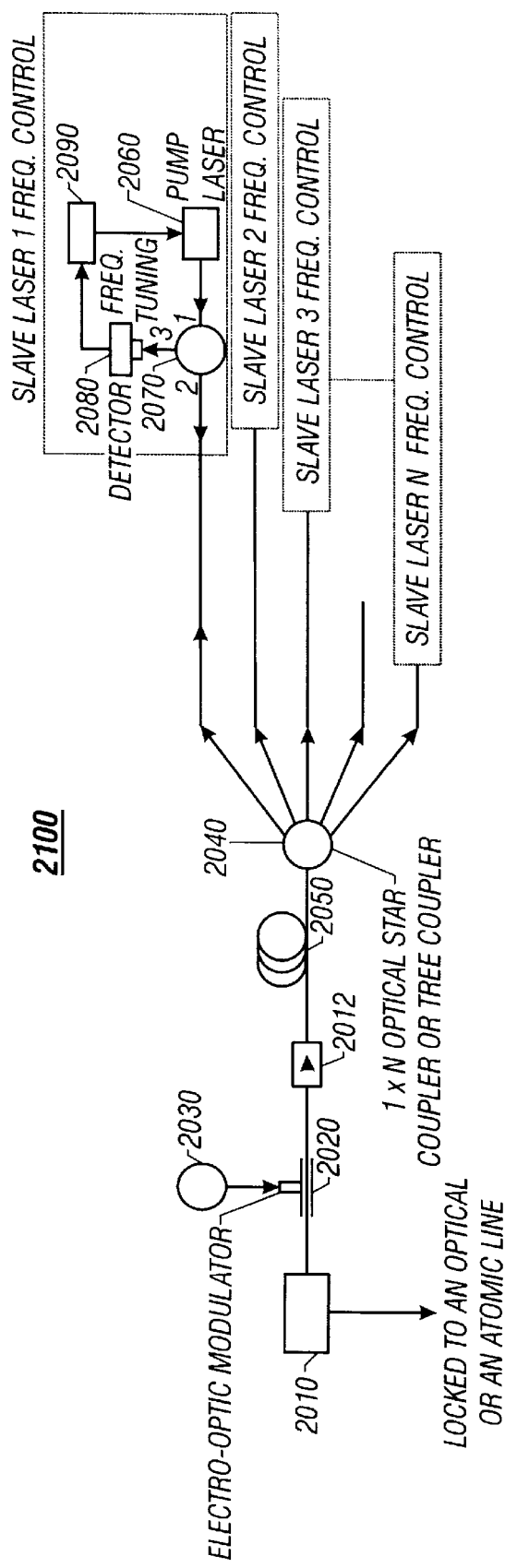
FIG. 21 is a diagram of an alternative embodiment of FIG. 20A.
Figure 17D:
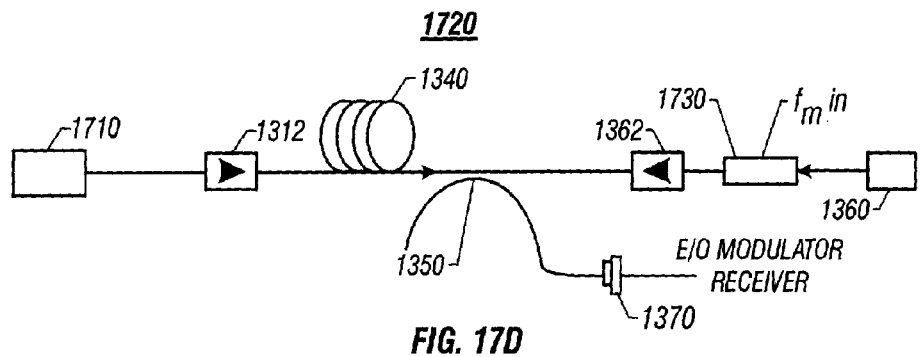
Figure 17E:
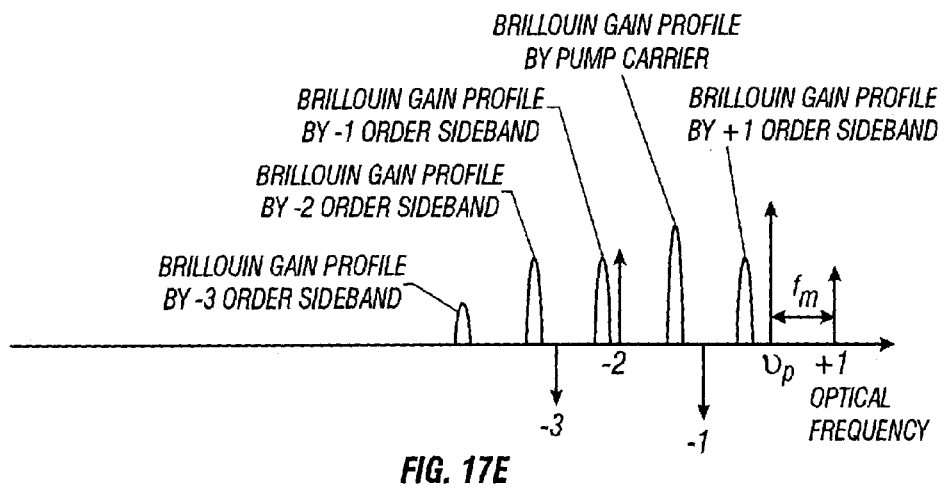
Figure 17F:
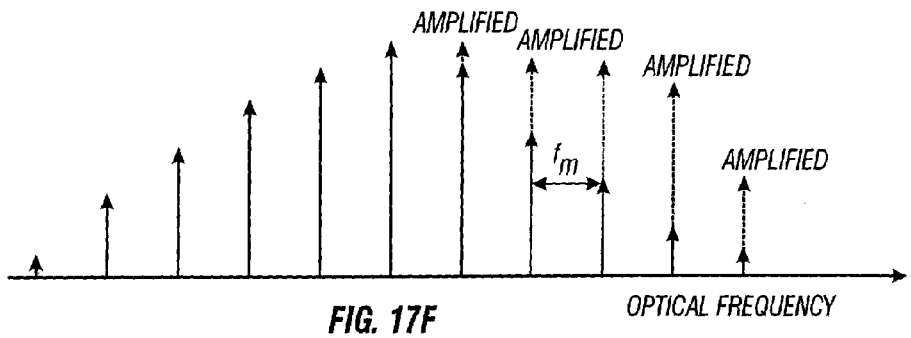

FIG. 21 shows an alternative embodiment of the system in FIG. 20A. A single fiber loop 2050 is located between the optical modulator 2020 and the 1×N optical coupler 2040 to produce multiple Brillouin signals for different slave lasers. This configuration may be used when all slave lasers are located at the same location with the optical coupler 2040.

One aspect of the systems shown in FIGS. 20A and 21 is that the relative location of the master laser 2010 and the slave lasers can be flexible. For example, the master laser 2010 and the slave lasers may be disposed at different locations separated by tens of kilometers using long optical fibers that also provide the Brillouin gain. All lasers may also be at the same location by coiling the fibers. Such a feature adds flexibility for practical WDM or FDM systems.

Although the present invention has been described in detail with reference to a preferred embodiment, various modifications and enhancements may be made without departing from the scope and spirit of the present invention.

For example, the Brillouin selective sideband amplification may be used to form a tunable filter with gain. Any part of the RF spectrum may be selectively amplified by tuning the frequency of the pump laser, the frequency of the signal laser, or RF carrier frequency. Such a tuning and amplification capability can be used in a broadcasting system, such as CATV, where each receiver has a pump laser so that each user can tune the frequency of the pump laser to select a channel. The same concept can also be used in frequency division multiplexing systems for signal demultiplexing.

In addition, because of the agile tunability, the Brillouin amplifier should be useful in secure communication systems where the carrier frequency of the transmitter may hop rapidly. In order for a receiver to receive the correct data in such a system, it must be tuned synchronously with the transmitter. Armed with a key sequence for carrier frequency, a receiver equipped with a Brillouin amplifier is ideal for such a secure communication system.

For another example, in the frequency stabilization schemes disclosed in FIGS. 18A and 19A, the pump laser may be a stabilized laser and the signal laser can be locked to the pump laser by having a similar feedback loop with the control circuit connected to control the frequency of the signal laser.

Furthermore, although lasers are used as exemplary light sources in the above description, any light sources that can produce monochromatic light at desired wavelengths may be used. For example, an incoherent light source such as a LED may be used; or a wide-spectral light source may be combined with a narrow band-pass filter to form the light source.

These variations and other modifications are intended to be encompassed by the following claims.

What is claimed is:

1. An opto-electronic device, comprising:
   a signal light source operable to produce an optical signal beam at an optical carrier frequency, said signal beam having modulated signal sidebands at different sideband frequencies with respect to said optical carrier frequency;
   an optical medium disposed relative to said light source to receive said signal beam, said optical medium having material properties to exhibit an electrorestrictive effect suitable for a Brillouin scattering process; and
   a pump light source disposed relative to said optical medium and configured to produce at least one pump beam at an optical pump frequency that propagates in said optical medium in an opposite direction to said signal beam, said pump beam operating to produce a Brillouin scattering signal at a Brillouin signal frequency different from said optical carrier frequency that propagates in the same direction as said signal beam,
   wherein said optical carrier frequency and said optical pump frequency are displaced relative to each other so that said Brillouin signal frequency and a selected sideband in said signal beam are separated from each other by less than a gain bandwidth of said Brillouin scattering signal to amplify said selected sideband.

2. A device as in claim 1, wherein said signal light source comprises:
   a monochromatic light-emitting element operable to produce a monochromatic optical beam at said optical carrier frequency; and
   an optical modulator disposed relative to said light-emitting element to receive and modulate said monochromatic optical beam to superimpose said sidebands on said monochromatic optical beam to produce said signal beam.

3. A device as in claim 2, wherein said optical modulator comprises an electro-optic modulator.

4. A device as in claim 2, wherein said optical modulator comprises an optical phase modulator which produces a phase modulation on said monochromatic optical beam.

5. A device as in claim 2, wherein said optical modulator comprises an optical amplitude modulator which produces an amplitude modulation on said monochromatic optical beam.

6. A device as in claim 5, wherein said optical modulator is a Mach-Zehnder electro-optic modulator.

7. A device as in claim 2, wherein said optical modulator is configured to modulate said monochromatic optical beam at two different modulation frequencies to respectively produce two sets of sidebands with respect to said optical carrier frequency.

8. A device as in claim 1, further comprising an optical coupler disposed relative to said optical medium and configured to couple said signal beam and said Brillouin scattering signal to produce an optical output.

9. A device as in claim 1, further comprising a photodetector disposed relative to said optical medium to receive a portion of said signal beam and said Brillouin scattering signal to produce an electrical signal indicative of at least one beat signal between two of said sidebands and said carrier frequency.

10. A device as in claim 9, wherein said sidebands in said signal beam are produced by a phase modulation and said amplification of said selected sideband effects a conversion from said phase modulation to an amplitude modulation in said electrical signal from said photodetector.

11. A device as in claim 10, wherein said selected sideband is a multiple-order sideband caused by a phase modulation at a modulation frequency and said amplification of said selected sideband effects a frequency multiplication in said electrical signal.

12. A device as in claim 2, wherein said optical medium includes an optical fiber loop.

13. A device as in claim 2, wherein said pump light source includes a pump laser which is operable to produce said pump beam and said monochromatic light-emitting element is a signal laser.

14. A device as in claim 13, further comprising:
   a photodetector disposed relative to said optical medium to receive a portion of said signal beam and said Brillouin scattering signal to produce an electrical signal indicative of at least one beat signal between two signals among said sidebands and said signal beam at said carrier frequency;
   an electrical signal separator connected to said photodetector to receive said electrical signal and configured to separate a low-frequency signal from said electrical signal which represents an average optical power received by said photodetector and is indicative of a frequency separation between said Brillouin scattering signal and said selected sideband; and
   a control circuit connected to said signal separator to receive said low-frequency signal and configured to control at least one of said signal laser and said pump laser based on said low-frequency signal to maintain said frequency separation within a predetermined frequency range.

15. A device as in claim 1, wherein said pump light source includes an electrically controllable light-emitting device which directly produces said optical signal beam with said sidebands.

16. An opto-electronic device, comprising:
   a signal light source operable to produce an optical carrier signal at an optical carrier frequency;
   a modulation element operable to modulate said carrier signal to produce a modulated signal that has a plurality of frequency components at different frequencies with respect to said optical carrier frequency;
   an optical medium exhibiting an electrorestrictive effect suitable for a Brillouin scattering process and being located relative to said signal light source to receive said modulated signal; and
   a pump light source disposed relative to said optical medium and configured to produce a pump signal at an optical pump frequency that propagates in said optical medium in an opposite direction of said modulated signal, said pump signal interacting with said optical medium to produce a Brillouin scattering signal at a Brillouin signal frequency that propagates in the same direction as said modulated signal,
   wherein said optical carrier frequency and said optical pump frequency are displaced relative to each other to substantially align said Brillouin signal frequency with a selected frequency component in said modulated signal, different from said optical carrier frequency, to amplify said selected frequency component.

17. A device as in claim 16, wherein said signal light source is electrically controllable and said modulation element is a control circuit for said signal light source, said control circuit operating to control said signal light source and to modulate said carrier signal.

18. A device as in claim 16, wherein said modulation element includes an optical modulator disposed relative to said signal light source to receive said carrier signal and configured to superimpose said frequency components on said carrier signal to produce said modulated signal.

19. A device as in claim 18, wherein said optical modulator comprises an electro-optic modulator.

20. A device as in claim 18, wherein said optical modulator comprises an optical phase modulator which produces a phase modulation on said carrier signal.

21. A device as in claim 18, wherein said optical modulator comprises an optical amplitude modulator which produces an amplitude modulation on said carrier signal.

22. A device as in claim 16, further comprising a photodetector disposed relative to said optical medium to receive and convert a portion of said modulated signal and said Brillouin scattering signal into an electrical signal indicative of at least one beat signal between two signals among said sidebands and said carrier signal.

23. A device as in claim 22, wherein said modulation element is configured to modulate said carrier signal at two different modulation frequencies to respectively produce a first and second sets of frequency components with respect to said optical carrier frequency and said amplification of said selected frequency component effects a signal mixing in said electrical signal of said first and second sets of frequency components.

24. A device as in claim 23, wherein said selected frequency component is amplified to have an amplitude larger than said carrier signal, thereby effecting a gain in said signal mixing.

25. A device as in claim 16, wherein said modulation element is configured to produce a phase modulation on said carrier signal at a modulation frequency.

26. A device as in claim 25, wherein said amplification of said selected frequency component effects an amplitude modulation signal in said electrical signal to represent said phase modulation.

27. A device as in claim 25, wherein said selected frequency component is separated from said carrier signal by a multiple of said modulation frequency to effect a frequency multiplication.

28. A device as in claim 25, wherein said pump light source is a pump laser and further comprising a plurality of additional pump lasers disposed relative to said optical medium and configured to produce a plurality of additional pump signals at additional pump frequencies that propagate in said optical medium in said opposite direction of said modulated signal and interact with said optical medium to produce additional Brillouin scattering signals in the same direction as said modulated signal, wherein said Brillouin scattering signal and said additional Brillouin scattering signals are respectively aligned with a plurality of specified frequency components to generate an optical pulse.

29. A device as in claim 28, wherein at least one power level of said pump laser and said additional pump lasers is varied to control a pulse profile of said optical pulse.

30. A device as in claim 28, wherein at least one frequency of said pump laser and said additional pump lasers is varied with respect to a responding Brillouin scattering signal to control a pulse profile of said optical pulse.

31. A device as in claim 28, wherein said plurality of specified frequency components are in phase with respect to one another.

32. A device as in claim 28, wherein said plurality of specified frequency components include even-order frequency components produced by said modulation element.

33. A device as in claim 16, wherein said signal light source is a signal laser and said pump light source is a pump laser and further comprising:
 a photodetector disposed relative to said optical medium to receive a portion of said carrier signal and said Brillouin scattering signal to produce an electrical signal indicative of at least one beat signal between two signals among said sidebands and said carrier signal;
 an electrical signal separator connected to said photodetector to receive said electrical signal and configured to separate a low-frequency signal from said electrical signal indicative of a frequency separation between said Brillouin scattering signal and said selected frequency component; and
 a control circuit connected to said signal separator to receive said low-frequency signal and configured to control at least one of said signal laser and said pump laser based on said low-frequency signal to lock said optical carrier frequency and said pump frequency relative to each other.

34. A device as in claim 33, wherein said signal laser is stabilized relative to a frequency reference and said control circuit is connected to said pump laser to adjust said optical pump frequency according to said low-frequency signal, thereby locking said pump laser to said signal laser.

35. A device as in claim 33, wherein said pump laser is stabilized relative to a frequency reference and said control circuit is connected to said signal laser to adjust said optical carrier frequency according to said low-frequency signal, thereby locking said signal laser to said pump laser.

36. An opto-electronic system, comprising:
 a signal light source operable to produce a monochromatic optical carrier signal at an optical carrier frequency;
 a first electro-optic modulator disposed relative to said signal light source to receive said optical carrier signal and configured to modulate said optical carrier signal at a first modulation frequency to produce a modulated signal that has a first set of modulation sidebands spaced from one another with respect to said optical carrier frequency;
 a second electro-optic modulator disposed relative to said first optical modulator to receive and modulate said modulated signal at a second modulation frequency to produce a second set of modulation sidebands spaced from one another with respect to said optical carrier frequency and said first set of modulation sidebands;
 an optical medium exhibiting an electrorestrictive effect suitable for a Brillouin scattering process and being positioned relative to said second electro-optic modulator to receive said modulated signal; and
 a pump light source disposed relative to said optical medium and configured to produce a monochromatic pump signal at an optical pump frequency that propagates in said optical medium in an opposite direction to said modulated signal, said pump signal interacting with said optical medium to produce a Brillouin scattering signal at a Brillouin signal frequency that propagates in the same direction as said modulated signal, wherein said optical carrier frequency and said optical pump frequency are displaced relative to each other to substantially align said Brillouin signal frequency with a selected modulation sideband from said first and second sets of modulation sidebands in said modulated signal to amplify said selected modulation sideband.

37. A system as in claim 36, wherein said first and second electro-optic modulators are phase modulators that produce optical phase modulations.

38. A system as in claim 37, wherein said selected modulation sideband is selected from said first set of modulation signal to effect a frequency up-conversion of one of said second set of modulation sidebands.

39. A system as in claim 37, wherein said selected modulation sideband is selected from said first set of modulation signal to effect a frequency down-conversion of one of said second set of modulation sidebands.

40. A system as in claim 37, wherein said first and second phase modulators are driven by a common electrical driving signal so that said first modulation frequency is equal to said second modulation signal.

41. A system as in claim 40, wherein said first and second phase modulators are in phase with respect to each other.

42. A system as in claim 36, wherein said first electro-optic modulator is driven by an electrical local oscillator signal and said second electro-optic modulator is driven by an information-bearing electrical signal.

43. A system as in claim 36, wherein said optical medium is an optical fiber.

44. A system as in claim 36, further comprising a second optical medium that exhibits an electrorestrictive effect suitable for a Brillouin scattering process, said second optical medium disposed to optically connect said first and second optical modulators.

45. An opto-electronic system, comprising:
a signal laser operable to produce an optical carrier signal at an optical carrier frequency;
an electro-optic modulator disposed relative to said signal laser and configured to modulate said carrier signal at a modulation frequency to produce a modulated signal that has a plurality of modulation sidebands located in frequency domain with respect to said optical carrier frequency;
an optical medium exhibiting an electrorestrictive effect suitable for a Brillouin scattering process and being located relative to said electro-optic modulator to receive said modulated signal; and
a pump light source disposed relative to said optical medium and configured to produce a pump signal having a plurality of optical pump frequency components at different optical pump frequencies, said pump signal propagating in said optical medium in an opposite direction to said modulated signal and interacting with said optical medium to produce a plurality of Brillouin scattering signals that correspond to said optical pump frequency components and propagate in the same direction as said modulated signal, wherein said optical carrier frequency and said optical pump frequencies are displaced relative to each other to respectively align said Brillouin scattering signals with selected modulation sidebands in said modulated signal to effect Brillouin amplification of said selected modulation sidebands.

46. A system as in claim 45, wherein said selected modulation sidebands are chosen to interact with one another to produce an optical pulse.

47. A system as in claim 45, wherein said pump light source comprises a plurality of light-emitting devices operable to produce optical beams at said optical pump frequencies.

48. A device as in claim 47, wherein at least one power level of said light-emitting devices is varied to control a relative amplitude distribution of said selected modulation sidebands.

49. A device as in claim 47, wherein at least one frequency of said light-emitting devices is varied with respect to a responding Brillouin scattering signal to control a relative phase distribution of said selected modulation sidebands.

50. A system as in claim 45, wherein said pump light source comprises:
a light-emitting device operable to produce monochromatic light at a prespecified frequency; and
an optical modulator disposed relative to said light-emitting device and configured to modulate said monochromatic light to produce said optical pump frequency components.

51. A system as in claim 50, wherein said optical modulator is an electro-optic phase modulator or an electro-optic amplitude modulator.

52. An opto-electronic system, comprising:
a mode-locked laser operable to produce an optical pulse that includes a plurality of oscillation laser modes at different oscillation laser frequencies;
an optical medium exhibiting an electrorestrictive effect suitable for a Brillouin scattering process and being located relative to said mode-locked laser to receive said optical pulse; and
a pump light source disposed relative to said optical medium and configured to produce a pump signal having a plurality of optical pump frequency components at different optical pump frequencies, said pump signal propagating in said optical medium in an opposite direction to said optical pulse and interacting with said optical medium to produce a plurality of Brillouin scattering signals that correspond to said optical pump frequency components and propagate in the same direction as said optical pulse.

53. A system as in claim 52, wherein said optical pump frequencies are adjusted to respectively align said Brillouin scattering signals with selected oscillation laser modes in said optical pulse to effect Brillouin amplification of said selected oscillation laser modes and to alter a shape of said optical pulse.

54. A system as in claim 53, wherein said pump light source comprises a plurality of light-emitting devices operable to produce optical beams at said optical pump frequencies.

55. A device as in claim 54, wherein at least one power level of said light-emitting devices is varied to control a relative amplitude distribution of said selected oscillation laser modes.

56. A device as in claim 54, wherein at least one frequency of said light-emitting devices is varied with respect to a responding Brillouin scattering signal to control a relative phase distribution of said selected oscillation laser modes.

57. A system as in claim 52, wherein said pump light source comprises:
a light-emitting device operable to produce monochromatic light at a prespecified frequency; and
an optical modulator disposed relative to said light-emitting device and configured to modulate said monochromatic light to produce said optical pump frequency components.

58. A system as in claim 57, wherein said optical modulator is an electro-optic phase modulator or an electro-optic amplitude modulator.

59. An opto-electronic system, comprising:
- a signal laser operable to produce an optical carrier signal at an optical carrier frequency;
- an electro-optic modulator disposed relative to said signal laser and configured to modulate said carrier signal at a modulation frequency to produce a modulated signal that has a plurality of modulation sidebands located in frequency domain with respect to said optical carrier frequency;
- an optical medium exhibiting an electrorestrictive effect suitable for a Brillouin scattering process and being located relative to said electro-optic modulator to receive said modulated signal;
- a first pump laser disposed relative to said optical medium and configured to produce a first pump signal at a first optical pump frequency, said first pump signal propagating in said optical medium in an opposite direction to said modulated signal and interacting with said optical medium to produce a Brillouin scattering signal that propagates in the same direction as said modulated signal; and
- a first opto-electronic control loop disposed relative to said optical medium to receive a portion of said modulated signal and said Brillouin scattering signal and configured to control said first pump laser to lock said first pump frequency with respect to said optical carrier frequency produced by said signal laser.

60. A system as in claim 59, wherein said first opto-electronic control loop comprises:
- a photodetector disposed relative to said optical medium to receive said portion of said modulated signal and said Brillouin scattering signal to produce an electrical signal indicative of at least one beat signal between two signals among said modulation sidebands and said carrier signal;
- an electrical signal separator connected to said photodetector to receive said electrical signal and configured to separate a low-frequency signal from said electrical signal which represents an average optical power received by said photodetector and is indicative of a frequency separation between said Brillouin scattering signal and a selected modulation sideband; and
- a control circuit connected to said signal separator to receive said low-frequency signal and configured to control said first pump laser based on said low-frequency signal to maintain said frequency separation within a predetermined frequency range.

61. A system as in claim 59, further comprising:
- a plurality of additional pump lasers disposed relative to said optical medium and configured to produce a plurality of additional pump signals at a plurality of additional optical pump frequencies that propagate in said optical medium in an opposite direction to said modulated signal and interact with said optical medium to produce a plurality of additional Brillouin scattering signals in the same direction as said modulated signal; and
- a plurality of additional opto-electronic control loops disposed relative to said optical medium to respectively receive a portion of said modulated signal and said Brillouin scattering signal, each of said additional control loops operable to control a corresponding additional pump laser to lock said corresponding additional pump laser with respect to said signal laser.

62. A method for manipulating signals based on optical Brillouin amplification, comprising:
- modulating an optical carrier signal which is at a carrier frequency to produce a modulated signal having a plurality of first modulation sidebands with respect to said carrier frequency;
- providing an optical medium which exhibits an electrorestrictive effect suitable for a Brillouin scattering process;
- directing said modulated signal into said optical medium in a first direction;
- injecting a pump signal at a pump frequency in a second direction opposite to said first direction into said optical medium to produce a Brillouin scattering signal that propagates in said first direction and has a frequency different from said carrier frequency; and
- adjusting a relative frequency between said carrier frequency and said pump frequency to substantially overlap said Brillouin scattering signal with a selected first modulation sideband to amplify said selected first modulation sideband.

63. A method as in claim 62, wherein the step of modulating said optical carrier signal is a phase modulation and further comprising using a photodetector to receive at least a portion of said modulated signal and said Brillouin scattering signal in order to obtain an amplitude-modulated electrical signal that indicates said phase modulation.

64. A method as in claim 62, further comprising using a photodetector to receive at least a portion of said modulated signal and said Brillouin scattering signal in order to obtain a beat signal between said selected first modulation sideband and a signal selected from other first modulation sidebands and said carrier signal to effect a frequency multiplication.

65. A method as in claim 62, further comprising modulating said modulated signal at a second modulation frequency to produce a twice-modulated signal that has a plurality of second modulation sidebands.

66. A method as in claim 65, further comprising using a photodetector to receive at least a portion of said twice-modulated signal and said Brillouin scattering signal in order to obtain a beat signal between said selected first modulation sideband and a desired signal selected from other first modulation sidebands and said carrier signal to effect a frequency up-conversion or a frequency down-conversion for a selected second modulation sideband.

67. A method as in claim 65, further comprising amplifying said selected first modulation sideband to have a power larger than said carrier signal to effect a coherent heterodyne detection.

68. A method as in claim 62, wherein said optical medium is a fiber loop configured to transmit said modulated signal and said amplification of said selected first modulation sideband is operable to reduce an dispersion effect on said modulated signal.

69. A method, comprising:
- modulating an optical carrier signal at a carrier frequency to produce a modulated signal having a carrier peak at the carrier frequency and a plurality of modulation sidebands at frequencies different from the carrier frequency;
- directing the modulated signal and an optical pump signal at a pump frequency different from the carrier frequency to counter propagate and spatially overlap in a Brillouin medium; and
- making a frequency of the Brillouin scattering signal overlap with a selected modulation sideband to amplify only the selected modulation sideband.

70. The method as in claim 69, further comprising modulating the modulated signal to produce information-bearing sidebands in each of the modulation sidebands and to amplify of the information-bearing sidebands of the selected modulation.

71. The method as in claim 69, wherein each modulation sideband has a bandwidth less than a bandwidth of the Brillouin scattering signal and each information-bearing sideband has a bandwidth greater than the bandwidth of the Brillouin scattering signal.

72. The method as in claim 69, wherein a phase of an optical carrier signal is modulated, and further comprising using a photodetector to detect the sideband-amplified modulated signal and hence to convert the phase modulation into an amplitude modulation.

73. The method as in claim 69, further comprising:
using a photodetector to measure an amplitude of the sideband-amplified modulated signal to produce a detector output; and
using the detector output to control the pump frequency to maintain the frequency overlap between the Brillouin scattering signal and the selected sideband.

* * * * *

UNITED STATES PATENT AND TRADEMARK OFFICE
CERTIFICATE OF CORRECTION

PATENT NO. : 6,178,036 B1
DATED : January 23, 2001
INVENTOR(S) : Xiaotian Steve Yao, Ph.D.

It is certified that error appears in the above-identified patent and that said Letters Patent is hereby corrected as shown below:

Drawings,
Please replace sheet 31/36 of the formal drawings with the attached replacement sheet 31/36.

Signed and Sealed this

Thirteenth Day of August, 2002

Attest:

JAMES E. ROGAN
Attesting Officer    Director of the United States Patent and Trademark Office